US009572404B2

(12) United States Patent
Dojan et al.

(10) Patent No.: US 9,572,404 B2
(45) **Date of Patent: *Feb. 21, 2017**

(54) SHOE WITH COMPOSITE UPPER AND FOAM ELEMENT AND METHOD OF MAKING SAME

(71) Applicant: NIKE, Inc., Beaverton, OR (US)

(72) Inventors: Frederick J. Dojan, Vancouver, WA (US); Daniel A. Johnson, Taichung (TW); Shane S. Kohatsu, Portland, OR (US); Chin-Chen Huang, Taichung (TW)

(73) Assignee: NIKE, Inc., Beaverton, OR (US)

( * ) Notice: Subject to any disclaimer, the term of this patent is extended or adjusted under 35 U.S.C. 154(b) by 381 days.

This patent is subject to a terminal disclaimer.

(21) Appl. No.: 14/036,381

(22) Filed: Sep. 25, 2013

(65) Prior Publication Data

US 2014/0020193 A1 Jan. 23, 2014

Related U.S. Application Data

(60) Division of application No. 13/250,941, filed on Sep. 30, 2011, now Pat. No. 8,572,866, which is a continuation of application No. 13/029,502, filed on Feb. 17, 2011, now abandoned, which is a continuation-in-part of application No. 12/603,494, filed on Oct. 21, 2009, now Pat. No. 8,429,835, and a continuation-in-part of application No. 12/603,498, filed on Oct. 21, 2009, now Pat. No. 8,321,984, (Continued)

(51) Int. Cl.

| | |
|---|---|
| ***A43B 23/02*** | (2006.01) |
| ***B29D 35/14*** | (2010.01) |

(52) U.S. Cl.

CPC ......... *A43B 23/026* (2013.01); *A43B 23/0225* (2013.01); *A43B 23/0235* (2013.01); *A43B 23/0255* (2013.01); *A43B 23/0295* (2013.01); *B29D 35/146* (2013.01); *B29D 35/148* (2013.01)

(58) Field of Classification Search

CPC . A43B 23/02; A43B 23/0225; A43B 23/0235; A43B 7/06; A43B 7/085

USPC ......................... 12/142 R, 146 C; 36/45, 3 A

See application file for complete search history.

(56) References Cited

U.S. PATENT DOCUMENTS

| | | | |
|---|---|---|---|
| 194,866 | A | 9/1877 | Gifford et al. |
| 1,638,339 | A | 8/1927 | Johnson |

(Continued)

FOREIGN PATENT DOCUMENTS

| | | | |
|---|---|---|---|
| CN | 1243779 | A | 2/2000 |
| CN | 1342046 | A | 3/2002 |

(Continued)

OTHER PUBLICATIONS

Communication in EP10768344.3 dated Nov. 3, 2014.

(Continued)

*Primary Examiner* — Marie Bays

(74) *Attorney, Agent, or Firm* — Banner & Witcoff, Ltd.

(57) ABSTRACT

A bonded mesh composite panel can be used to form a three-dimensional upper shell that includes extensions used for double-lasting and/or to otherwise provide a shelf to support foam padding. The foam padding may be, e.g., a foam midsole. The extensions of the upper shell may be located in a lower portion of the shell and may be bonded to the foam midsole in a heel, midfoot and/or forefoot regions.

7 Claims, 39 Drawing Sheets

Related U.S. Application Data application No. 14/036,381, which is a continuation-in-part of application No. 13/608,122, filed on Sep. 10, 2012, now Pat. No. 8,578,535, which is a continuation of application No. 12/603,498.

(56) References Cited

U.S. PATENT DOCUMENTS

| | | | | |
|---|---|---|---|---|
| 1,689,633 | A | 10/1928 | Lupien | |
| 1,958,135 | A | 5/1934 | Dunbar et al. | |
| 2,006,071 | A | 6/1935 | Edwards | |
| 2,118,255 | A | 5/1938 | Loucks et al. | |
| 2,124,727 | A | 7/1938 | Bown | |
| 2,147,197 | A | 2/1939 | Glidden | |
| 2,398,623 | A | 4/1946 | Daniels | |
| 2,622,052 | A | 12/1952 | Chandler | |
| 3,397,418 | A | 8/1968 | Steadman et al. | |
| 3,583,081 | A | 6/1971 | Hayashi | |
| 3,793,750 | A | 2/1974 | Bowerman | |
| 3,822,488 | A | 7/1974 | Johnson | |
| 3,964,951 | A | 6/1976 | Kremer et al. | |
| 3,988,993 | A | 11/1976 | Brophy | |
| 3,996,088 | A | 12/1976 | Crouch | |
| 4,005,532 | A | 2/1977 | Giese et al. | |
| 4,043,058 | A | 8/1977 | Hollister et al. | |
| 4,177,098 | A | 12/1979 | Gorini et al. | |
| 4,222,183 | A | 9/1980 | Haddox | |
| 4,232,458 | A | 11/1980 | Bartels | |
| 4,255,876 | A | 3/1981 | Johnson | |
| 4,438,574 | A | 3/1984 | Johnson | |
| 4,447,967 | A | 5/1984 | Zaino et al. | |
| 4,510,876 | A | 4/1985 | Garley et al. | |
| 4,588,629 | A | 5/1986 | Taylor | |
| 4,593,634 | A | 6/1986 | Moreno | |
| 4,612,081 | A | 9/1986 | Kasper et al. | |
| 4,661,198 | A | 4/1987 | Simmonds, Jr. et al. | |
| 4,693,021 | A | 9/1987 | Mazzarolo | |
| 4,858,339 | A | 8/1989 | Hayafuchi et al. | |
| 4,963,208 | A | 10/1990 | Muncy et al. | |
| 5,345,638 | A | 9/1994 | Nishida | |
| 5,357,689 | A | 10/1994 | Awai | |
| 5,555,798 | A | 9/1996 | Miyashita et al. | |
| 5,604,997 | A | 2/1997 | Dieter | |
| 5,647,150 | A | 7/1997 | Romanato et al. | |
| 5,771,610 | A | 6/1998 | McDonald | |
| 6,299,962 | B1 | 10/2001 | Davis et al. | |
| 6,401,364 | B1 | 6/2002 | Burt | |
| 6,444,074 | B1 | 9/2002 | Marega et al. | |
| 6,533,885 | B2 | 3/2003 | Davis et al. | |
| 6,558,784 | B1 | 5/2003 | Norton et al. | |
| 6,670,029 | B2 | 12/2003 | Norton et al. | |
| 6,990,755 | B2 | 1/2006 | Hatfield et al. | |
| 7,051,460 | B2 | 5/2006 | Orei et al. | |
| 7,055,267 | B2 | 6/2006 | Wilson et al. | |
| 7,065,820 | B2 | 6/2006 | Meschter | |
| 7,428,772 | B2 | 9/2008 | Rock | |
| 7,546,698 | B2 | 6/2009 | Meschter | |
| 7,556,492 | B2 | 7/2009 | Waatti | |
| 7,574,818 | B2 | 8/2009 | Meschter | |
| 7,793,434 | B2 | 9/2010 | Sokolowski et al. | |
| 8,042,288 | B2 | 10/2011 | Dua et al. | |
| 8,321,984 | B2 * | 12/2012 | Dojan ................ | A43B 23/0235 12/142 R |
| 2001/0000272 | A1 | 4/2001 | Attilieni | |
| 2002/0071946 | A1 | 6/2002 | Norton et al. | |
| 2002/0078599 | A1 | 6/2002 | Delgorgue et al. | |
| 2002/0185213 | A1 | 12/2002 | Marega et al. | |
| 2003/0200679 | A1 | 10/2003 | Wilson et al. | |
| 2005/0076536 | A1 | 4/2005 | Hatfield et al. | |
| 2005/0081402 | A1 | 4/2005 | Orei et al. | |
| 2005/0241082 | A1 | 11/2005 | Moretti | |
| 2005/0268497 | A1 | 12/2005 | Alfaro et al. | |
| 2006/0048413 | A1 | 3/2006 | Sokolowski et al. | |
| 2006/0112594 | A1 | 6/2006 | Kilgore | |
| 2007/0199210 | A1 | 8/2007 | Vattes et al. | |
| 2007/0204485 | A1 | 9/2007 | Kilgore | |
| 2007/0245595 | A1 | 10/2007 | Chen et al. | |
| 2007/0271821 | A1 | 11/2007 | Meschter | |
| 2008/0022554 | A1 | 1/2008 | Meschter et al. | |
| 2008/0244926 | A1 | 10/2008 | Yu et al. | |
| 2008/0250668 | A1 | 10/2008 | Marvin et al. | |
| 2008/0276489 | A1 | 11/2008 | Meschter | |
| 2009/0119948 | A1 | 5/2009 | Ortley et al. | |
| 2009/0133287 | A1 | 5/2009 | Meschter | |
| 2009/0250843 | A1 | 10/2009 | Waatti | |
| 2009/0293318 | A1 | 12/2009 | Garneau et al. | |
| 2009/0307930 | A1 | 12/2009 | Perizzolo et al. | |
| 2009/0309260 | A1 | 12/2009 | Keuchel | |
| 2010/0011619 | A1 | 1/2010 | Bastianelli et al. | |
| 2010/0018075 | A1 | 1/2010 | Meschter et al. | |
| 2010/0037483 | A1 | 2/2010 | Meschter et al. | |
| 2010/0042335 | A1 | 2/2010 | Murphy | |
| 2010/0043253 | A1 | 2/2010 | Dojan et al. | |
| 2010/0077634 | A1 | 4/2010 | Bell | |
| 2010/0095557 | A1 | 4/2010 | Jarvis | |
| 2010/0115792 | A1 | 5/2010 | Muller | |
| 2010/0132227 | A1 | 6/2010 | Pavelescu et al. | |
| 2010/0156058 | A1 | 6/2010 | Koyess et al. | |
| 2010/0175276 | A1 | 7/2010 | Dojan et al. | |
| 2010/0186874 | A1 | 7/2010 | Sussmann | |
| 2010/0251491 | A1 | 10/2010 | Dojan et al. | |
| 2010/0251564 | A1 | 10/2010 | Meschter | |
| 2010/0287790 | A1 | 11/2010 | Sokolowski et al. | |
| 2011/0041359 | A1 | 2/2011 | Dojan et al. | |
| 2011/0088282 | A1 | 4/2011 | Dojan et al. | |
| 2011/0088285 | A1 | 4/2011 | Dojan et al. | |
| 2011/0107620 | A1 | 5/2011 | Bell et al. | |
| 2012/0066931 | A1 | 3/2012 | Dojan et al. | |
| 2012/0324658 | A1 | 12/2012 | Dojan et al. | |

FOREIGN PATENT DOCUMENTS

| | | | |
|---|---|---|---|
| CN | 1625992 | A | 6/2005 |
| EP | 0177892 | A1 | 4/1986 |
| EP | 1163860 | A1 | 12/2001 |
| EP | 1219191 | A2 | 7/2002 |
| EP | 2023762 | A1 | 2/2009 |
| FR | 2428987 | A1 | 1/1980 |
| JP | 2000015732 | A | 1/2000 |
| JP | 2009125538 | A | 6/2009 |
| WO | 9003744 | A1 | 4/1990 |
| WO | 9524305 | A1 | 9/1995 |
| WO | 9943229 | A1 | 9/1999 |
| WO | 0051458 | | 9/2000 |
| WO | 0051458 | A1 | 9/2000 |
| WO | 2004089609 | A1 | 10/2004 |
| WO | 2006028664 | A1 | 3/2006 |
| WO | 2008124163 | A1 | 10/2008 |
| WO | 2010090923 | A2 | 8/2010 |
| WO | 2011011176 | A2 | 1/2011 |
| WO | 2011028441 | A1 | 3/2011 |

OTHER PUBLICATIONS

The First Office Action in CN201080055454.9 dated Mar. 21, 2014, with English translation.

Second Office Action in KR1020127011820 dated Mar. 10, 2014, with English translation.

Communication dated Nov. 11, 2013, with European Search Report dated Nov. 1, 2013, in EP13185317.8-1655.

International Preliminary Report on Patentability for PCT/2010/052214 issued Apr. 24, 2012 with Written Opinion.

Partial International Search Report for PCT/US2010/052645 dated Jan. 24, 2011.

International Search Report and Written Opinion for PCT/US2010/052214 dated Feb. 25, 2011.

International Search Report and Written Opinion for PCT/US2010/052645 dated Jan. 12, 2011.

International Search Report and Written Opinion for PCT/US2010/052645, mailed Apr. 18, 2011.

18 photographs of Mavic® "Huez" shoe (date of first US sale or offer for sale believed to be prior to Aug. 1, 2009).

(56) References Cited

OTHER PUBLICATIONS

International Search Report and Written Opinion for PCT/US2012/043326 mailed Nov. 29, 2012.
Office Action in Korean Application No. 10-2012-7011820 dated Aug. 23, 2013, with English translation.
Office Action in Korean Application No. 10-2012-7011803 dated Aug. 23, 2013, with English translation.
The First Office Action in CN201080052533.4 dated Apr. 2, 2014, with English translation.

* cited by examiner

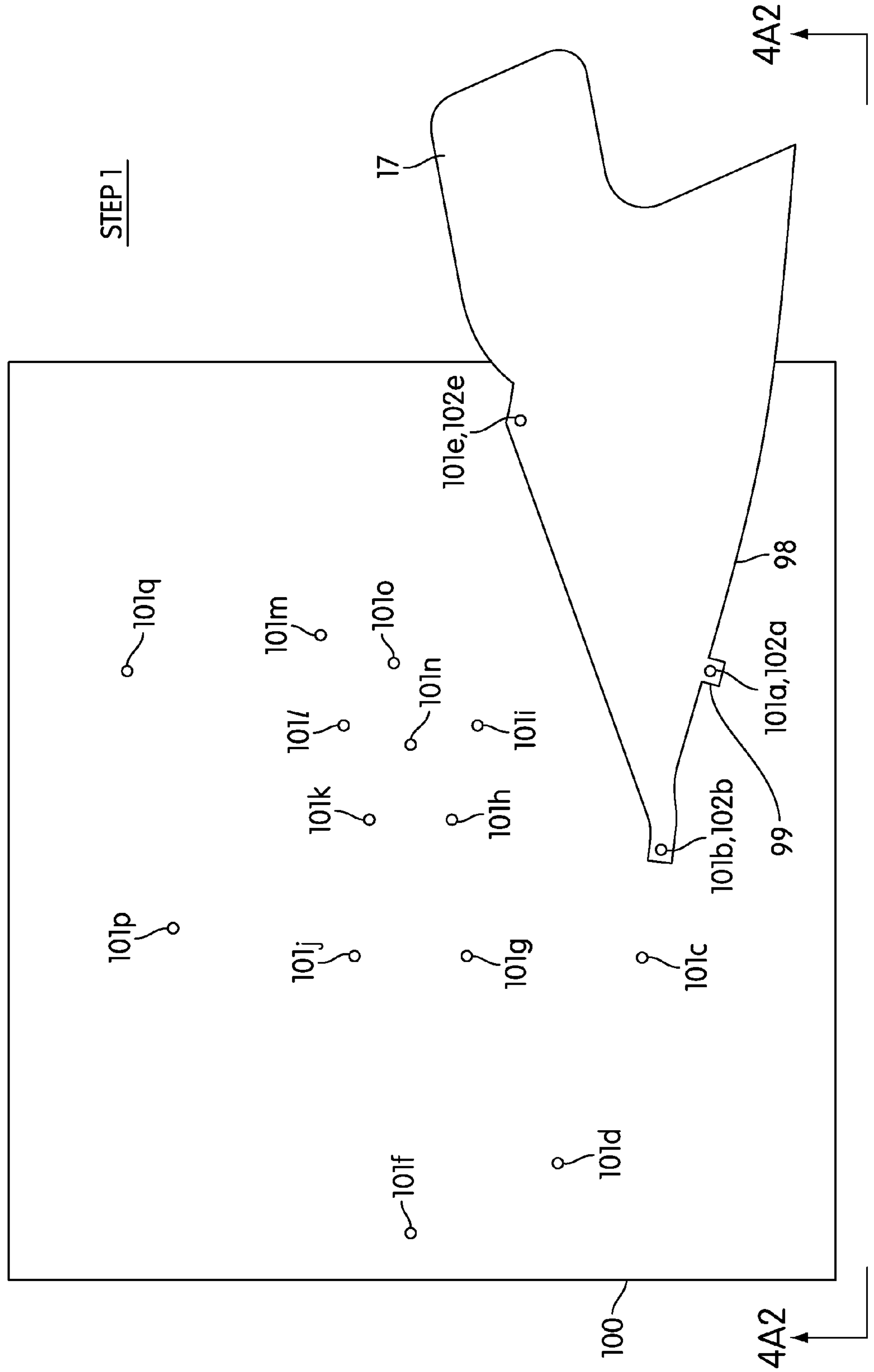
FIG. 4A1

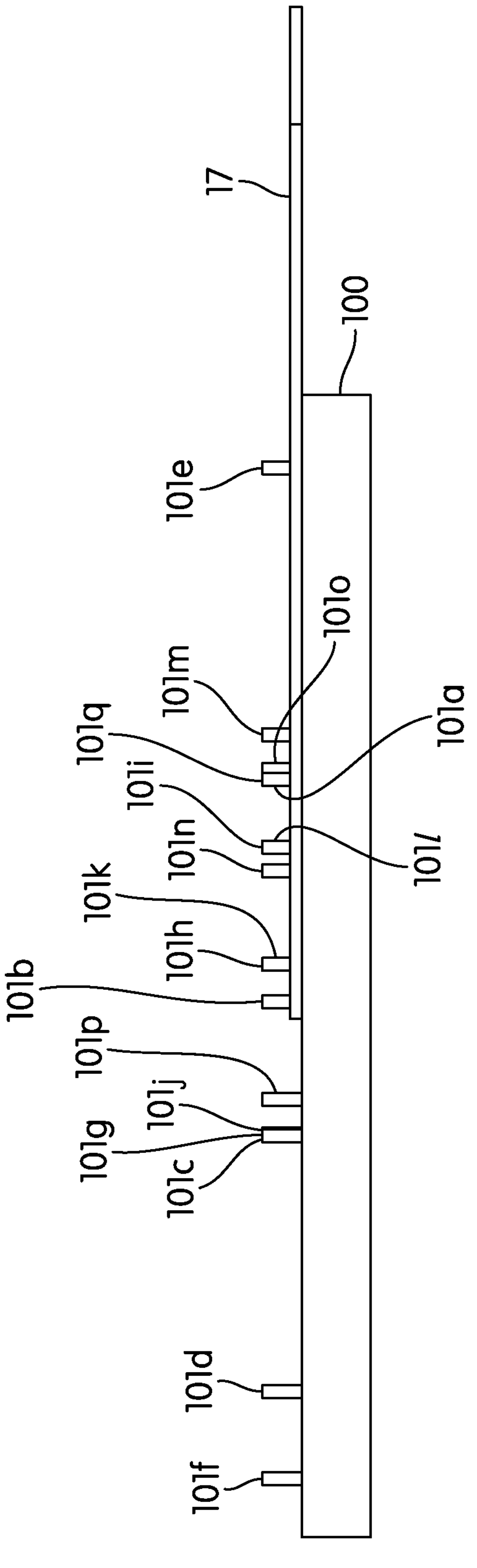
FIG. 4A2

STEP 10

STEP 14

STEP 16

STEP 17

SHOE WITH COMPOSITE UPPER AND FOAM ELEMENT AND METHOD OF MAKING SAME

CROSS-REFERENCE TO RELATED APPLICATIONS

This application is a divisional of U.S. patent application Ser. No. 13/250,941, titled "Shoe with Composite Upper and Foam Element and Method of Making Same" and filed Sep. 30, 2011, now allowed, which application is a continuation of U.S. patent application Ser. No. 13/029,502, titled "Shoe with Composite Upper and Foam Element and Method of Making Same" and filed Feb. 17, 2011, now abandoned, which application is a continuation-in-part of U.S. patent application Ser. No. 12/603,494, titled "Composite Shoe Upper and Method of Making Same" and filed Oct. 21, 2009, now U.S. Pat. No. 8,429,835. application Ser. No. 13/029,502 is also a continuation-in-part of U.S. patent application Ser. No. 12/603,498, titled "Composite Shoe Upper and Method of Making Same" and filed Oct. 21, 2009, now U.S. Pat. No. 8,321,984. This application is also a continuation-in-part of U.S. patent application Ser. No. 13/608,122, titled "Composite Shoe Upper and Method of Making Same" and filed Sep. 10, 2012, now allowed, which application is a continuation of application Ser. No. 12/603,498. application Ser. Nos. 13/250,941, 13/029,502, 12/603,494, 13/608,122 and 12/603,498 are incorporated by reference herein.

BACKGROUND

The design of many types of footwear is often driven by conflicting considerations. As but one example, it is normally desirable for an athletic shoe to have a construction that supports and protects a wearer's foot during a particular athletic endeavor. However, "breathability" is also a desirable quality for many types of athletic shoes. Specifically, air flow from the outside to a shoe interior can help relieve the effects of heat and perspiration that typically build up around a foot during sporting activities. Unfortunately, many materials that provide good support and foot protection can block air and moisture flow. Conversely, many materials that facilitate air and moisture flow provide little support or protection to the wearer's foot.

One solution is to fabricate a shoe in which some portions are formed from supportive/protective materials and some portions are formed from breathable materials. However, this can increase the complexity of the fabrication process and increase cost. Moreover, footwear design (including athletic footwear design) is also driven by aesthetics. A complex production process developed to fabricate a complex shoe can potentially limit a manufacturer's ability to vary that shoe's design to achieve different aesthetic effects.

SUMMARY

This Summary is provided to introduce a selection of concepts in a simplified form that are further described below in the Detailed Description. This Summary is not intended to identify key features or essential features of the invention.

In at least some embodiments, a shoe has an upper that includes a bonded mesh composite panel. The panel includes a substrate layer formed from synthetic leather or another material chosen to provide support and protection to the foot of a wearer, but that can include ventilation openings. The panel further includes a mesh layer that is bonded to the substrate layer and spans one or more of the ventilation openings. One or more panels of thermoplastic polyurethane (TPU) or other desired material can also be included in certain regions so as to create skin layers that provide abrasion protection for the mesh layer and/or to achieve different aesthetic effects.

A bonded mesh composite panel for an upper is in some embodiments fabricated by first arranging panels of substrate, mesh and skin layer materials into an assembly corresponding to the locations of those panels in a completed upper. The assembly may also include separate layers of hot melt bonding material interposed between the substrate, mesh and skin layers, and/or a bonding material may be a component of a substrate, mesh and/or skin layer material. The assembly is then pressed at an elevated temperature so as to melt the bonding material and the skin layers and bond the elements together. Before the pressed assembly completely cools, it is pressed a second time in an unheated press. A heat-conductive compressible pad can be used in the pressing process to create a surface effect in the skin layers that reveals a pattern of an underlying mesh layer.

In some embodiments, a bonded mesh composite panel is used to form a three-dimensional upper shell that includes extensions used for double-lasting and/or to otherwise provide a shelf to support foam padding. The foam padding may be, e.g., a foam midsole. The extensions of the upper shell may be located in a lower portion of the shell and may be bonded to the foam midsole in a heel, midfoot and/or forefoot regions.

BRIEF DESCRIPTION OF THE DRAWINGS

Some embodiments are illustrated by way of example, and not by way of limitation, in the figures of the accompanying drawings and in which like reference numerals refer to similar elements.

FIGS. 4A1 through 4K show operations in a process, according to at least some embodiments, to fabricate a unibody upper panel for the shoe of FIGS. 1A and 1B.

DETAILED DESCRIPTION

Figure 1A:
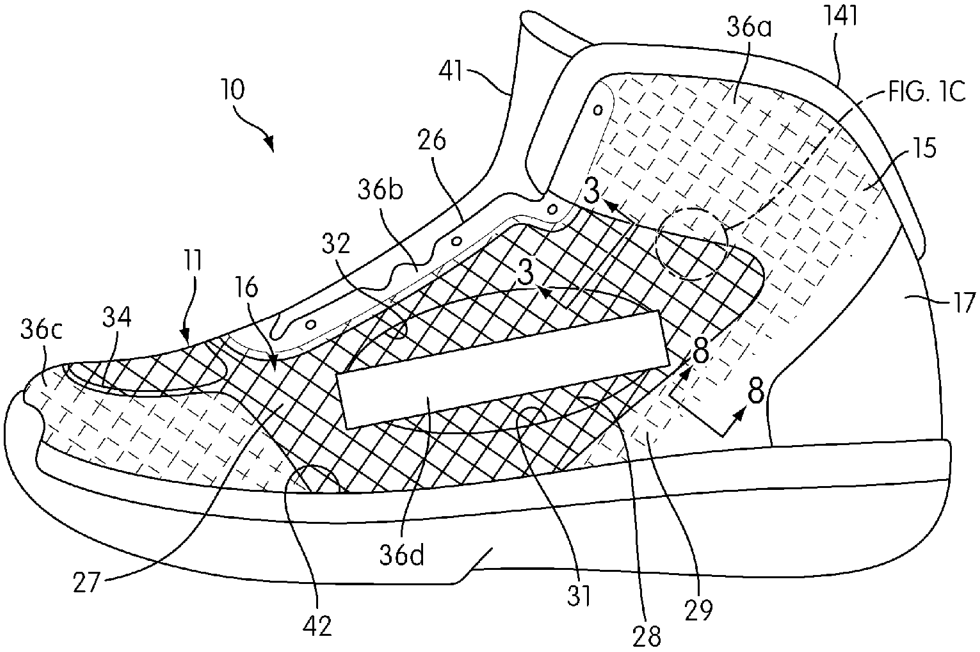
FIGS. 1A and 1B are, respectively, lateral and medial views of a shoe according to some embodiments.

At least some embodiments include an athletic shoe or other type of footwear in which an upper has a panel formed from a bonded mesh composite. The mesh composite includes an inner substrate layer that provides support and protection in appropriate regions based on activities for which the shoe is intended. The substrate layer can also include one or more openings for ventilation, weight reduction or other purposes. The mesh composite further includes a mesh layer that is bonded to the substrate layer and located on the outer side of the substrate in the finished shoe. This construction offers several advantages. For example, the mesh can reinforce the substrate and help retain individual portions of the substrate in a desired arrangement, thereby permitting larger ventilation holes in the substrate. Moreover, covering those ventilation holes and surrounding substrate regions with a mesh can avoid edges that might separate as the shoe wears. A "skin" layer may cover the mesh layer in one or more areas to provide additional durability and/or for decorative purposes. In some embodiments, substantially all of the upper is formed from a mesh composite panel that extends around the heel counter region. In other embodiments, the upper may have a mesh composite panel in a front portion that is bonded or otherwise attached to a separate panel that forms a rear portion of the upper.

DEFINITIONS

To assist and clarify subsequent description of various embodiments, various terms are defined herein. Unless otherwise indicated, the following definitions apply throughout this specification (including the claims). The "interior" of a shoe refers to space that is occupied by a wearer's foot when the shoe is worn. The "inner side" of a panel or other shoe element refers to the face of that panel or element that is (or will be) oriented toward the shoe interior in a completed shoe. The "outer side" of an element refers to the face of that element that is (or will be) oriented away from the shoe interior in the completed shoe. In some cases, the inner side of an element may have other elements between that inner side and the interior in the completed shoe. Similarly, an outer side of an element may have other elements between that outer side and the space external to the completed shoe.

A "bonded" composite element is an element that includes substituent elements (e.g., panels of textile or other materials) that are bonded to one another. Bonding includes bonding through use of glue or other adhesives, through melting and subsequent solidification of a bonding material, and/or through melting and subsequent solidification of a substituent element, but excludes stitching, stapling or similar types of mechanical attachment. Although a bonded composite element may include stitching or other types of mechanical attachment (e.g., to attach the bonded composite element to another element, to shape the bonded composite element), the bonded composite does not rely on that stitching or other mechanical attachment to structurally connect the substituent elements of the bonded composite.

Certain regions of an upper are defined by reference to the anatomical structures of a human foot wearing a shoe that is properly sized for that foot. One or more of the below-defined regions may overlap. The "forefoot" region of an upper is the portion of the upper that will generally cover the metatarsal and phalangeal bones of the wearer's foot, and which will extend beyond the wearer's toes to the frontmost portion of the upper. The "midfoot" region of an upper is the portion of the upper that will generally cover the cuboid, navicular, medial cuneiform, intermediate cuneiform and lateral cuneiform bones of the wearer's foot. The "hindfoot" region of an upper extends from the midfoot region to the rearmost portion of the upper and covers the wearer heel. The hindfoot region covers the sides of the calcaneous bone of a wearer and may, depending on a particular shoe configuration, cover some or all of the wearer's talus bone (ankle).

The top forefoot and top midfoot regions of an upper will generally cover the upper surfaces of a wearer's forefoot and midfoot bones described above. The toe of the upper is the portion that will generally cover the tops and fronts of the toes and that extends from the top forefoot region to the lowest edge of the upper in the direction of the sole. The lateral forefoot region extends between the top forefoot and the lowest edge of the upper in the direction of the sole and between the toe and lateral midfoot regions. The lateral midfoot region extends between the top midfoot region and the lowest edge of the upper in the direction of the sole and between the lateral forefoot and hindfoot regions. In a similar manner, the medial forefoot region extends between the top forefoot region and the lowest edge of the upper in the direction of the sole and between the toe and medial midfoot regions, the medial midfoot region extends between the top midfoot region and the lowest edge of the upper in the direction of the sole and between the medial forefoot and hindfoot regions. The topfoot region includes the top forefoot and top midfoot regions. The lateral side region includes the lateral forefoot and lateral midfoot regions. The medial side region includes the medial forefoot and medial midfoot regions.

Shoe with Mesh Composite Upper Panel

Figure 1B:
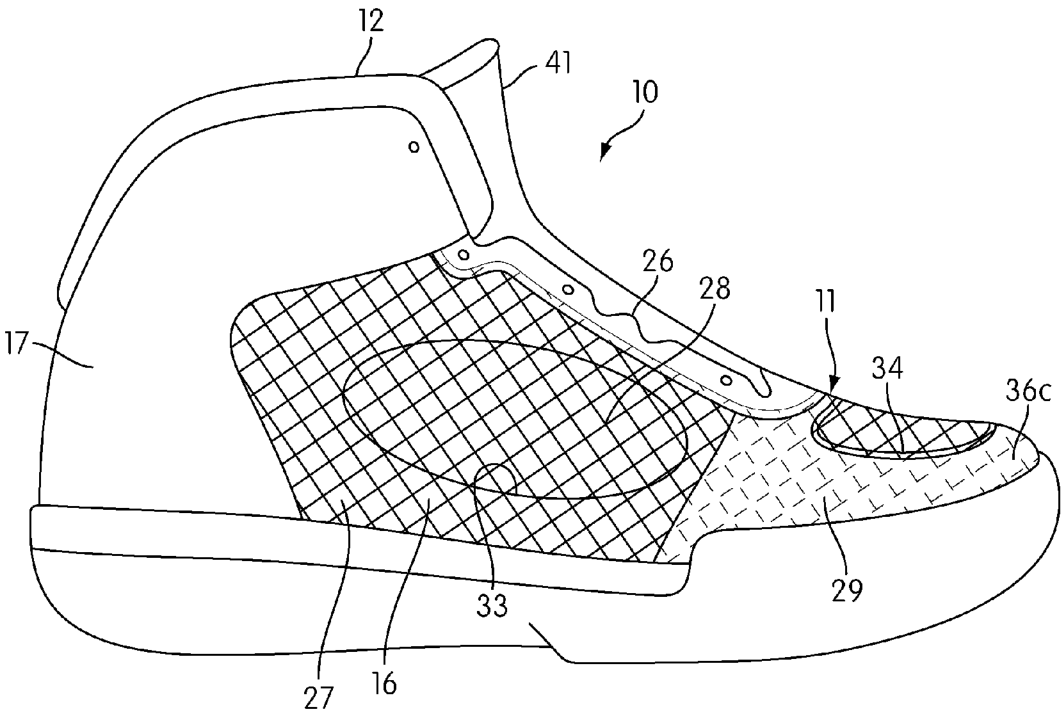

FIG. 1A is lateral view of a shoe 10 according to at least some embodiments. FIG. 1B is a medial view of shoe 10. In the embodiment of FIGS. 1A and 1B, the upper 11 of shoe 10 includes a bonded mesh composite panel 16 and a foxing panel 17. Additional details of mesh composite panel 16 and its construction, as well the attachment of mesh composite panel 16 to foxing panel 17, are provided below in connection with FIGS. 1C and 4A1-4K.

Figure 1C:
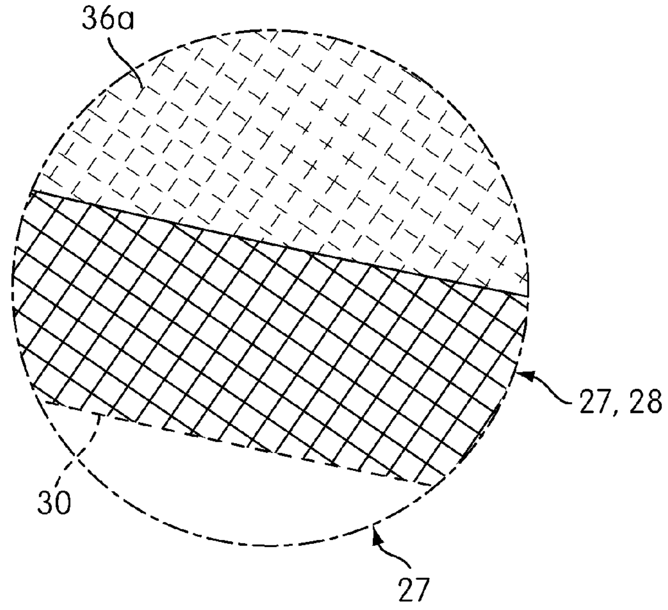
FIG. 1C is an enlarged view of the area indicated in FIG. 1A showing an aspect of the mesh composite in the embodiment of FIGS. 1A and 1B.

In the embodiment of shoe 10, mesh composite panel 16 generally covers the toe region, the top, lateral and medial forefoot regions, the top, lateral and medial midfoot regions, and portions of the hindfoot region. Rear portion 17 covers the remainder of the hindfoot region. As explained in more detail below, shoe 10 of FIGS. 1A and 1B is merely one example of footwear according to various embodiments. In other embodiments, a mesh composite front portion of an upper panel may be joined to a non-mesh-composite rear portion at different locations and/or along joints having different configurations. In still other embodiments (e.g., an embodiment such as is described in connection with FIGS. 10A-16), an entire upper shell is formed from a mesh composite that includes a contiguous substrate element that completely surrounds a wearer foot in a completed shoe FIG. 1C is an enlarged view of the area indicated in FIG. 1A showing the details of a portion of mesh composite panel 16 in the embodiment of shoe 10. A layer 28 of mesh material is bonded to a layer 27 of substrate material in a manner described below. For illustrative purposes, a portion of the mesh layer 28 below broken line 30 has been removed in FIG. 1C to further expose substrate layer 27. For convenience and to avoid obscuring the drawings with excessive detail, the mesh material of layer 28 (and of mesh layers in other embodiments) is shown in the various drawing figures as a simple and relatively course grid pattern with a diagonal orientation. Actual materials used for mesh layer 28 (or for mesh layers in other embodiments), examples of which are provided below, may have a more complex and/or finer weave structure. A panel 36*a* of skin material is in turn bonded to mesh layer 28 and to substrate layer 27 to form a skin layer. As is also discussed in more detail below, the layer of skin material conforms to the mesh material of layer 28 so as to reveal a surface texture having a contour corresponding to that of the mesh material. For simplicity, a view of this conformance perpendicular to a skin layer is represented in the drawings as a partially broken version of the grid pattern used for mesh layer 28.

Returning to FIGS. 1A and 1B, the substrate material of layer 27 extends across all of mesh composite panel 16 except for a tongue opening 26, lateral ventilation holes 31 and 32, medial ventilation hole 33, and top forefoot ventilation hole 34. Other embodiments have an inner substrate material layer that includes more or fewer holes, and/or holes of different shapes and/or in different locations. As is further explained below in connection with FIGS. 4A1-4K, the mesh material of layer 28 is bonded to substrate layer 27 over most of panel 16 in the embodiment of FIGS. 1A and 1B, although this may not be the case in other embodiments.

The embodiment of FIGS. 1A and 1B also includes skin layers formed by panels 36*a*, 36*b*, 36*c* and 36*d*. The skin material of panels 36*b* and 36*c* similarly conforms to the mesh material of layer 28 so as to reveal a surface texture corresponding to the mesh. The mesh material underlying panel 36*d* is compressed so as to provide a smooth texture on the external surface of panel 36*d*, as is also described more fully below.

Because mesh layer 28 is directly bonded to substrate layer 27, the combined strength of the mesh and substrate materials obviates the need for another material on the outside surface of upper 11 to provide tensile strength. This permits upper 11 to be much lighter than is possible using various conventional shoe construction techniques. Panels of skin material (which are relatively lightweight) can be included in certain areas of an upper where abrasion protection is helpful.

Ventilation holes 31, 32, 33 and 34 in substrate layer 27 allow air to flow through perforations of the mesh material of layer 28. This flow helps to cool and dry the foot of a wearer of shoe 10. In some embodiments, there are no additional material layers separating substrate layer 27 and the foot of a wearer (or the socked foot of a wearer) in the regions around one or more of holes 31, 32, 33 and 34, and air can directly reach the interior of shoe 10. In other embodiments, upper 11 of shoe 10 may include an additional lining (e.g., a "bootie") between substrate layer 27 and a wearer's foot. In such embodiments, air cannot directly reach the wearer's foot through holes 31, 32, 33 and 34, but ventilation is still improved relative to many conventional constructions, as materials used for a bootie or other liner are typically porous and significantly more breathable than materials used for substrate layer 27.

The number, size and location of ventilation holes will vary in different embodiments. In some embodiments, an upper may include ventilation holes as small as (or smaller than) 2 mm in diameter, while in other embodiments, the ventilation holes may be quite large and cover a substantial portion of the upper. In some embodiments, minimum spacing between some ventilation holes can be based on the minimum area needed to effectively bond the mesh and substrate layer materials used for a particular embodiment.

The material of skin layer panels 36*a*, 36*b*, 36*c* and 36*d* provides abrasion protection for mesh layer 28. A skin material panel can also be added for decorative purposes. For example, skin material elements can include one or more additional elements such as element 36*d* in the shape of a logo or other identifier of the manufacturer of shoe 10. Although much of skin layer panels 36*a*-36*d* are overlaid on the mesh material of layer 28, some portions of skin layer panels are directly bonded to substrate layer 27 without an interposing layer of mesh material. For example, and as described in more detail below in connection with FIGS. 4A1-4K, skin layer panels 36*a*-36*c* cover some portions of substrate layer 27 over which mesh layer 28 does not extend. Moreover, and as also described in more detail below, a portion of skin layer panel 36*a* overlays (and is bonded to) foxing panel 17. In some cases, an interposing mesh layer is omitted for structural purposes. An interposing mesh layer could also be omitted for decorative reasons.

Shoe 10 includes a foamed ankle collar 141, a heel counter (not shown) and a tongue 41. Tongue 41 may be stitched or otherwise bonded to the inside of upper 11. Attachment of collar 141 is described below. Upper 11 may be bonded to a midsole 42 in any of various manners. In some embodiments, upper 11 is slip lasted and attached to a Strobel layer, with that Strobel layer then bonded to an upper face of midsole 42. Other types of constructions are used in other embodiments to attach upper 11 to a midsole or other sole component. One example of such a construction is discussed below in connection with FIGS. 15A and 15B.

As can also be seen in FIGS. 1A and 1B, the pattern of the mesh material of layer 28 (represented in FIGS. 1A through 1C as a coarse diagonal grid) is exposed over a substantial portion of composite panel 16. In particular, that mesh material is directly visible in regions of panel 16 not covered by one of skin layer panels 36*a*-36*d*. In much of the areas covered by skin layer panels, however, the pattern of the underlying mesh material is still visible because of the skin layer conformance to that mesh. In some embodiments, the pattern of the mesh material in the mesh layer is visible over a substantial portion (or even most) of the surface of the mesh composite panel in the finished shoe. This pattern may be visible directly in areas where the mesh is exposed (e.g., over openings 31, 32, 33 and 34 and in the regions surrounding those openings) or as a contour of a skin layer panel (e.g., the portion of panel 36*a* shown in FIG. 1C). In some embodiments, the percentage of exposed mesh will depend on the purpose of the shoe.

Shoe 10 of FIGS. 1A and 1B is merely one example of a shoe having a multilayer bonded mesh composite upper panel according to certain embodiments. Additional embodiments include other styles of shoes, shoes with different types of midsole/outsole combinations, shoes with different patterns of substrate material holes, and shoes with different skin material configurations. Still other embodiments include shoes with additional layers and/or layers of additional types of materials.

Figure 2:
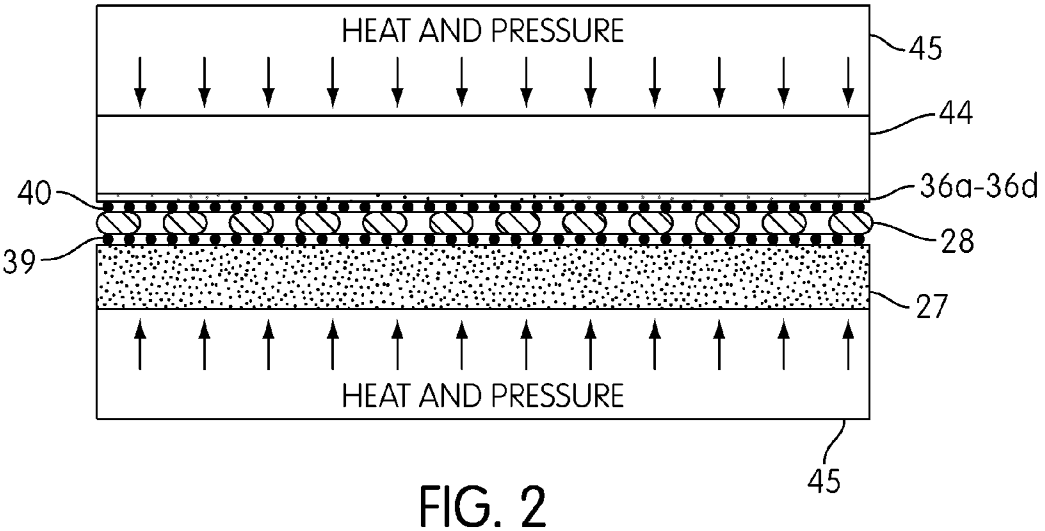
FIG. 2 is a partially schematic diagram showing creation of a multilayer mesh composite according to some embodiments.

FIG. 2 is a partially schematic diagram showing creation of multilayer bonded mesh composite panel 16. Substrate layer 27, mesh layer 28, and skin layer panels 36*a*-36*d* are assembled in a manner described below. For purposes of explanation, substrate layer 27 is shown in cross-sectional views with fine stippling, skin panels are shown with coarse stippling, and mesh layer 28 is shown with cross-hatching. The open areas between the cross-hatched portions of mesh layer 28 correspond to mesh material openings. Interposed between mesh layer 28 and substrate layer 27 is a layer 39 of hot melt bonding material (shown with small black dots). Another layer 40 of hot melt bonding material is placed between mesh layer 28 and skin layer panels 36*a*-36*d*. After the layers are tacked together, the assembly is covered with a heat conductive silicone pad 44 and put into a heated press 45, with the skin material panels facing silicone pad 44. Heat and pressure are then applied to activate the bonding material and to cause the skin material to reach its melting point. As a result, the bonding material in layers 39 and 40 bonds substrate layer 27 to mesh layer 28 and mesh layer 28 to skin layer panels 36*a*-36*d*, the skin material of panels 36*a*-36*d* begins to conform (and further bond) to the mesh material of layer 28, and the various layers bond to become a one-piece panel. After that heated pressing, the layers are then pressed again in a separate cool press (not shown). Additional details of the pressing operations are provided below.

In some embodiments, a separate panel of hot melt bonding material may not be placed between a skin layer panel and a mesh or substrate layer panel. Instead, the skin layer panel is bonded to the other layer(s) solely through the melting of the skin layer panel so as to fuse the skin layer to one or more other layers. Similarly, inserting a separate panel of hot melt bonding material between a substrate material panel and a mesh material panel is unnecessary in some embodiments. In certain embodiments, for example, a substrate layer 27 may comprise a laminate that includes a first material layer (e.g., artificial leather) and a second material layer (e.g., thermoplastic polyurethane) prelaminated to a face of the first material layer by the substrate material manufacturer. Panels of that two layer substrate material can then be cut to shape by a shoe manufacturer and used as substrate layer 27. In such an embodiment, the second material layer would be oriented to face mesh layer 28 and would melt during pressing so as to fuse to mesh layer 28 (and to the skin layer(s)), and the separate layer of bonding material 39 could be omitted. Indeed, some embodiments may not require any separate bonding material layers, and could rely on melting of the skin and/or substrate layers themselves to achieve bonding. As another alternative, large sections of mesh, substrate or skin material could have a separate hot melt bonding material (e.g., such as would be used for layer 39 or 40) pre-applied (e.g., by the material supplier or in a preprocessing step by a shoe manufacturer) prior to cutting of individual upper panels from the large material sections. Combinations of these techniques could also be used.

Figure 3:
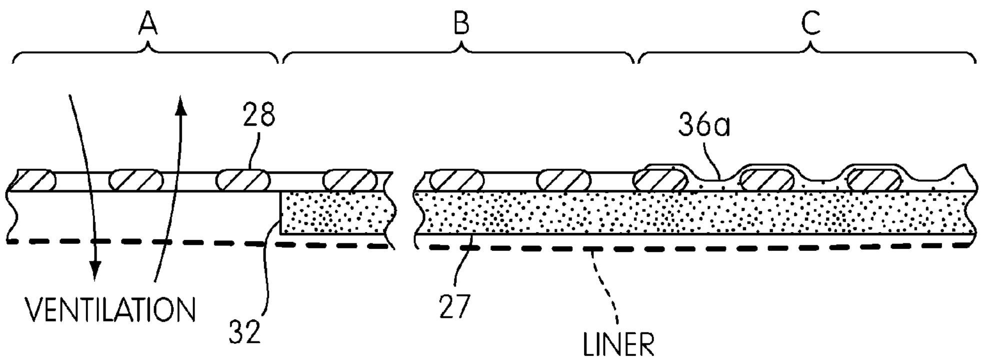
FIG. 3 is a partially schematic cross-sectional view from the location indicated in FIG. 1A showing the structure of a mesh composite according to some embodiments.

FIG. 3 is a partially schematic cross-sectional view from the location indicated in FIG. 1A showing the structure of mesh composite panel 16 after hot and cold pressings. For purposes of illustration, three different regions are labeled in FIG. 3. Region A corresponds to the location of the mesh composite panel 16 where hole 32 in substrate layer 27 is located. Because no other material layers are present in region A, the mesh material of layer 28 is not bonded to another material in this region. If upper 11 includes a liner (i.e., on the inner side of substrate layer 27), such as is shown in FIG. 3 with a broken line, the mesh material of layer 28 is in at least some embodiments not bonded to that liner in the region of holes in substrate layer 27. In some embodiments, however, a liner may be stitched to mesh layer 28 and/or other portions of shell 11 in some locations and/or bonded to the inside surface of substrate layer 27 at some locations.

Region B in FIG. 3 corresponds to a location of mesh composite panel 16 where no skin material panel is present. Region C corresponds to a location where substrate layer 27, mesh layer 28 and skin layer panel element 36*a* are present. In regions B and C, and throughout mesh composite panel 16, the substrate material of layer 27 and the mesh material of layer 28 are bonded together at all surfaces where those two materials are in contact. Similarly, skin layer element 36*a* and the substrate material of layer 27 are bonded together at all surfaces where those materials contact, as are panel 36*a* and the mesh material of layer 28. Other skin material panels are similarly bonded to the substrate material of layer 27 and the mesh material of layer 28. Bonding substrate and mesh materials, and/or skin materials, effectively fuses the materials together so as to create a material that is stronger than the individual components.

As also seen in region C, the skin material of panel 36*a* conforms to the mesh material of layer 28 so that a contour of the mesh material pattern is revealed through panel 36*a*. Other skin material panels that overlay mesh layer 28 similarly conform to the mesh material. In this manner, upper 11 can have a more continuous appearance than might otherwise be possible. By providing layers of skin material that have a texture revealing an underlying mesh material, a potential purchaser of shoe 10 is also made aware of the structure of shoe 10. Moreover, it is believed that the conformal nature of the contact between a skin material panel and underlying mesh and substrate layer materials helps to increase the bonded surface areas and overall material strength.

As indicated above, the substrate material of layer 27 provides support and protection for the foot of a wearer of shoe 10. In at least some embodiments, the substrate material is (or includes) a synthetic leather or another material that is sufficiently durable to protect a foot in regions where the upper is likely to contact external objects and/or where foot support is needed, but sufficiently flexible to provide comfort.

Many different substrate materials can be used. In some embodiments, substrate materials are selected so as to provide support for the lamination package (i.e., the stack of substrate, mesh and other materials assembled to create an upper) and to adequately bond to the mesh material. To achieve such goals, substrate materials can be chosen so as to have limited stretch, to bond well and be chemically compatible with TPU hot melt, to have a continuous (i.e., non-mesh) surface so as to provide more bonding surface area, and to be cuttable with clean edges in mass production. Table 1 lists examples of substrate materials that can be used in at least some embodiments; other materials could also be used.

TABLE 1

| Material Type/Description | Example Commercially-Available Product |
|---|---|
| EPM synthetic suede 0.5-1.0 mm thick | CLARINO TIRRENINA NUBUCK (Kuraray America, Inc., New York, NY) |
| regular density synthetic leather | SOFT-R 1.1 mm (Nan Ya Plastics Corporation, Taiwan) |
| microfiber synthetic leather | THUNDER II, 1.4 mm (Nan Ya Plastics Corporation, Taiwan) |

TABLE 1-continued

| Material Type/Description | Example Commercially-Available Product |
|---|---|
| EPM synthetic leather with 50% rePET in high density substrate | KANGA ENV 1.3 mm or 1.5 mm (Nan Ya Plastics Corporation, Taiwan) |
| buffed high density synthetic leather | KITE BUFF 0.9 mm (Daewoo International Corporation, Pusan, Korea) |
| poly/nylon nonwoven | EVO80 WS (Freudenberg & Co., Weinheim, Germany) |
| perfed microfiber polyester textile | LJ-M11K (Gold Long John International Co, Taiwan) |
| polyester textile package | POLYPAG PLUS MULTI (You Young Co., Ltd., Korea) |
| polyester textile package | JEKYLL PLUS MULTI (You Young Co., Ltd., Korea) |
| TPU coated synthetic leather | A806/A807 (Chaei Hsin Enterprise Co., Ltd., Taiwan) |

The mesh material of layer 28 reinforces upper 11 by augmenting the strength of the substrate material where the two materials are bonded, thereby allowing use of thinner substrate material elements. Incorporation of mesh material into an upper further allows elimination of substrate material in areas where the full protection and support of the substrate material is not as important, thus permitting further reduction in substrate material and overall shoe weight. The mesh material of layer 28 also allows air to flow through openings in substrate layer 27 to help cool and dry the foot of a wearer.

In at least some embodiments, the mesh material of layer 28 is a single layer warped knit with an open structure (or other type of woven material) and is formed from nylon, polyester, nylon/polyester blends, recycled polyethylene terephthalate (rePET), or other material. In certain embodiments, the mesh material has more than 50% open area (e.g., more than 50% of the material surface area comprises open space through which air can freely flow from one side to the other). In some embodiments, SPANDEX (or other stretchable meshes) and spacer meshes (meshes with filler yarn) are undesirable. Table 2 lists examples of the mesh material in at least some embodiments; other materials could also be used.

TABLE 2

| Material Type/Description | Example Commercially-Available Product |
|---|---|
| 100% PET | E-minicell mesh 420D single mesh (Daewoo International Corporation, Pusan, Korea) |
| mesh | BULLHEAD mesh (Formosa Ting Sho Co., Ltd., Taiwan) |
| 35% rePET mesh | TENOR mesh (Joonang Textile Co., Ltd., Korea) |
| 38.6% rePET mesh | AIR TING mesh (Mogae Textile Co., Ltd., Busan, Korea) |
| 34% nylon 200D/84F, 66% polyester 300D/168F | TLE8B001 DUONET (Tiong Liong Industrial Co., Ltd., Taiwan) |
| 32% polyester 100D/36F, 68% polyester 300D/168F | TLD9B018 BLOCKBUSTER (Tiong Liong Industrial Co., Ltd., Taiwan) |
| 50% rePET mesh | MATRIX mesh (You Young Co., Ltd., Korea) |
| 30% rePET mesh | MONO RIB mesh (Dong Jin International Corporation, DaeGu, Korea) |
| 30% rePET mesh | thermoplastic mesh 6 (Duck San Co., Korea) |
| 30% rePET mesh | Egg mesh (You Young Co., Ltd., Korea) |
| Love Look | Formosa Ting Sho Co., Ltd., Taiwan |

The skin material for panels 36*a*-36*d* reinforces the mesh and substrate materials, protects the mesh material layer in certain areas, and/or provides a decorative surface on upper 11. In at least some embodiments, the skin material is a thermoplastic polyurethane (TPU) or other appropriate material. In certain embodiments, the skin material is a multilayer material having an outer heat-resistant layer for abrasion resistance and an inner layer for hot melt bonding. For example, the outer layer can be thermoset polyurethane (PU) or a TPU with a high melt temperature, and the inner layer can be a TPU having a lower melt temperature suitable for hot melt bonding and production temperatures. Table 3 lists examples of materials that can be used for the skin material in at least some embodiments; other materials could also be used.

TABLE 3

| Material Type/Description | Example Commercially-Available Product |
|---|---|
| 0.4 mm thermoset polyurethane (PU) film | UT900 (San Fang Chemical Industry Co., Ltd., Taiwan) |
| TPU film | FW film (Daewon Chemical Company, Ltd., Korea) |
| Dual (H/L) TPU film having 0.1 mm high melting temp. aliphatic film layer and 0.2 mm low melting temp. aromatic polyester film FS8080 layer | FD26K series (Ding Zing Chemical Products Co., Ltd., Taiwan) |
| 0.3 mm film having 0.1 mm PU layer and 0.2 mm TPU hot melt layer | SKN300 (Teijin, Okahata, Japan) |
| 0.35 mm PU coated hot melt film | HH Million AB (Daewoo International, Busan, Korea) |

In at least some embodiments, and as shown schematically in FIG. 2, various layers of material are bonded by interposing a separate layer of hot melt bonding material between those materials and then activating that bonding material in a heated press. In at least some embodiments, the hot melt bonding material generally has a pre-activation consistency of a fine fibrous mat that is similar in thickness (and appearance) to a fine spider web. This allows the activated bonding material to fully cover contacting surfaces without excess buildup of hardened bonding material. In some embodiments, hot melt bonding material mats can be laid onto sheets of mesh and skin material, with the sheets then rolled and provided to a shoe manufacturer. The manufacturer can then unroll the mesh and bonding material combination (or the skin and bonding material combination) and cut appropriate shapes for an upper in a single die-cutting operation.

In at least some embodiments, a TPU hot melt bonding material could have a melt temperature between 80° C. and approximately 120° C. and be polyester-based. Table 4 lists examples of hot melt bonding materials that can be used in at least some embodiments; other hot melt bonding materials could also be used.

TABLE 4

| Material Type/Description | Example Commercially-Available Product |
|---|---|
| hot melt film | F1500 (Duck San Co. Ltd, Seoul, Korea) |
| polyurethane/polyester base hot melt film | FS8080 (Ding Zing Chemical Products Co., Ltd., Taiwan) |
| hot melt film | FS4252X3 (Ding Zing Chemical Products Co., Ltd., Taiwan) |
| hot melt film | NASA 600 (Sambu, Korea) |
| hot melt film | Meltlace Web 100E (Dongsung Adhesives division Henkel AG & Co. KGaA) |
| polyether film (.05 mm to 2 mm thickness) | FT1029 (Ding Zing Chemical Products Co., Ltd., Taiwan) |

The final material in Table 4 (polyether film) may be desirable, e.g., in certain embodiments in which high humidity is a concern.

Fabrication of an Upper Shell Having a Mesh Composite Portion

According to at least some embodiments, a bonded mesh composite panel of an upper is created by assembling individual panels of material for the various layers in a flat configuration. If the upper is to include additional portions (e.g., a rear portion such as panel 17 of shoe 10), additional material elements can be included as part of the assembly process. The panels and other elements are assembled so as to have an arrangement in which the relative locations of the panels and elements correspond to the locations those panels and elements will have in the completed shoe. After assembling the individual panels and/or other elements into the proper arrangement and tacking the assembly at several locations, the assembly undergoes a series of pressing operations to bond the assembled elements. These operations create a flat, one-piece unibody upper shell that can contain many or all elements to be included in the finished upper. Edges of the unibody upper shell can then be joined to create a three-dimensional upper body ready for further finishing and attachment to a midsole.

FIGS. 4A1 through 4K show a process, according to at least some embodiments, to fabricate the mesh composite panel 16 for shoe 10 of FIGS. 1A and 1B. In step 1 shown in FIGS. 4A1 and 4A2, foxing panel 17 is attached to an assembly jig 100. FIG. 4A2 is a side view of jig 100 and foxing panel 17, from the position noted in FIG. 4A1, that is included to further show the use of jig 100. Each of pins 101*a*-101*q* in jig 100 extends upward and is used to position one or more upper elements. For example, and as shown for panel 17, pins 101*a*, 101*b* and 101*e* correspond to holes 102*a*, 102*b* and 102*e* in foxing panel 17. Panel 17 is positioned on jig 100 by respectively placing holes 102*a*, 102*b* and 102*e* over pins 101*a*, 101*b* and 101*e* and pushing panel 17 onto jig 100. The side of foxing panel 17 facing upward at the completion of step 1 will face outward and away from the interior of a completed shoe 10. Hole 102*a* of panel 17 is in a small extension tab 99 that extends away from an edge 98 of panel 17. Extension tab 99 (and similar extension tabs on other elements) will be trimmed away during a later stage of fabrication.

Other elements of upper 11 are positioned on jig 100 in a similar manner. In step 2 (FIG. 4B), for example, a panel 53 of hot melt bonding material is placed adjacent an edge 54 of foxing panel 17. Bonding material panel 53 will be used to bond foxing panel 17 to a panel of substrate material that will become substrate layer 27 of mesh composite panel 16. In other embodiments, foxing panel 17 can be attached in a different manner (e.g., by relying on the melting of a laminated layer of foxing panel 17, by using a brushed-on liquid adhesive) and/or at a different stage of constructing an upper shell.

Figure 4B:
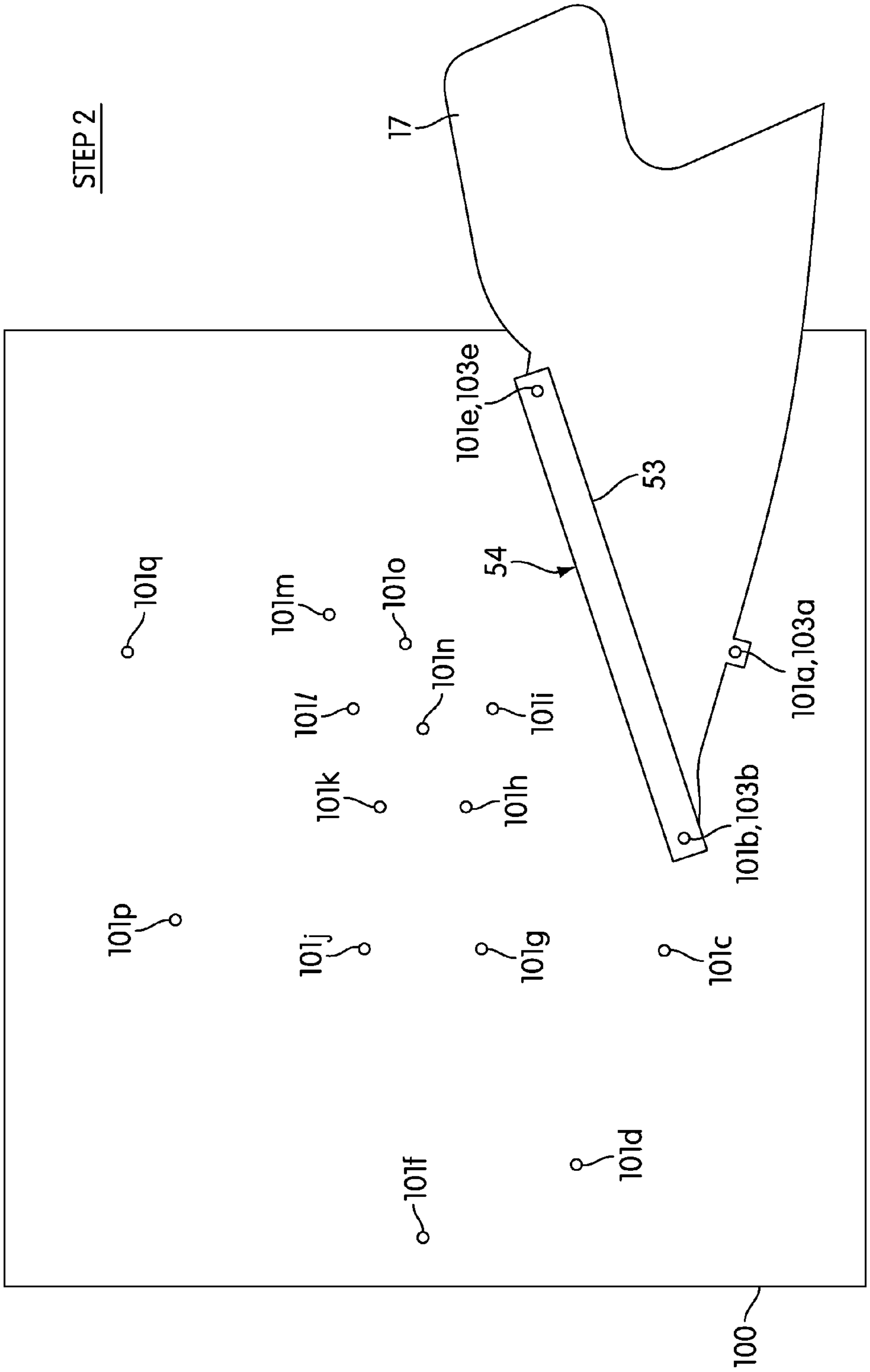
Figure 4C:
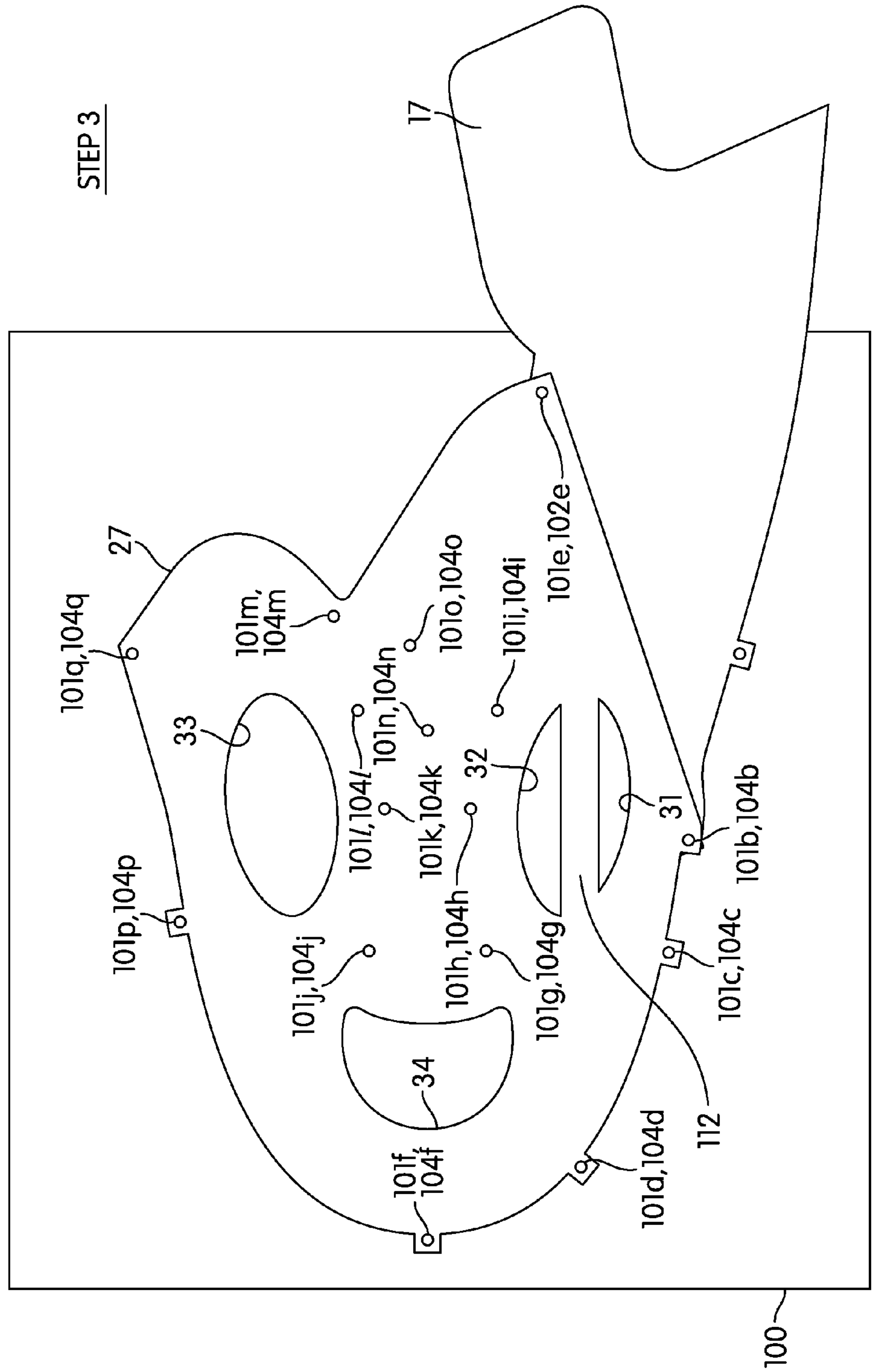
Figure 4D:
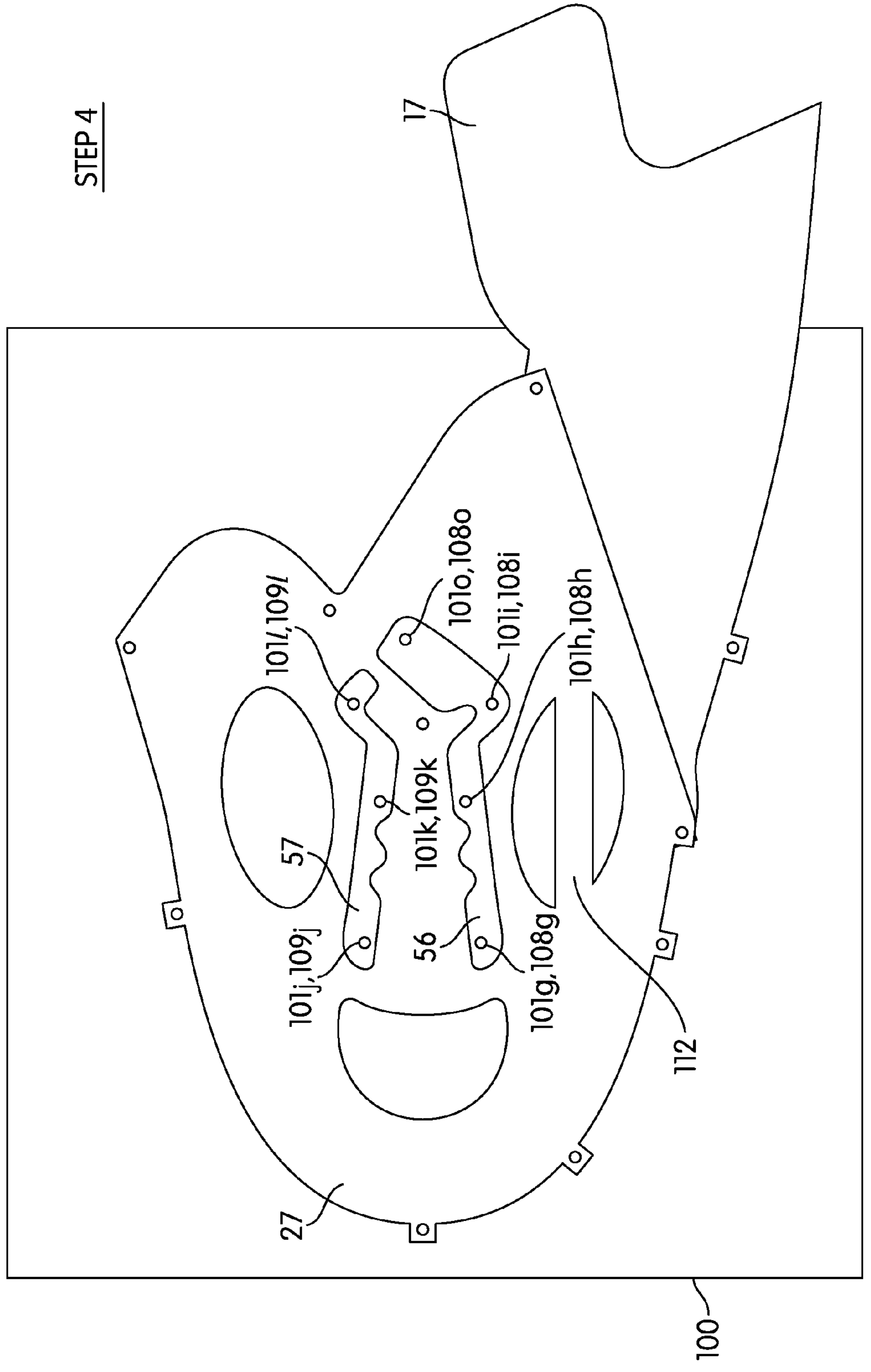

In step 3 (FIG. 4C), a panel of material for substrate layer 27 is attached to assembly jig 100 by pushing holes 104*b* through 104*q* in the substrate material panel over pins 101*b* through 101*q*, respectively. Holes 104*b*-104*d*, 104*f* and 104*p* are contained in extension tabs that will be trimmed away in a subsequent fabrication step. As seen in FIG. 4C, the panel of layer 27 includes opening 34 that will ultimately be located in the top forefoot region of upper 11 (see FIGS. 1A and 1B). Also seen in FIG. 4C are openings 31 and 32 that will ultimately be located laterally on upper 11 (FIG. 1A) and opening 33 that will ultimately be located medially on upper 11 (FIG. 1B). In some embodiments, holes 31, 32, 33 and 34 are cut when the substrate layer panel is die-cut from a larger piece of material. Tongue opening 26 (FIGS. 1A and 1B) will be cut after assembly and pressing. In other embodiments, tongue opening 26 can also be cut from the substrate material panel when that panel is die cut. The side of the layer 27 panel that is exposed at the completion of step 3 will face outward and away from the interior of a completed shoe 10.

In step 4 (FIG. 4D), eye stay reinforcement 56 is attached to jig 100 by pushing holes 108*g*, 108*h*, 108*i* and 108*o* over pins 101*g*, 101*h*, 101*i* and 1010, respectively. Eye stay reinforcement 57 is similarly attached by pushing holes 109*j*, 109*k* and 1091 over holes 101*j*, 101*k* and 1011, respectively. In at least some embodiments, reinforcements 56 and 57 are added to provide reinforced locations for shoe lace eyelets. In other embodiments, eye stay reinforcements may be omitted or may have different configurations. Panels of unactivated hot melt bonding material can also be interposed between reinforcements 56 and 57 and substrate layer 27.

Other types of reinforcements can be placed in other areas of a shoe upper in a manner similar to that used for eye stay reinforcements 56 and 57. In some embodiments, for example, additional reinforcement could be placed over the area of the substrate layer panel that will be located in the toe region of a completed upper. In another embodiment, reinforcement materials could be placed over the portions of the substrate layer panel that will be located at the lateral and medial sides of a completed shoe, with those reinforcement materials forming reinforcing strap attachment points in a finished upper.

In step 5 (FIG. 4E), a panel of mesh material to form layer 28 is attached to jig 100 by pushing holes 119*b*, 119*c*, 119*d*, 119*e*, 119*p* and 119*q* over pins 101*b*, 101*c*, 101*d*, 101*e*, 101*p* and 101*q*, respectively. Holes 119*b*-119*d* and 119*p* are contained in extension tabs that will be trimmed away in a subsequent fabrication step. The side of the layer 28 mesh material panel that is exposed at the completion of step 5 will face outward and away from the interior of a completed shoe 10. A layer of unactivated hot melt bonding material is included between the mesh layer 28 panel and the substrate layer 27 panel. In some embodiments, a roll of the mesh material used for the panel of layer 28 is received from a vendor with a layer of hot melt bonding material pre-applied to one side. In such embodiments, the mesh material panel for layer 28 is placed onto jig 100 with the bonding material side facing down (i.e., toward substrate layer 27). In other embodiments, a separate layer of hot melt bonding material having the same shape as the layer 28 mesh material panel is placed over substrate layer 27 at the conclusion of step 1, and only a plain mesh material panel is added in step 5. In still other embodiments, a separate panel of hot melt bonding material between panels 27 and 28 is obviated through use of a substrate material having a prelaminated layer formed from a meltable material such as TPU.

Figure 4E:
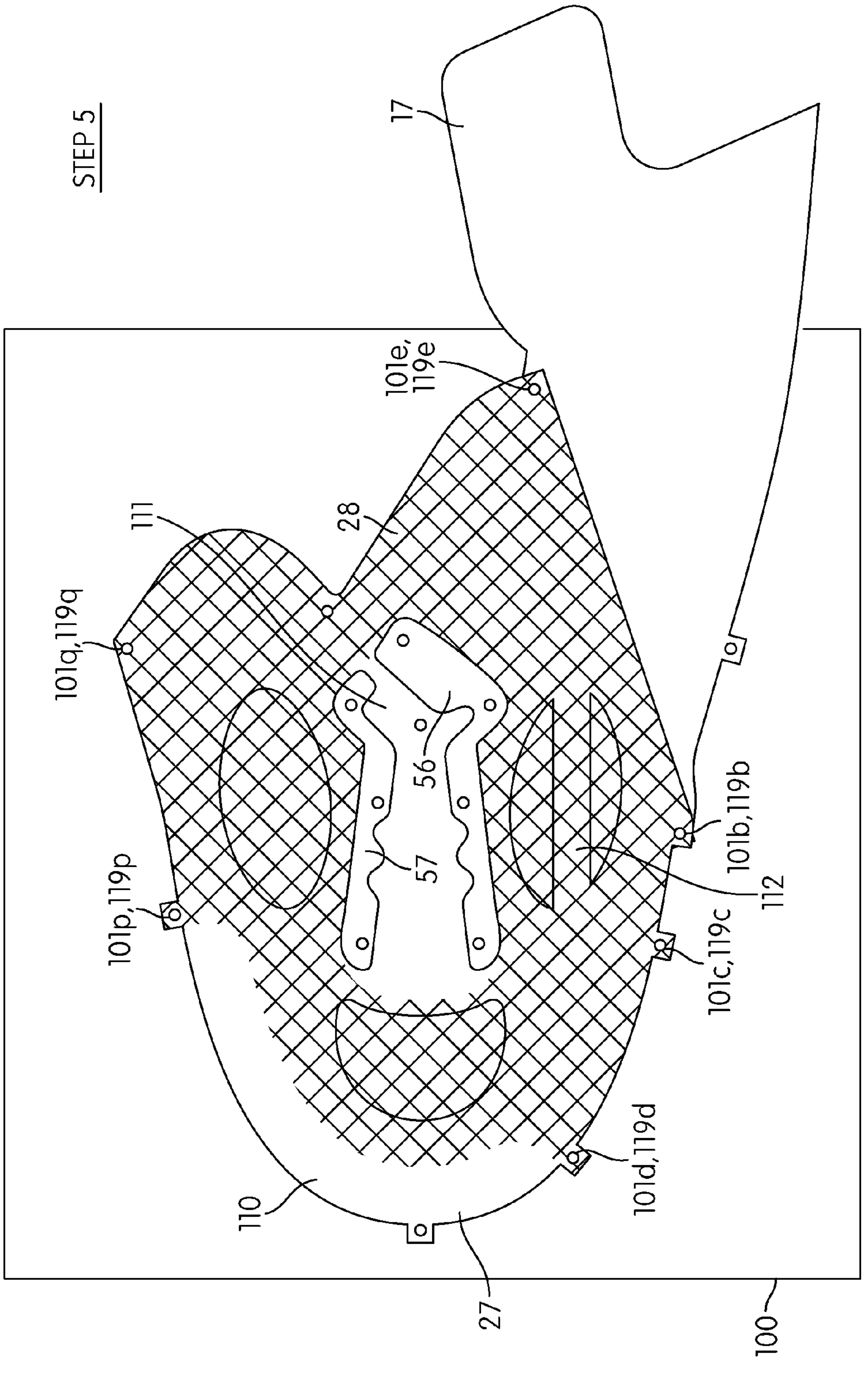
Figure 4F:
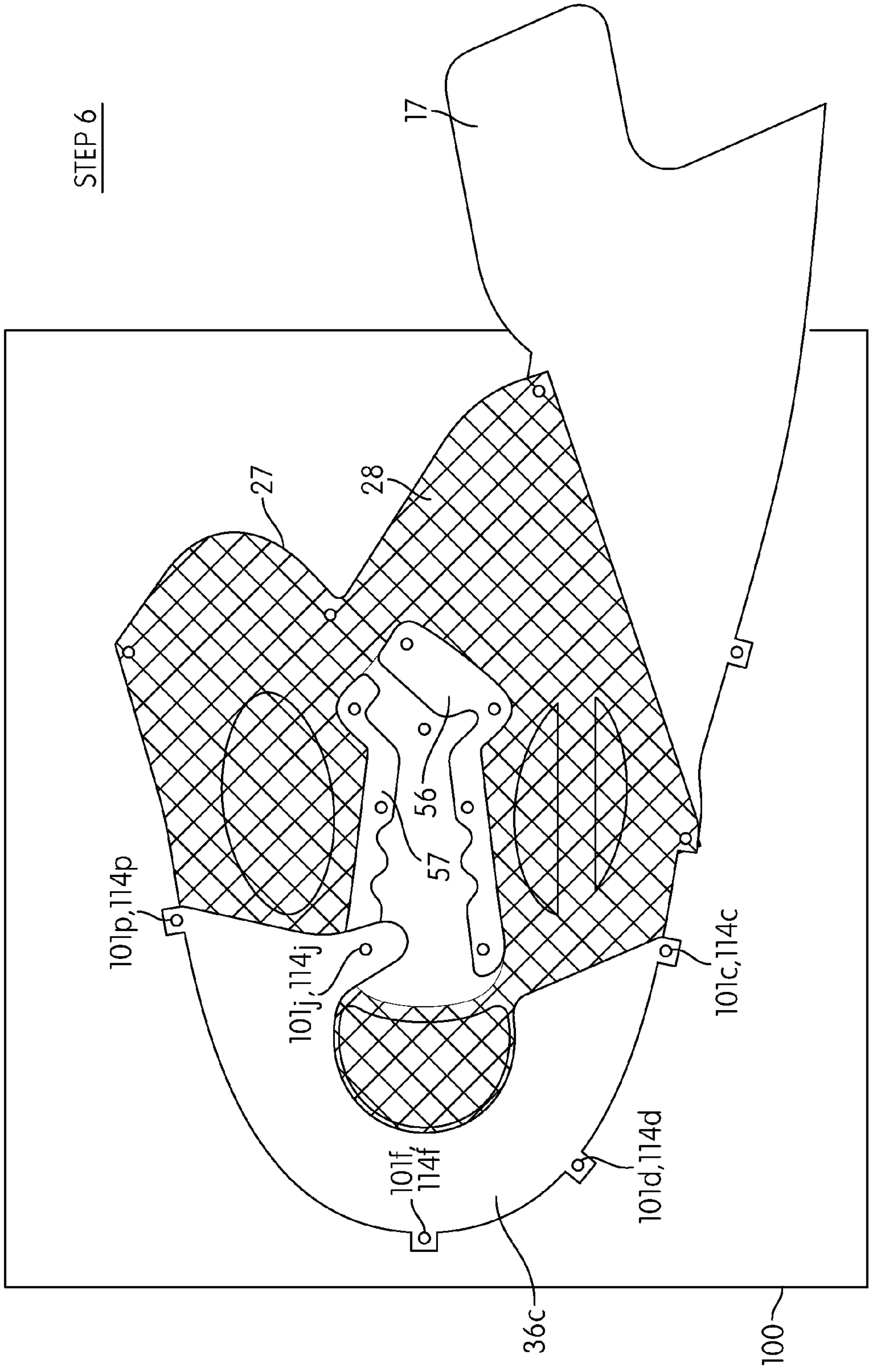
Figure 4G:
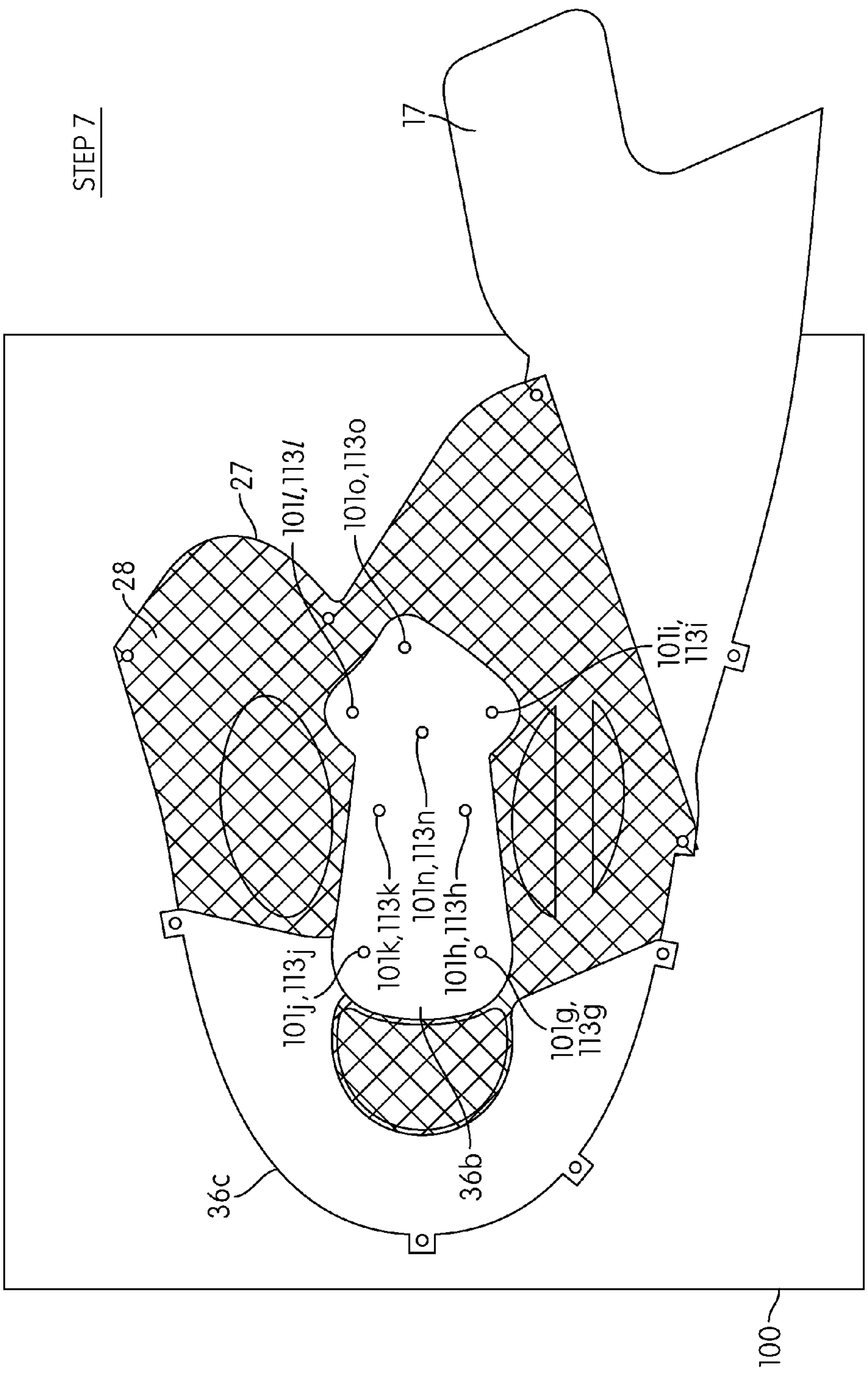
Figure 4H:
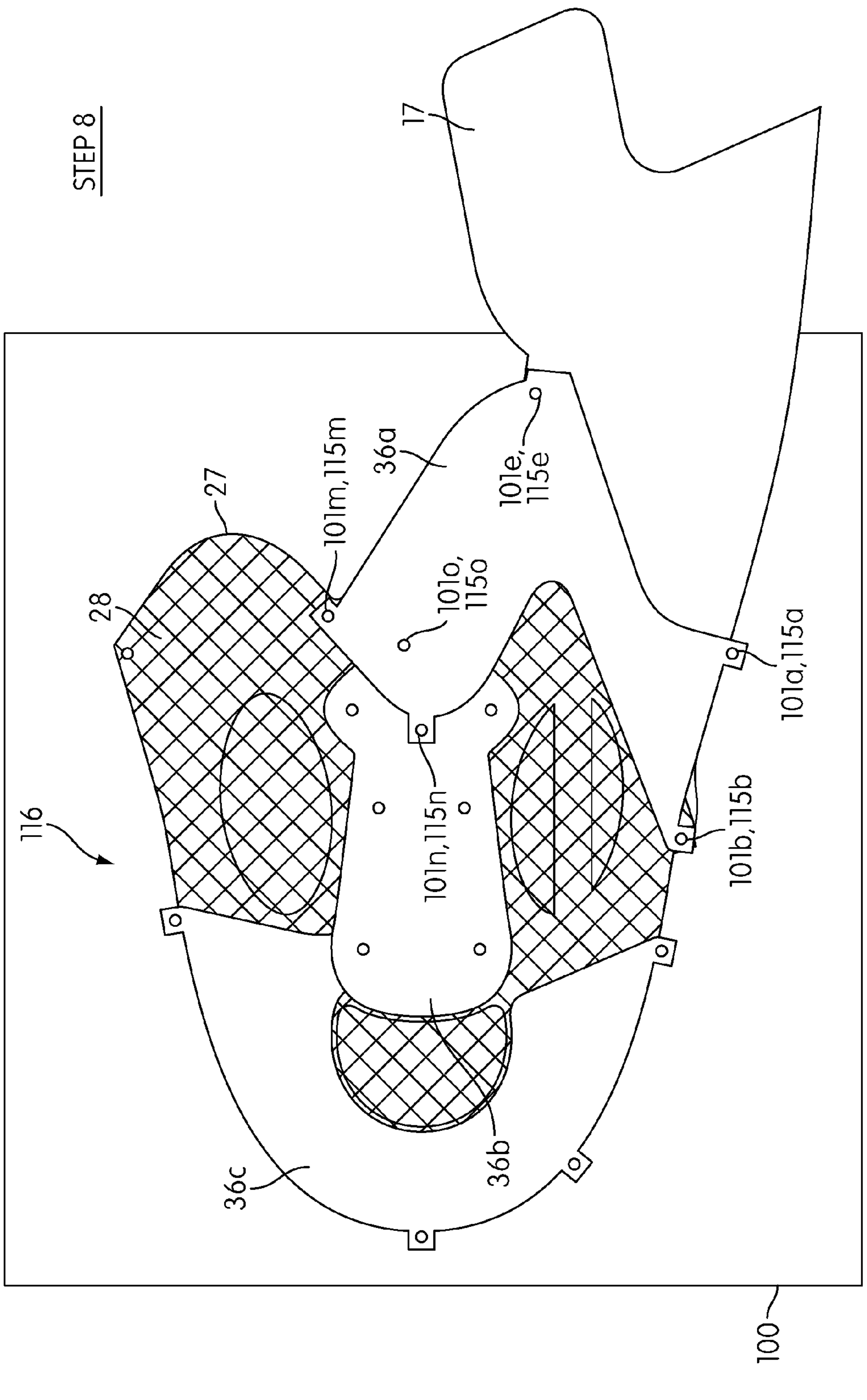
Figure 4I:
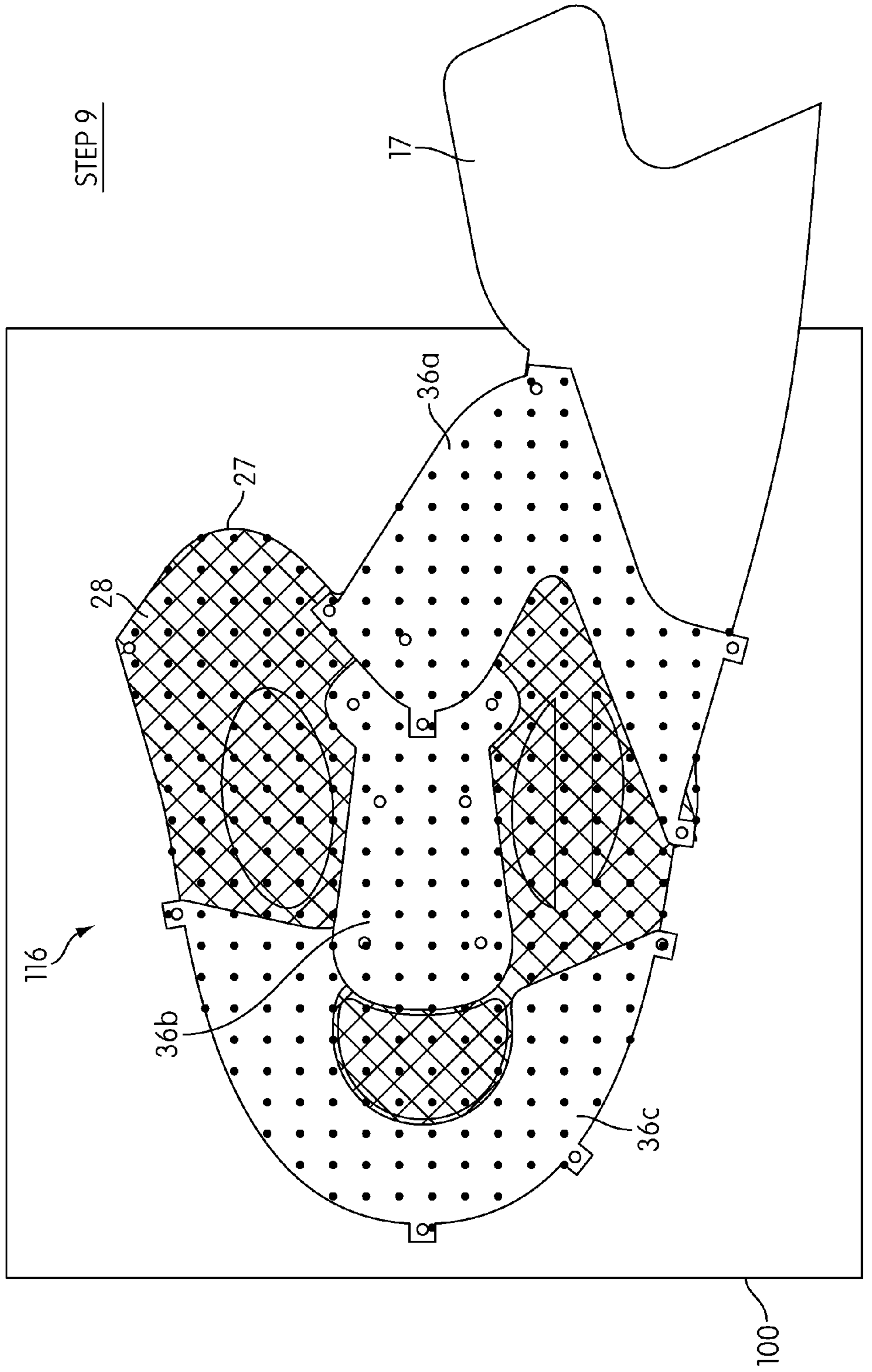

As seen in FIG. 4E, the mesh layer 28 panel does not completely cover the substrate layer 27 panel. For example, a region 110 of the substrate material panel (corresponding to the toe and lateral side forefoot regions of an upper in a completed shoe 10) is not overlapped by the mesh material panel. In this manner, a smooth surface of upper 11 can be provided for subsequent bonding to a toe cap or other external feature. A region 111 of the substrate layer 27 panel is similarly not covered by mesh material so as to provide a smoother interface between the substrate layer and reinforcements 56 and 57. Unlike material used for skin layers, reinforcements 56 and 57 are formed from a thicker material (e.g., nylon) that will not conform as readily to mesh layer 28 at the temperatures used in the pressing process. Although region 112 of substrate layer 27 corresponds to a region that will subsequently be covered by skin material panel 36*d* in such a manner so as not reveal an underlying mesh material layer, mesh layer 28 covers region 112 so that the added strength of the mesh material can be present in the portion of upper 11 to which region 112 will correspond in a completed shoe 10.

In step 6 (FIG. 4F), skin material panel 36*c* is attached to jig 100 by pushing holes 114*c*, 114*d*, 114*f*, 114*j* and 114*p* over pins 101*c*, 101*d*, 101*f*, 101*j* and 101*p*, respectively. Holes 114*c*, 114*d*, 114*f* and 114*p* are contained in extension tabs that will be trimmed away in a subsequent fabrication step. Panel 36*c* will form the skin material covering, e.g., the toe, medial forefoot and lateral forefoot regions on a completed shoe 10 (see FIGS. 1A and 1B). The side of panel 36*c* that is exposed at the completion of step 6 will face outward and away from the interior of a completed shoe 10. In some embodiments, a roll of the material used for panel 36*c* and/or other skin material panels is also received from a vendor with a layer of unactivated hot melt bonding material pre-applied to one side. In other embodiments, a separate layer of hot melt bonding material having the same shape as skin material panel 36*c* is placed between skin material panel 36*c* and previously positioned layers as part of step 6. In still other embodiments, one or more skin material panels are bonded to other layers by melting of the skin material during a hot pressing operation (described below) and subsequent solidification during cooling, and no separate bonding material is interposed between those skin material panels and other inwardly-located layers. As also seen by comparing FIGS. 4E and 4F, skin material panel 36*c* is assembled so as to be located over substrate layer 27 in region 110 where mesh material is not present.

In some embodiments, extra and/or higher strength bonding material and/or additional adhesives may be included in portions of a composite panel that will correspond to a toe region and/or to other forward regions of an upper of a completed shoe. This additional bonding may be desirable in embodiments where toe portions of an upper may experience significant stresses during various manufacturing operations (e.g., toe forming, lasting).

In step 7 (FIG. 4G), skin material panel 36*b* is attached to jig 100 by pushing holes 113*g*, 113*h*, 113*i*, 113*j*, 113*k*, 113*l*, 113*n* and 113*o* over 101*g*, 101*h*, 101*i*, 101*j*, 101*k*, 101*l*, 101*n* and 101*o*, respectively. The outer edges of panel 36*b* will face away from the interior of a completed shoe 10, and the remainder of panel 36*b* (together with portions of the underlying substrate material panel and mesh material panel) will be removed to create tongue opening 26. As with panel 36*c* in step 6, panel 36*b* is placed onto jig 100 with the outer side facing up, and a layer of hot melt bonding material is interposed between panel 36*b* and underlying elements.

Panel 36*a* of skin layer material is placed onto jig 100 in step 8 (FIG. 4H) by pushing holes 115*a*, 115*b*, 115*e*, 115*m*, 115*n* and 115*o* over pins 101*a*, 101*b*, 101*e*, 101*m*, 101*n* and 101*o*, respectively. Holes 115*a*, 115*b* and 115*n* are contained in extension tabs that will be trimmed away in a subsequent fabrication step. Panel 36*a* will form the skin material layer covering portions of the lateral midfoot and hindfoot regions on a completed shoe 10. As with panel 36*c* in step 6, a layer of hot melt bonding material can be interposed between panel 36*a* and underlying elements. The result at the conclusion of step 8 is a panel assembly 116 of upper elements that will ultimately become an upper shell that includes mesh composite panel 16 bonded to foxing panel 17.

In step 9 (FIG. 4I), elements of assembly 116 are tacked together by partially activating the hot melt bonding material layers in isolated locations. This partial activation can be performed in some embodiments using high frequency (HF) welding. For purposes of illustration, the resultant tacking is shown schematically in FIG. 4I as a series of dots distributed over the surface of the assembled elements that will form mesh composite panel 16. In practice, the actual locations at which heat is applied for tacking purposes may vary. Tack welding in step 9 can be performed using a handheld heat gun, or by briefly inserting jig 100 with assembly 116 into a press having a plate configured to accommodate pins 101*a* through 101*q*. In at least some such embodiments, the press conditions for the tacking step will depend on the particular hot melt selected, but will typically be between about 115° C. and about 125° C., with pressing for approximately 30 to 35 seconds at approximately 2 to 6 kg/cm$^2$ of surface pressure.

Figure 4J:
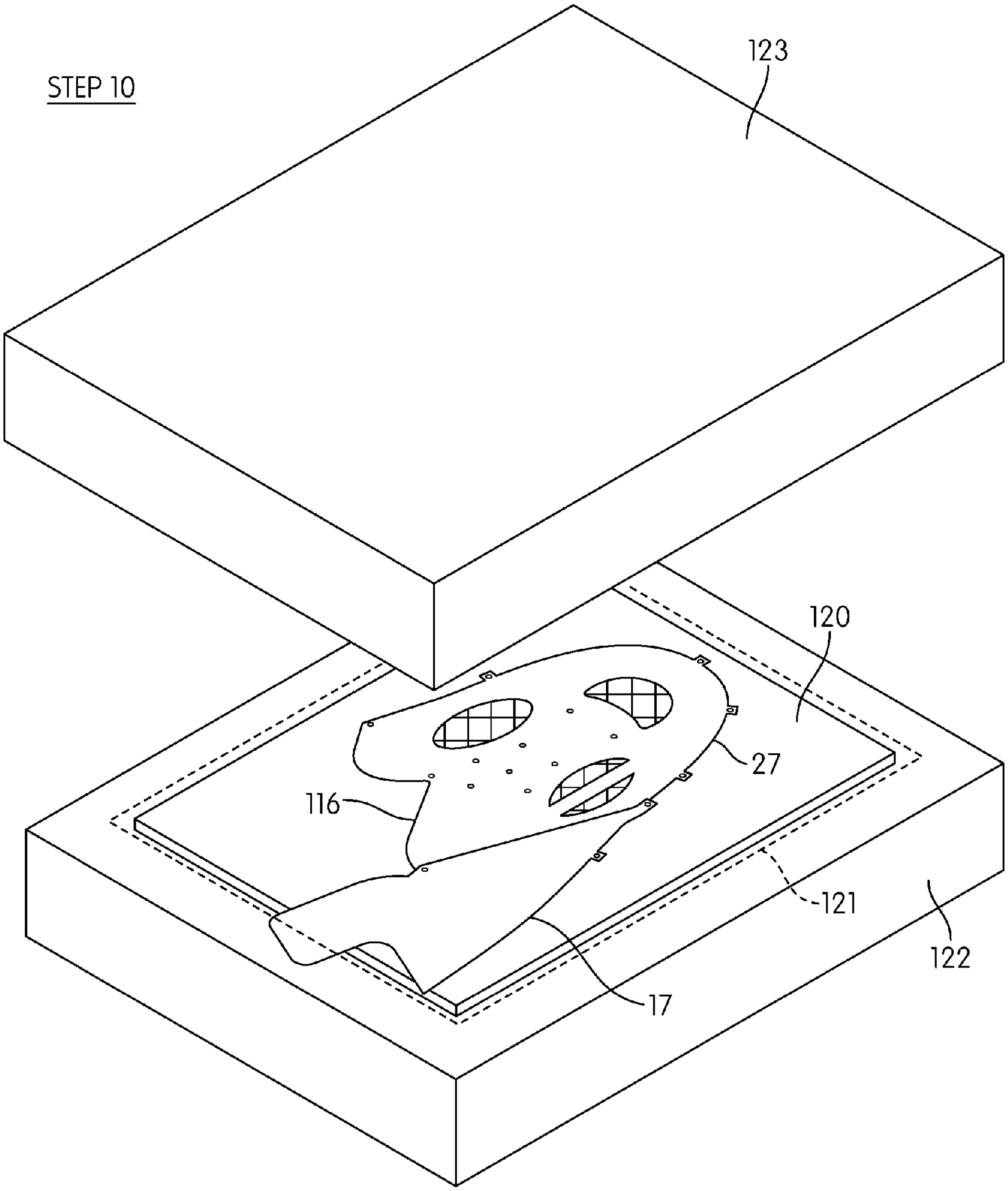

The tacking of step 9 results in a partial bonding so that the individual elements of assembly 116 will remain in an assembled condition when assembly 116 is removed from jig 100. In step 10 (FIG. 4J), tacked assembly 116 is heat pressed so as to fully bond the individual elements together. In particular, tacked assembly 116 is removed from jig 100 and placed onto heat-transferring silicone pad 120. Assembly 116 is turned upside down so that the side facing upward at the conclusion of steps 8 and 9 is positioned to face downward toward pad 120. After a sheet of release paper 121 is placed over assembly 116, heated platens 122 and 123 are brought together and pressure applied to compress assembly 116. For simplicity, only the outer edges of release paper 121 are shown in FIG. 4J. In other embodiments, panel assembly 116 may be placed so that the inner side is facing lower platen 122, with release paper 121 inserted between the inner side of assembly 116 and platen 122, and with pad 120 between the outer side of assembly 116 and upper platen 123.

In at least some embodiments, silicone pad 120 is first preheated to 110° C. prior to the pressing operation of step 10. Typical process parameters for the hot pressing operation of step 10 are upper and lower press platen temperatures of 120° C., press pressure of approximately 20 kg/cm$^2$, and press time of 30 to 40 seconds. However, the process parameters for a particular shoe upper will depend on the combination of materials and on the panel arrangement applicable to that upper. In some embodiments, the press time for step 10 can be determined by assembling panels for a particular upper design into a test panel assembly, with thermocouple temperature probes inserted at one or more locations within the test panel assembly. The test panel assembly is then pressed between 120° C. press platens until the temperature probes indicate that the internal assembly temperature has reached a desired melting point for the skin materials in the test panel assembly. If desired, the press time can be adjusted upward or downward by adjusting the press platen temperature. The desired melting point temperature for a particular skin material can be determined by using differential scanning calorimetry (50° C./min. scan rate) to find the temperature associated with the maximum heat transfer for that skin material. Press pressure can be adjusted upward if there is insufficient bonding between layers in one or more test panel assemblies or adjusted downward if there is excessive (and undesired) “flattening” of surface features.

After the heated pressing of step 10, assembly 116 is “cold” pressed between room temperature press platens to continue to the bonding process and to enable melted TPU to set while under pressure so as to improve bonding. As used herein, “room temperature” is a temperature between approximately 20° C. and approximately 30° C. By cold pressing assembly 116 immediately after the heated pressing of step 10, individual elements are held in contact while the hot melt bonding material and skin layers solidify, thereby preventing materials rebounding from one another after the initial heated pressing. Without a subsequent cold pressing, for example, a skin layer element in at least some embodiments will not conform to an underlying mesh layer so as to show the mesh pattern on the outer side of the skin layer.

Figure 4K:
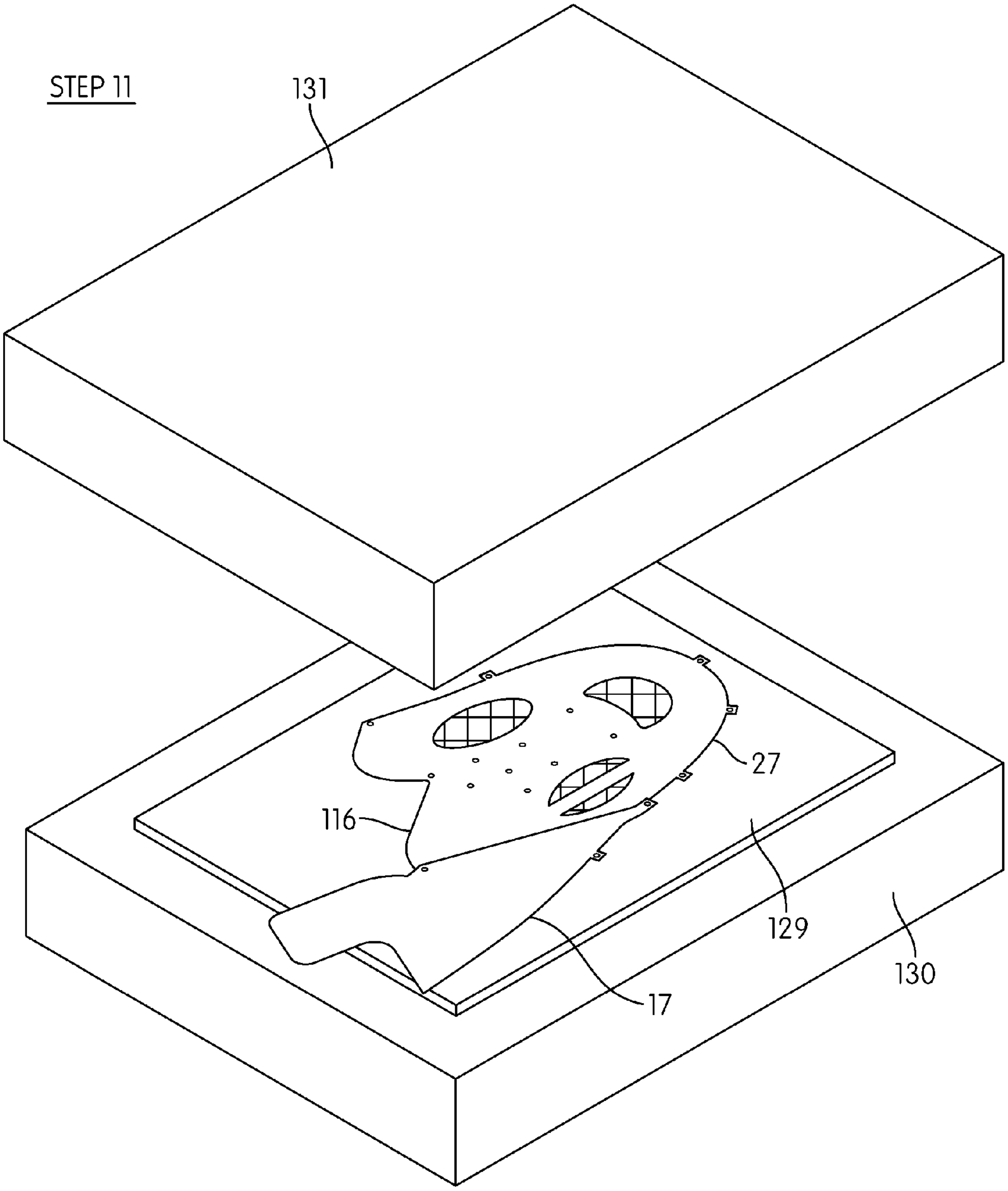

FIG. 4K shows cold pressing in step 11, which immediately follows step 10. After assembly 116 is removed from heated press platens 122 and 123 (FIG. 4J) and release paper 121 is taken off, assembly 116 is placed on silicone pad 129 between cold platens 130 and 131. A different silicone pad can be used in step 11 so as to avoid residual heat remaining in pad 120 at the completion of step 10. The same face of assembly 116 that faced silicone pad 120 in step 10 faces silicone pad 129 in step 11. In at least some embodiments, platen 130 and/or 131 may include internal water lines or another mechanism to maintain the platens at a desired temperature. Assembly 116 is then pressed between platens 130 and 131. Typical process parameters for the cold pressing operation of step 11 are room temperature (e.g., 25° C.) upper and lower press platens, press pressure of approximately 30 $kg/cm^2$, and press time of approximately 30 seconds.

Heat-conductive silicone pads 120 and 129 used in steps 10 and 11, respectively, are at least partially compressible and conformable to the surface features of panel assembly 116. This permits compression of the panel assembly to bond the various layers without overly flattening the surface features. This also allows formation of a profile, such as is shown in region C of FIG. 3, in which skin material conforms to an underlying layer of mesh material so as to reveal contours of that mesh material. In at least some embodiments, each of silicone pads 120 and 129 has a Shore-A hardness of between 15 to 30 and a thermal conductivity of approximately 0.3 Watts. However, pads with different thermal conductivities can be used by adjusting press platen temperatures to achieve a desired internal temperature in the pressed materials.

Figure 5A:
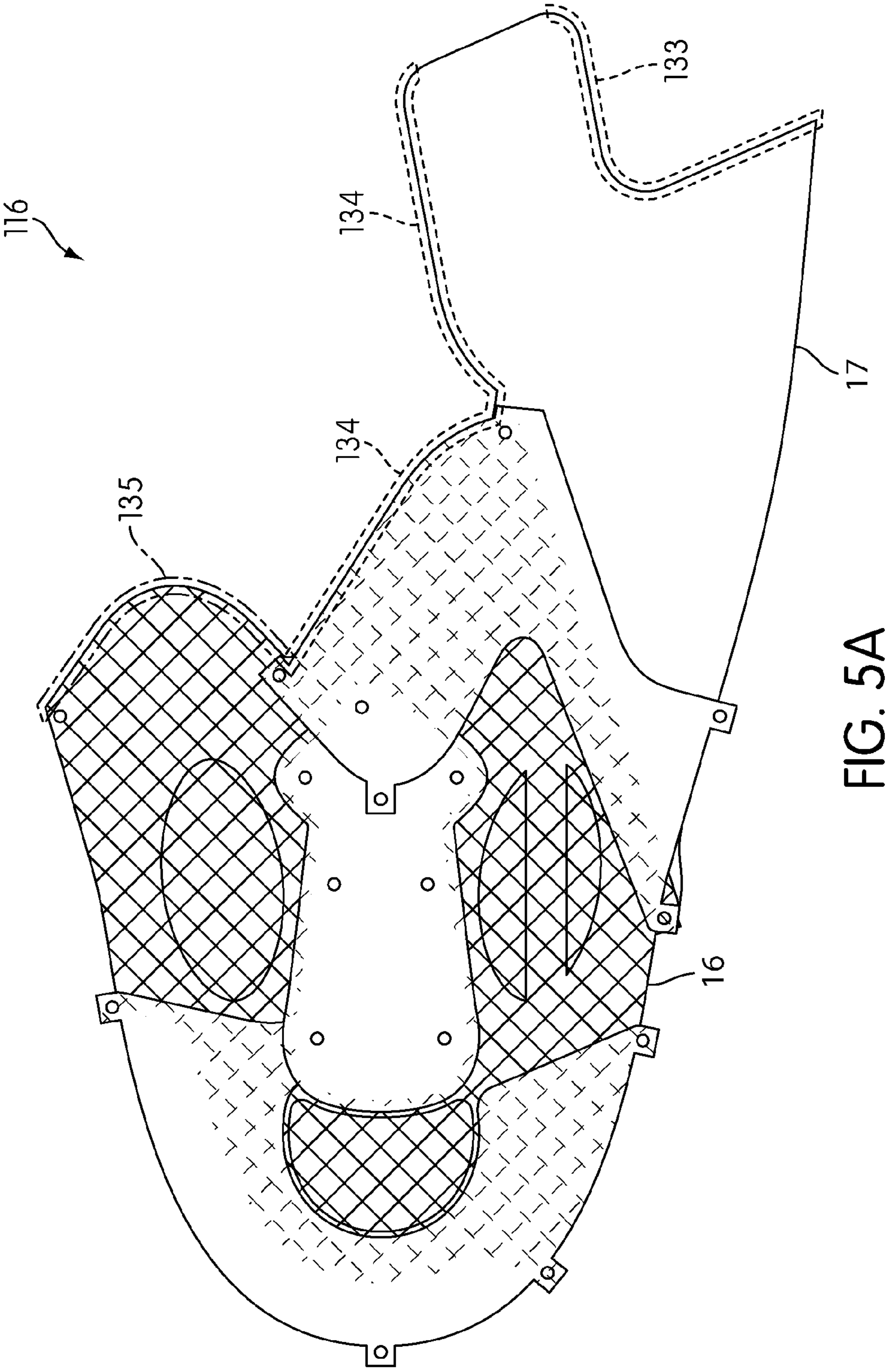
FIGS. 5A through 5G show additional operations in a process, according to at least some embodiments, to fabricate an upper for the shoe of FIGS. 1A and 1B.
Figure 5B:
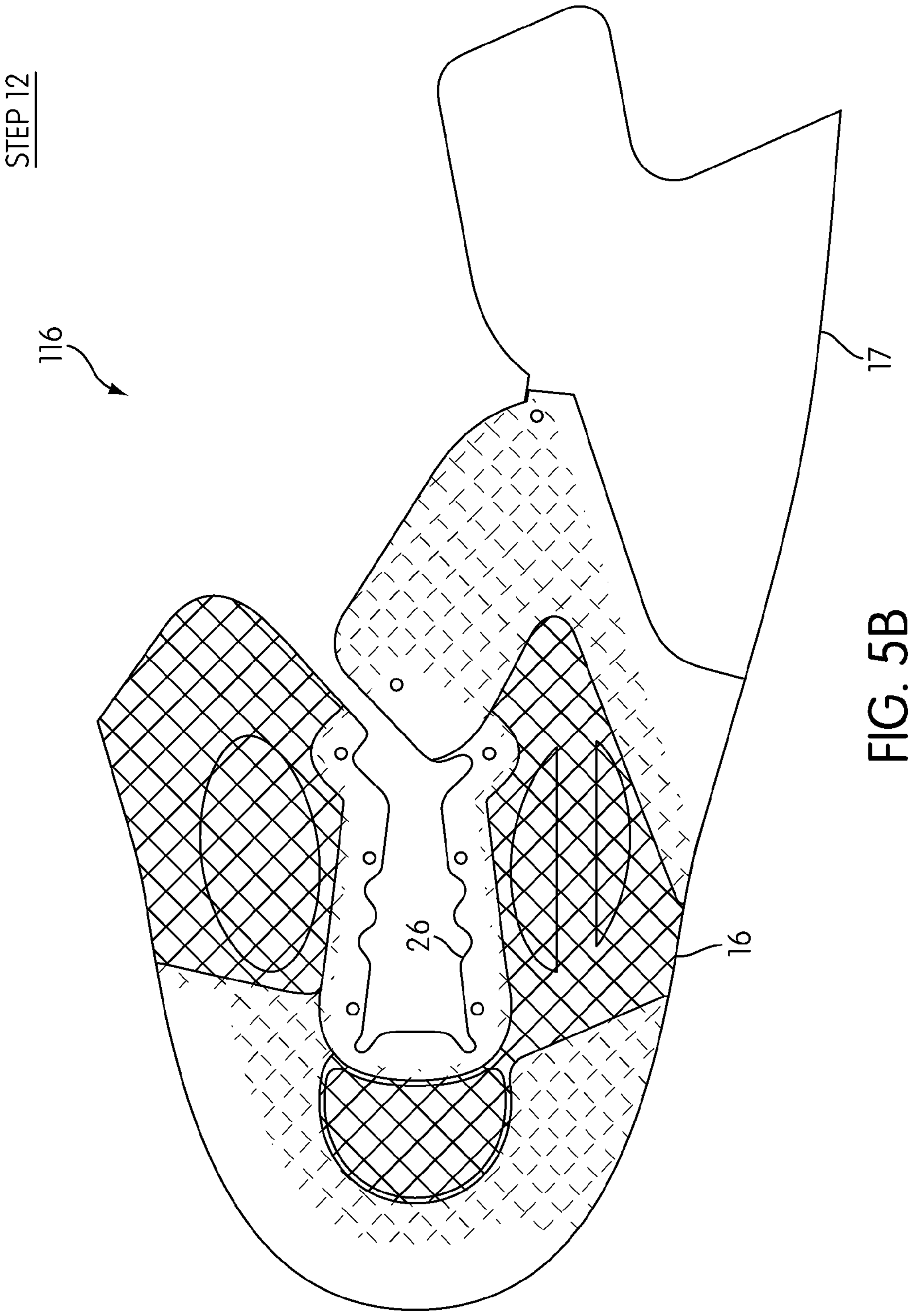
Figure 5C:
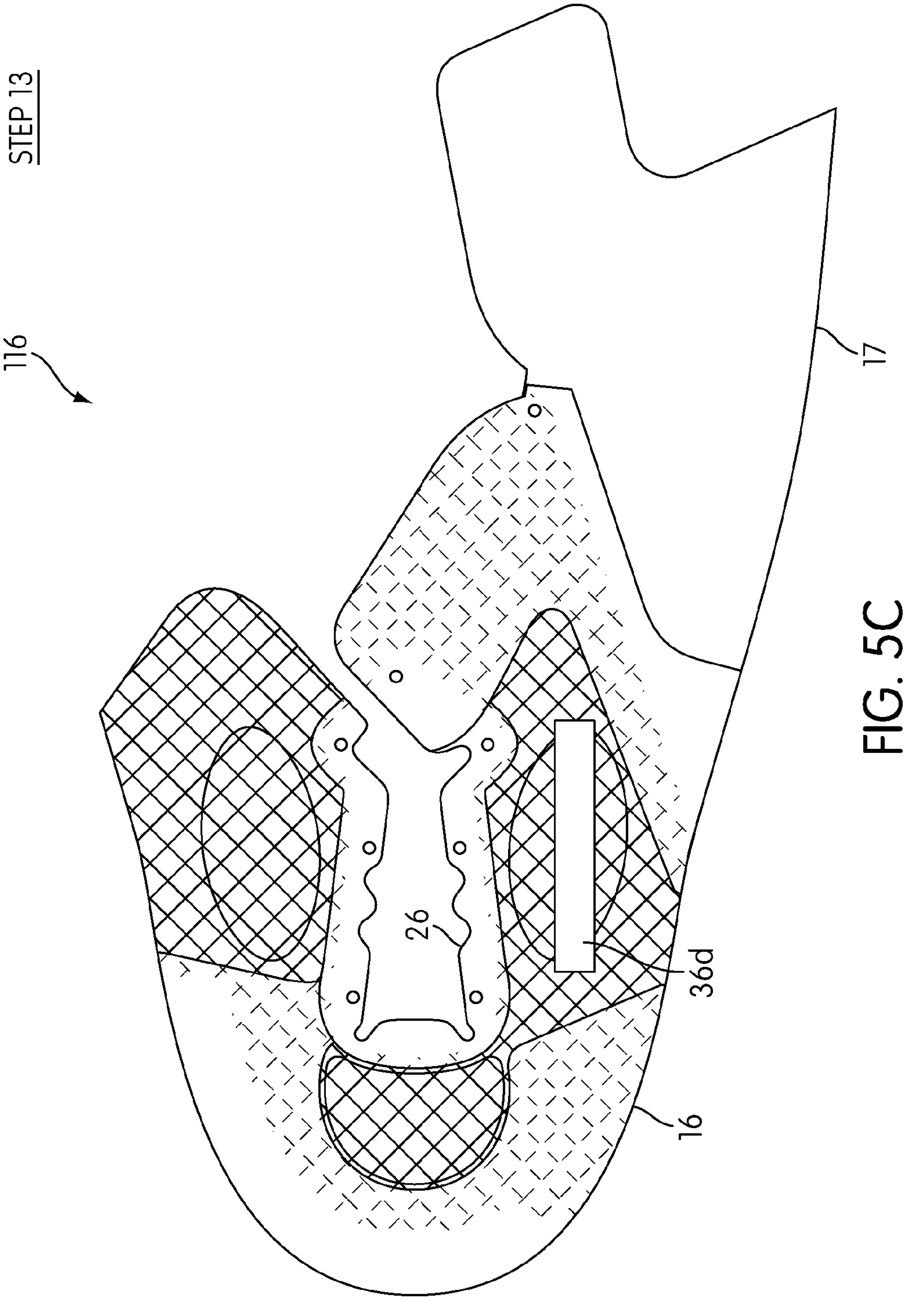

At the completion of step 11, tacked assembly 116 has been transformed into a fused unibody shell that includes mesh composite panel 16 and foxing panel 17. FIG. 5A shows fused unibody upper shell 116 that results from the completion of steps 1 through 11 of FIGS. 4A1-4K, and that is ready for finishing operations. Edges 133, 134 and 135 are marked in FIG. 5A and will be further discussed below. In step 12 (FIG. 5B), tongue opening 26 is cut, extension tabs on the outer edges of composite panel 16 are trimmed away, and lacing eyelets punched. In step 13, (FIG. 5C), skin layer element **36*d* is applied by hot pressing combined with HF welding, but without a cold pressing step, so that skin layer element 36*d* will have a different texture than other portions of upper 10. In particular, a tool (not shown) having the shape of element 36*d* is applied to unibody upper shell 116 on the location where panel 36*d* is to be placed. HF welding heat is then applied through that tool to flatten the region of the mesh material in layer 28 under the tool. Element 36*d* is then placed in the flattened region with an interposed layer of hot melt bonding material and HF welded in place using a heating element (e.g., formed from copper, brass, aluminum or other conductive material) in the shape of the desired melt pattern at a temperature, pressure and time appropriate for the materials in use. In some embodiments, element 36*d* may be in the shape of a logo or other indicia that is associated with a manufacturer of the shoe, and a different texture for element 36*d* may be desired to offset the logo from other portions of the shoe upper or for some other aesthetic purpose. In embodiments where a different texture for element 36*d* is not desired, skin layer element 36*d* can be added in a step inserted somewhere between steps 5 and 9 in the process flow of FIGS. 4A-4K, and then heated- and cold-pressed with other elements when forming upper unibody shell 116**.

Figure 5D:
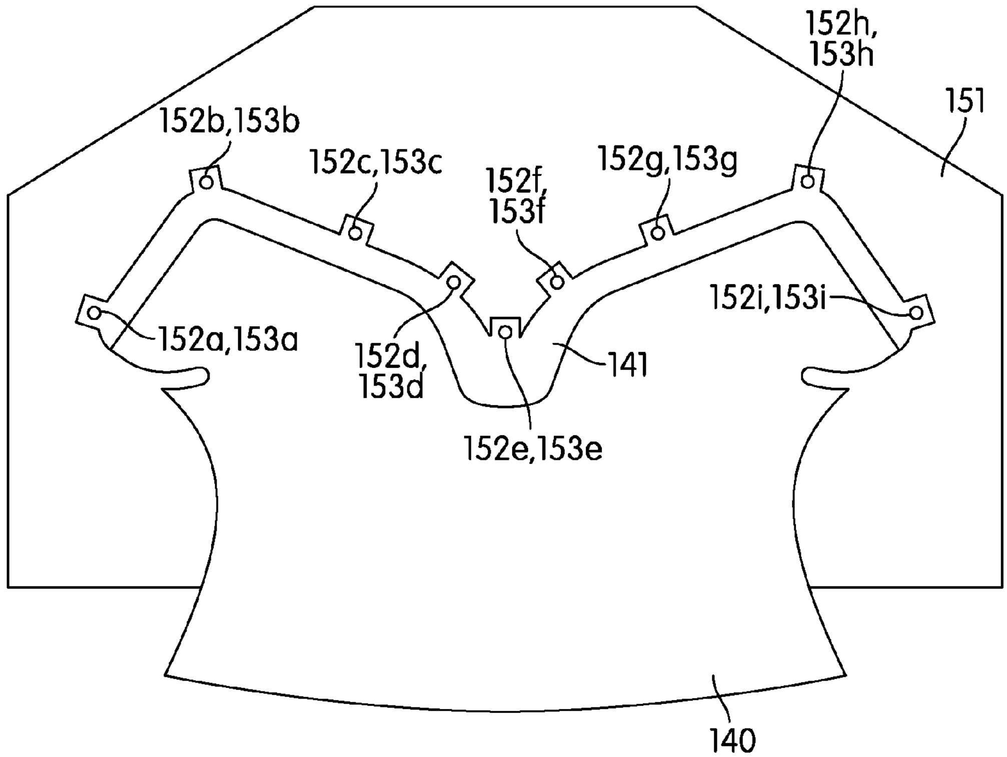
Figure 5E:
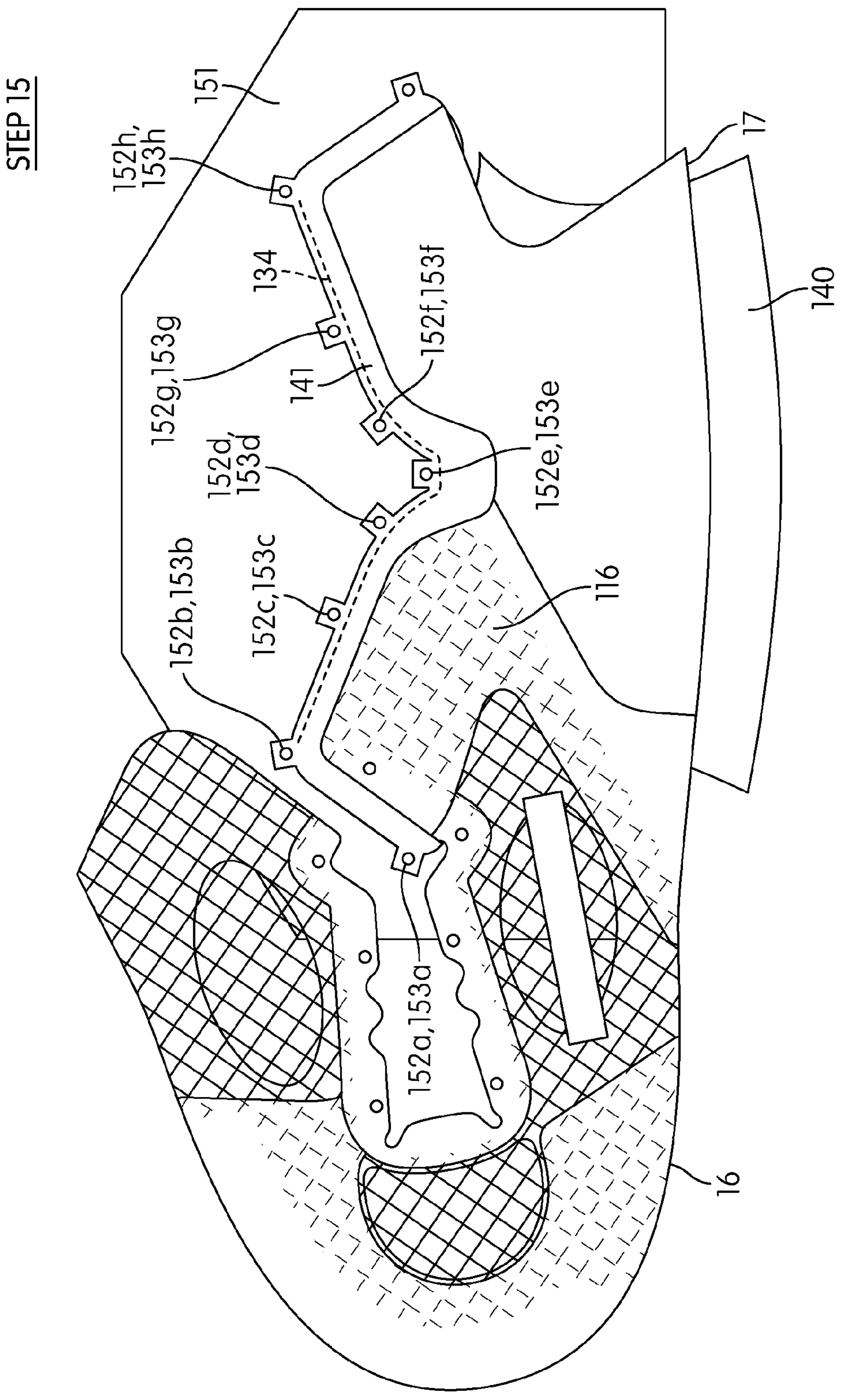
Figure 5F:
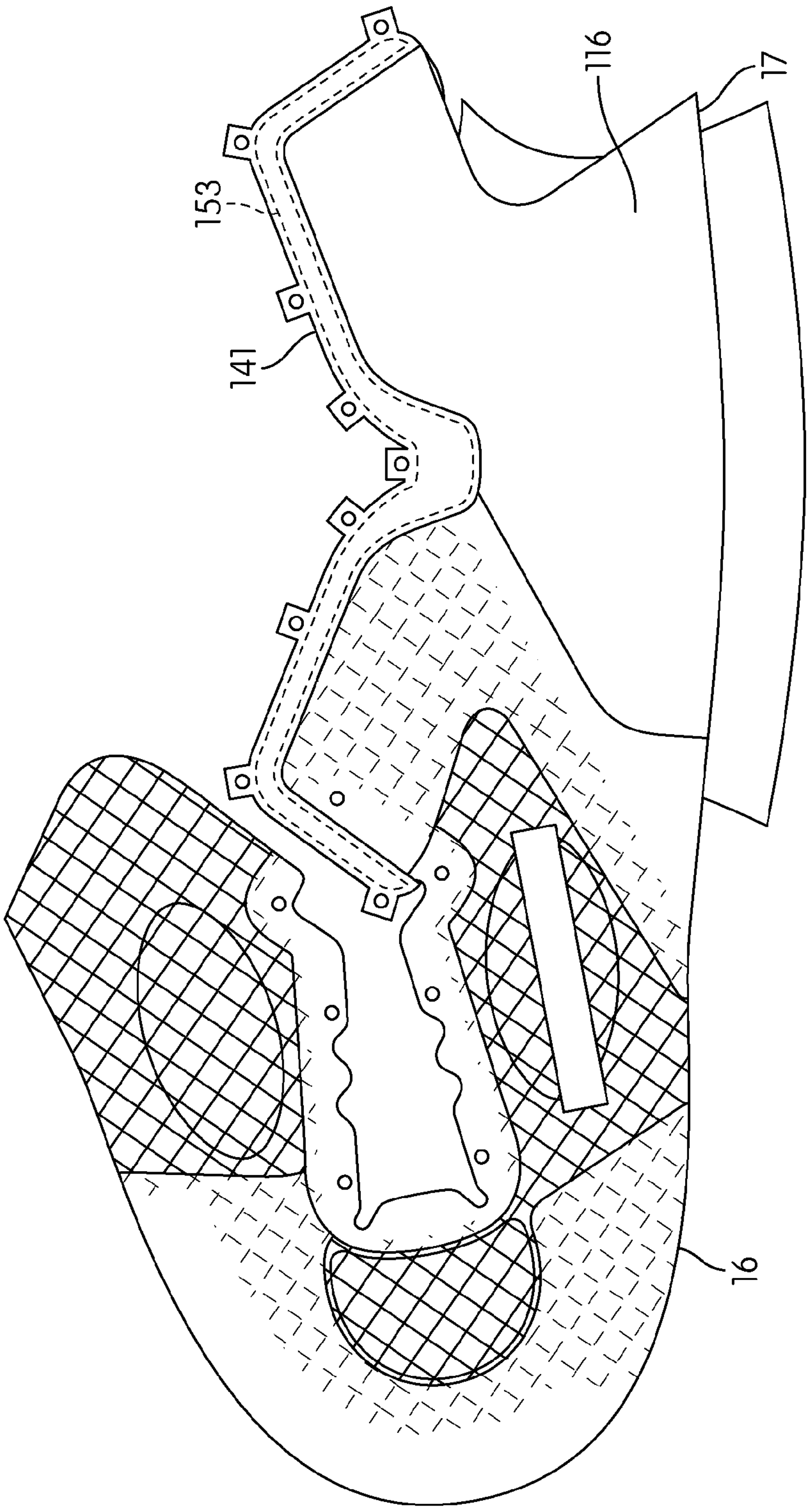

In step 14 (FIG. 5D), a foam element 140 with attached collar element 141 is placed onto a second jig 151 by inserting holes **152*a* through 152*i* over corresponding pins 153*a* through 153*i* on jig 151. Collar element 141 forms a lip that overhangs an upper edge of foam element 140. In some embodiments, collar element 141 can be formed from a folded-over section of material having an inverted "U" cross-section, with one leg of that "U" attached to the inside upper edge of foam element 140 and the other leg overhanging foam element 140 on the outside of that upper edge. Materials for foam element 140 can include open cell PU foam, and materials for collar element 141 can include synthetic suede. In step 15 (FIG. 5E), edge 134 of unibody upper shell 116 (see FIG. 5A) is inserted under the lip of collar element 141. In step 16 (FIG. 5F), a copper HF welding tool (not shown) having a shape corresponding to collar element 141 (or to a portion of collar element 141) is pressed onto collar element 141 and heat applied (at a temperature, pressure and time appropriate for the materials in use), thereby bonding shell 116, foam element 140 and collar element 141 along the HF weld 153**.

Figure 5G:
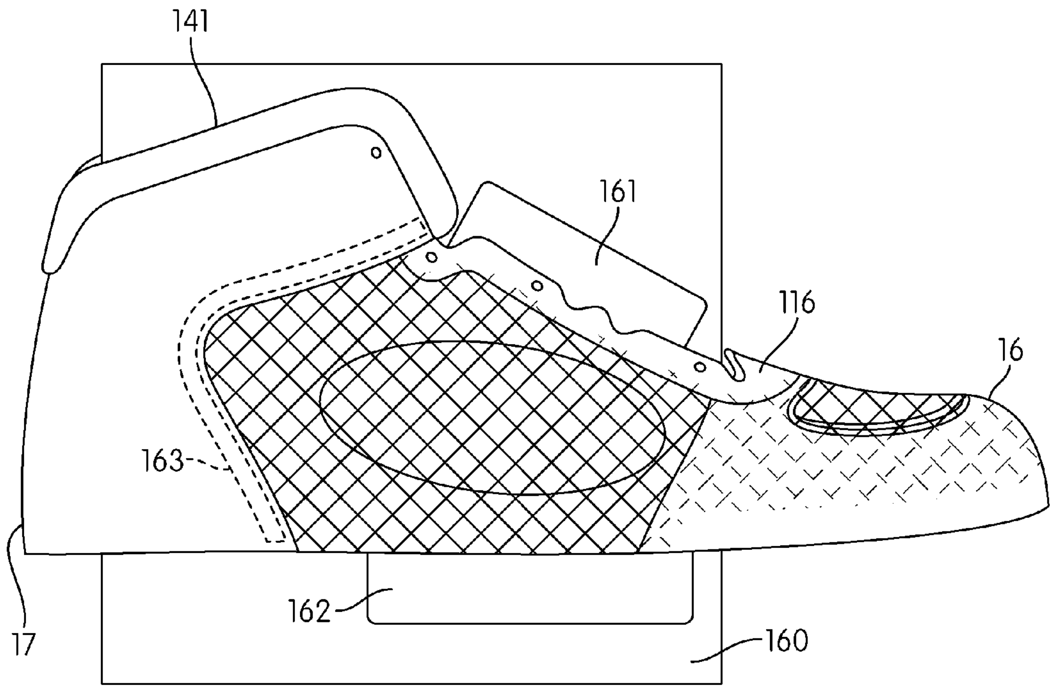

In step 17 (FIG. 5G), regions of unibody upper shell 116 adjacent edges 133 and 135 (see FIG. 5A) are joined to transform shell 116 into a three-dimensional upper shape. Prior to step 17, extension tabs on collar 141 and excess portions of foam element 140 are trimmed. As part of step 17, the portion of panel 16 that includes edge 135 is placed into a jig 160 having rails 161 and 162 that conform to the shape of panel 16 along edges adjacent to edge 135 and that hold shell 116 in place. The remainder of shell 116 (with attached foam element 140 and collar 141) is then wrapped under and around the reverse side of jig 160 so as to place edge 133 over edge 135. An HF welding tool (e.g., formed from copper or other conductive material) having a shape corresponding to the overlapped portions adjacent edges 133 and 135 is pressed onto folded-over panel 17 and heat applied (at a temperature, pressure and time appropriate for the materials in use), thereby bonding regions of shell 116 adjacent edges 133 and 135 along the HF weld 163.

After completion of step 17, the three-dimensional shell 116 (with attached collar 141 and foam element 140) may undergo additional finishing prior to bonding to midsole 42 (FIGS. 1A and 1B). In some embodiments, the toe portion of mesh composite panel 16 is heated and applied to a shaping form so as to obtain a desired toe region shape. In some embodiments, the toe portion of the three-dimensional shell is heated to approximately 80° C. for approximately 20 seconds. The heated toe portion is then pressed onto a shaping die to obtain the proper toe shape, with vamp gathering then performed during a cooling step at approximately −4° C. for approximately 30 seconds. A plastic counter may be inserted between foxing panel 17 and foam 140 in the heel region and stitched or otherwise fastened in place. The tongue and/or a bootie or other type of liner is attached, and upper 11 is completed by stitching a Strobel in place around the lower edges of the upper panel while the upper is on a last.

Operations similar to those described above can be used to create a tongue for attachment to shell 116. In particular, a tongue can also be formed by positioning one or more layers on jig, tacking those layers together, and then hot and cold pressing those layers to form a mesh composite panel in the shape of a tongue. The mesh composite of the tongue can have similar materials as are described above (e.g., a substrate, mesh and skin layers) or other combinations of materials. For example, a tongue composite panel can be formed to include a curved composite panel shaped to conform to the top of a wearer's foot and/or to include a padded element that is molded into a desired shape on the outer (or inner) side of the tongue composite. Elements for such a tongue composite could include a textile layer and a moldable foam padding layer. Instead of a using a set of flat press platens such as is shown in FIGS. 4J and 4K, a pair of curved platens can be used to achieve the desired curvature for the tongue. One of those curved platens could further include a mold cavity that is used to form the padded element into the desired shape.

Additional Embodiments

Shoe 10 and the fabrication operations described above are merely examples of shoes and fabrication processes according to various embodiments. As indicated above, the shape and arrangement of a substrate layer, mesh layer and/or skin layer can vary in different embodiments, as can the number, size and arrangement of ventilation openings in a substrate. Moreover, different types of substrate materials, mesh materials and/or skin materials could be employed for different shoe types. For example, a running shoe may utilize a mesh material that is lighter and/or has a different weave pattern than a mesh material used for a basketball shoe. Indeed, a single shoe could include more than one type substrate material and/or more than one type of mesh material and/or more than one type of skin material. In some embodiments, a skin layer might be omitted.

Certain embodiments may incorporate more than one type of mesh material in a single upper in various ways. For example, an upper according to some such embodiments may have a first type of mesh material in one portion of the upper and a second type of mesh material in a different portion. The first type of mesh may be of lighter weight and have larger openings so as to increase ventilation, and may placed in locations that will correspond to portions of an upper that will be subject to less severe forces. The second type of mesh material may have a denser weave and/or be formed from a higher strength material, and may placed in locations that will correspond to portions of an upper that will be subject to more severe forces. More than two types of mesh material can be used in an upper, and different mesh material types can be combined for other reasons (e.g., to achieve a desired aesthetic, to reduce unit cost, etc.).

Some embodiments can include uppers in which there may be multiple mesh layers. In some cases, one mesh material panel may overlap another mesh material panel in an area where extra reinforcement is desired. In still other cases, separate mesh material panels may not overlap one another, and may be located at different layers of an upper. For example, a first panel of mesh material could be overlaid on a substrate material layer, a second panel of substrate material (or other type of material) overlaid onto a portion of the first panel, and a third panel of mesh material overlaid so as to overlap a portion of the second panel. In some embodiments, mesh material panels may be located at the same layer but not overlap one another.

Additional types of materials can be added to an upper shell in additional embodiments. Such additional materials can be included so as to form an outrigger, a shank, a heel cup, a toe cap, etc. For example, a panel of rigid nylon or other polymer could be included in the toe region of a composite panel and shaped as part of the toe shaping process described above. As another example, a counter panel formed from nylon or other type(s) of polymer could be included, during the process of assembling upper panels on an assembly jig, in a location that corresponds to the sides and rear of a wearer's heel in a completed shoe. Those counter panels can then be hot melt bonded to the inner side of panel 17 during the pressing operations.

Figure 6A:
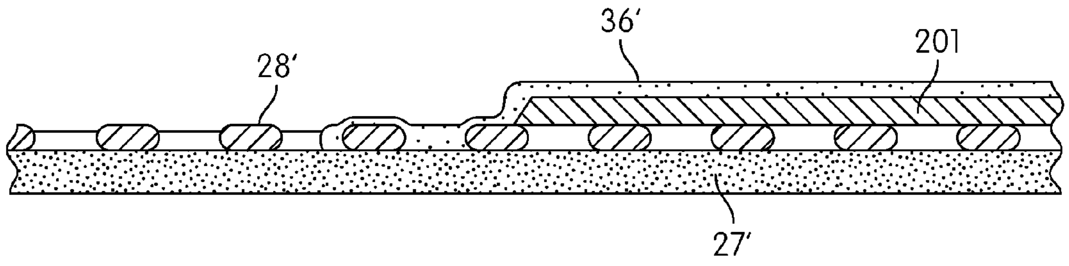
FIGS. 6A and 6B show examples of composite upper portions, according to some additional embodiments, that include an additional layer for reinforcement, support and/or padding.
Figure 6B:
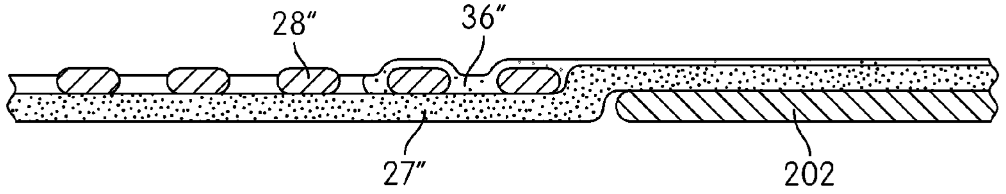

FIGS. 6A and 6B show examples of composite upper panel portions, according to some additional embodiments, that include an additional layer for reinforcement, support and/or padding, dimensional stability, etc. In FIG. 6A, a layer 201 of additional material is interposed between a layer 28' of mesh material and a layer 36' of skin material. The material of layer 201 is bonded to the skin material of layer 36' and to the layer of mesh material 28' with interposed layers of hot melt bonding material (not shown). In FIG. 6B, a layer 202 of additional material is located on an inner side of a substrate layer 27" and bonded to that substrate layer with an interposed layer of hot melt bonding material (not shown). Material in layer 201 or in layer 202 could be the same material used in a substrate layer, could be a foam padding material, could be a plastic material that is rigid or semi-rigid, could be a rubber-like material, or could be a different type of material. Also shown in FIG. 6B are a mesh material layer 28" and a skin material layer 36". Examples of other materials that could be used for layer 201 or 202 to provide reinforcement and/or support include (but are not limited to) materials previously described herein and combinations thereof. Other materials that permit sufficient inter-layer bonding, have limited stretch and have appropriate heat-setting properties can also be used. Multiple layers of additional materials such as are shown for layers 201 and 202 and/or combinations of materials (e.g., a foam panel and a rubber panel) could be employed. A composite panel having a construction such as indicated in FIGS. 6A and 6B, as well as other types of composite panels having added reinforcement/support materials, can be fabricated using assembly, tacking and hot/cold pressing operations similar to those described herein.

In some embodiments, an upper shell formed according to the above described steps can include extensions in one or more panels (e.g., panel 17 of FIG. 4A1 et seq.) near regions that will correspond to the heel of a wearer. After completion of step 17 (FIG. 5G), the extensions can then be wrapped around the bottom of the heel region to form a double-lasted heel cup.

In certain embodiments, additional panels and/or panels having extensions can be included in a panel assembly so as to form a carrier layer for a foam inserts. For example, such extensions can be included in regions of substrate material panels, foxing panels or other panels that can be wrapped under the bottom of a three-dimensional upper (after step 17 of FIG. 5G) so as to form a shelf for inclusion of foam padding that will cushion the bottom of a wearer's foot. Various types of foam materials can be used in these and other embodiments, including but not limited to foam materials as described in commonly-owned U.S. patent application Ser. No. 11/752,348, filed May 23, 2007, and incorporated by reference herein. One example of a shoe comprising a double-lasted upper that forms a shelf for foam padding is described below in connection with FIGS. 10A through 16.

Figure 7:
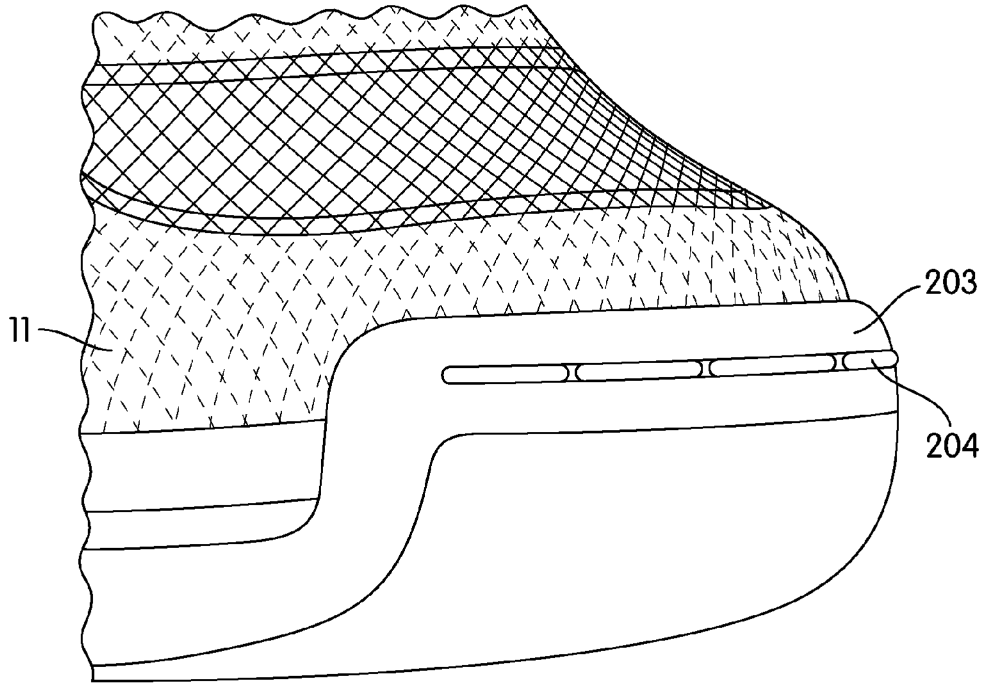
FIG. 7 shows a toe cap extension in a shoe according to some embodiments.

In some embodiments, and as shown in FIG. 7, a sole can include a toe cap extension 203. As indicated above, mesh material 28 can be omitted from the composite portion of a panel that corresponds to the region over which toe cap 203 will be located, thereby providing a smooth surface onto which toe cap 203 could be bonded. Alternatively (or additionally), a reinforcing stitch 204 can be included to secure toe cap 203 in place. In still other embodiments, a toe cap can be formed by adding an additional layer of substrate material, a relatively thick layer of abrasion resistant plastic (e.g., polyurethane), or other material in the region that will correspond to the toe of the finished upper. In some such embodiments, mesh material is omitted in the toe region similar to the embodiment described in connection with FIGS. 4A1 through 5G, while in other embodiments the mesh material may extend over the entire toe region. In a similar manner, an additional layer of substrate material, a relatively thick layer of abrasion resistant plastic (e.g., polyurethane), a shock absorbing material (e.g., Phylon (compressed ethylene vinyl acetate foam)) or other material can be included in regions of an upper that will correspond to the lower heel and/or edges of a wearer foot in a finished shoe.

In at least some embodiments mesh material can also be omitted from portions of a composite panel that correspond to the regions where the upper will join a midsole. In this manner, a smoother transition from upper to midsole or other tooling can be achieved. Alternatively, a layer of foam or other moderator can be interposed between the lower edge of an upper and a midsole.

In some embodiments, a substrate material panel can be pre-processed so as to create an indentation in the form of a product name, a logo, or other shape. A skin layer material panel is then placed over the substrate material panel so as to completely cover the indentation and can be melted during the hot pressing operation so as to flow into and completely cover the indentation. The indentation can be created during a pre-processing operation using an HF welding tool having the desired shape, using laser cutting, or by other desired method. In certain embodiments, the skin layer panel used to cover the indentation may be thinner than skin layer panels used in other portions of an upper so as to create crisper and more defined edges of the covered indentation. Indentations can similarly be added to substrate material panels for other purposes. For example, indentations can be created to locate and/or accommodate harder materials used for reinforcement and protection in certain regions (e.g., for eye stay reinforcement, for heel counters, etc.). As another example, indentations can be created to locate and/or accommodate padding layers.

Figure 8:
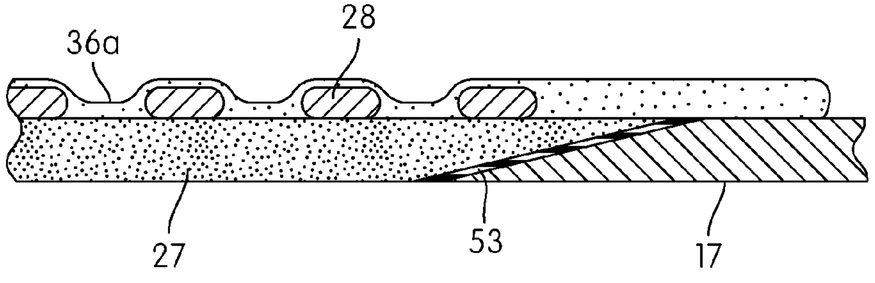
FIG. 8 shows a layer of skin material used to reinforce a transition from a mesh composite portion of a shell to another portion according to some embodiments.

In certain embodiments, and as shown in FIG. 8, a layer of skin material is used to reinforce the transition from the mesh composite portion of a shell to another portion. FIG. 8 is a cross-section taken from the location shown in FIG. 1A. As seen in FIG. 8, the skin material of panel 36*a* extends over foxing panel 17.

In some embodiments, malleoulus padding can be included in the region of the upper that will correspond to the portion of the wearer foot near the ankle. In some such embodiments, indentations are formed in the portions of foxing panel 17 (see FIG. 4A1 et seq.) that will correspond to the regions around the wearer ankles. These indentations can be formed, after step 11 of FIG. 4K, using an HF welding element in the shape of the desired padding. That element is applied to the inner side of panel 17, in the area that will correspond to the desired padding location, so as to create a pocket to contain the padding. Application of the HF element will also deform the outer side of foxing panel 17 in the shape of the padding element, thereby allowing the padding presence to be visible in the finished upper. After creation of the padding pocket, the padding elements can be glued in place in the pockets, and an inner lining element of artificial suede applied over the inner side of the foxing panel to cover the padding elements. In some such embodiments, the padding element 140 (and steps 14-16 of FIGS. 5D through 5F) are omitted.

Various modifications can also be made to the above-described fabrication process in other embodiments. For example, different types of jigs or jig configurations can be used. In some embodiments, a jig with retractable pins can be employed to eliminate the need for a tacking operation (such as step 9 described above in connection with FIG. 4I). In some such embodiments, a heat-conductive jig with retractable pins is used to assemble elements of a shell and then placed face up onto a press having a heat-conductive silicone pad on an upper platen. Techniques other than pins can also be used to hold shell elements during assembly (e.g., a vacuum table, a static charge system, etc.).

Figure 9A:
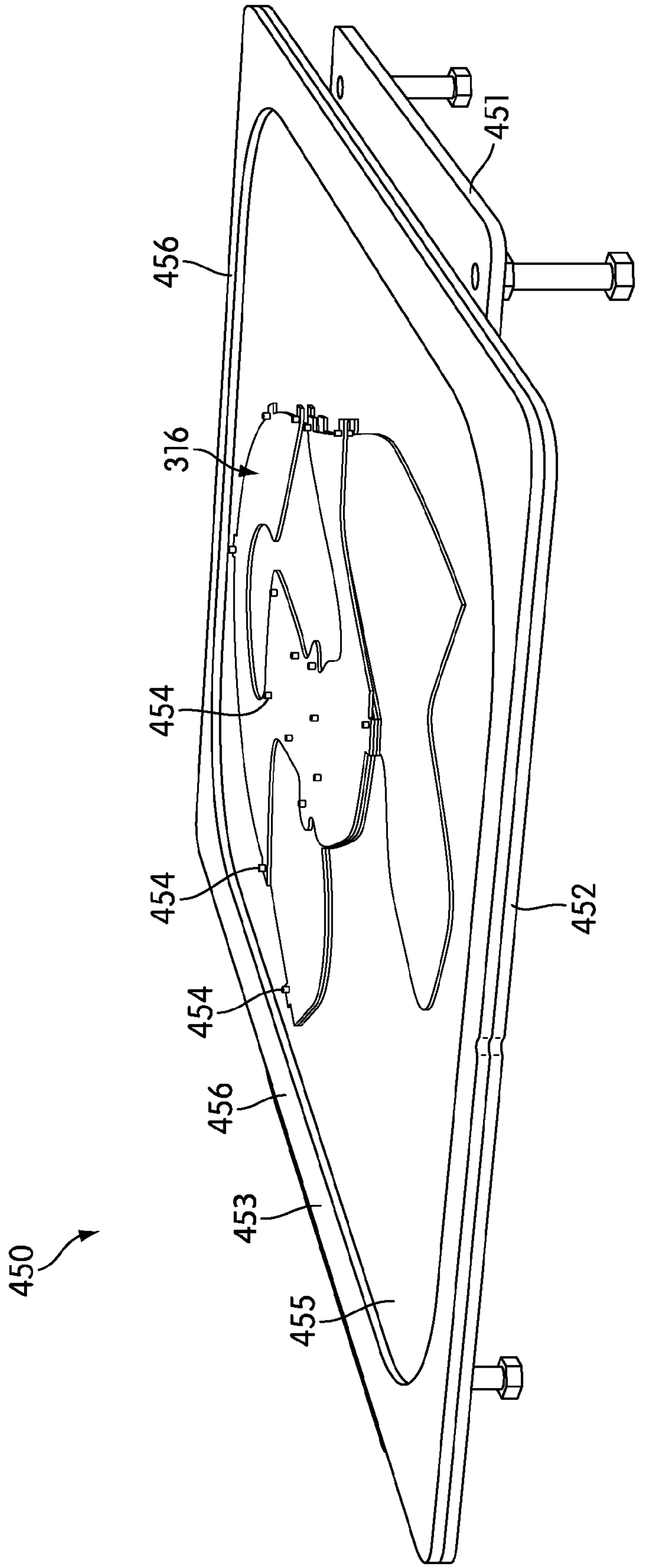
FIGS. 9A through 9C show an assembly jig that can be used in fabrication methods according to some embodiments.
Figure 9B:
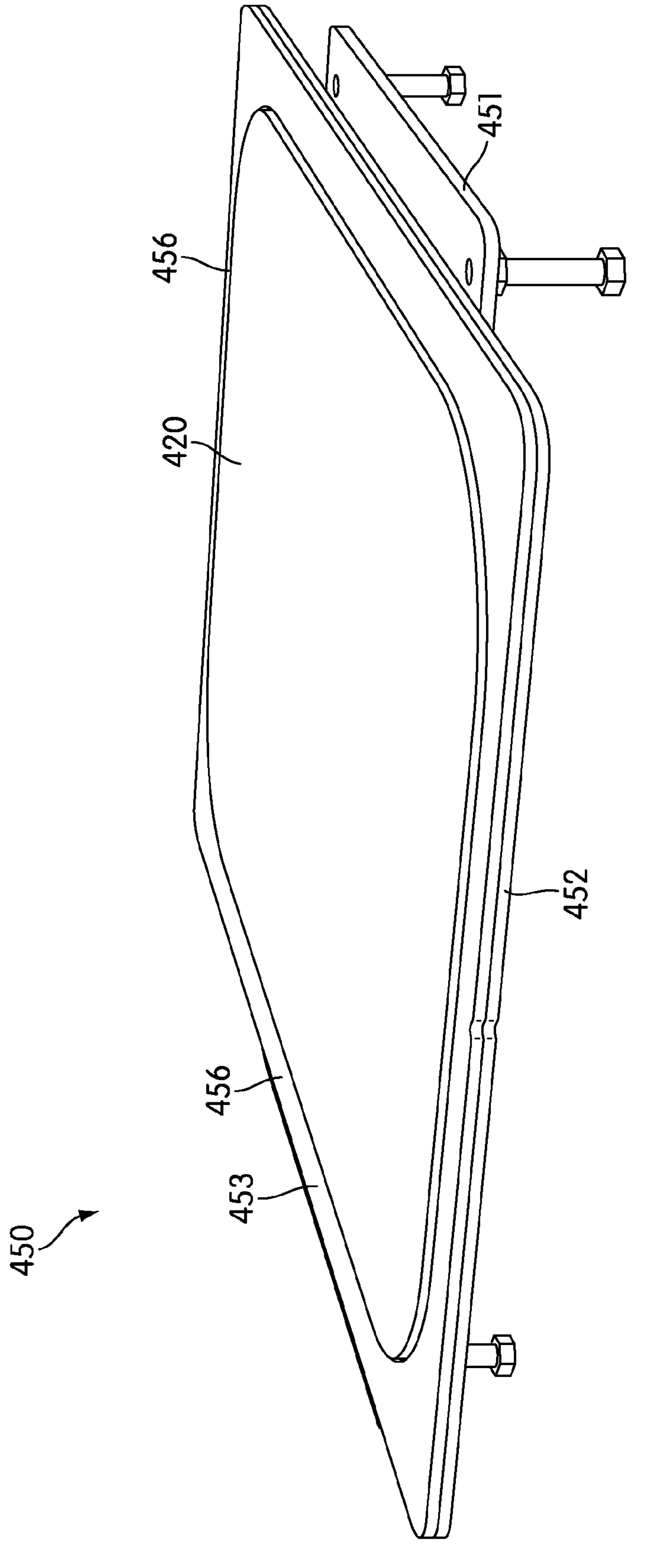
Figure 9C:
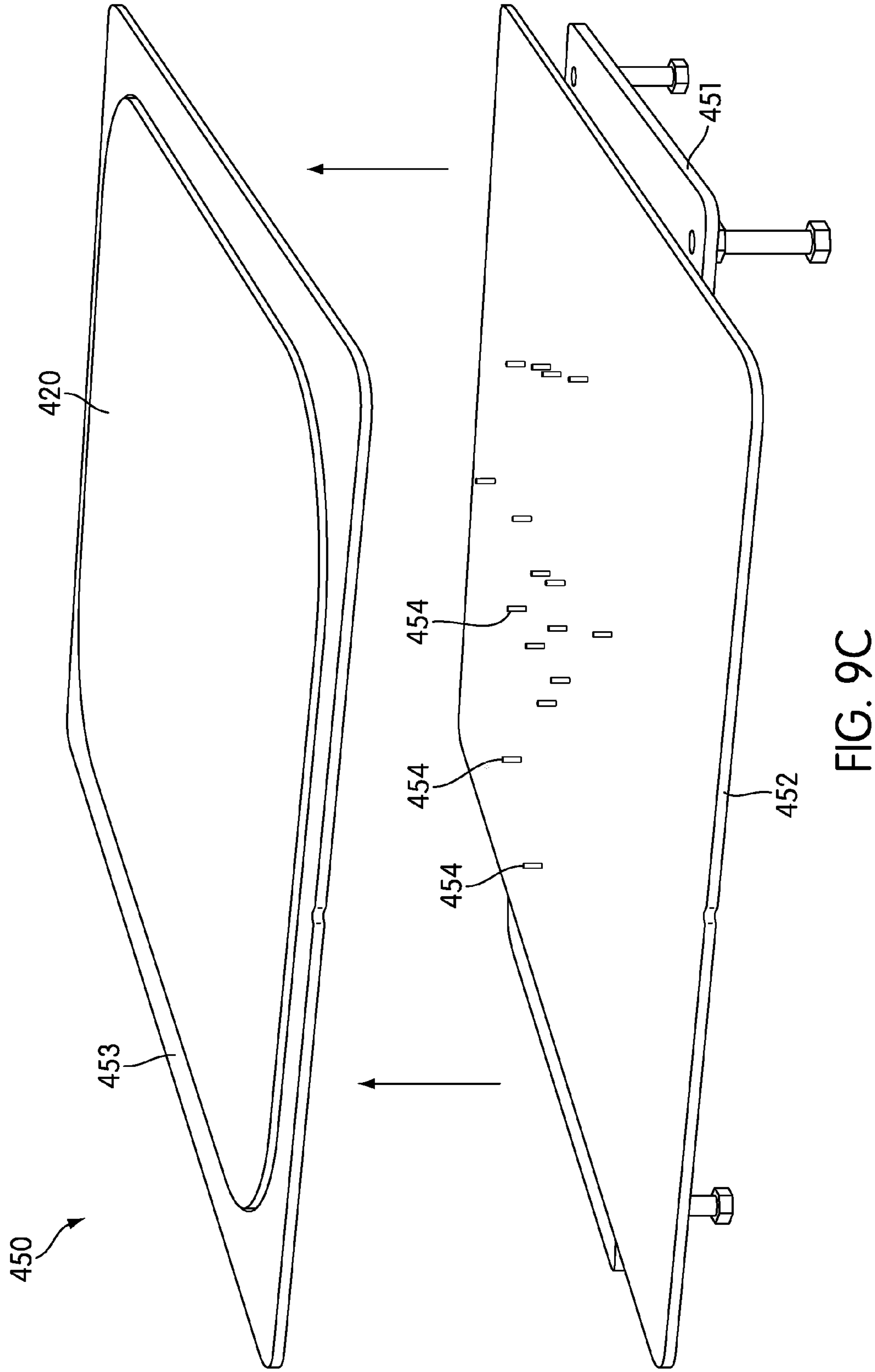

In some embodiments, a dual pan assembly jig can be employed so as to avoid a tacking step. FIGS. 9A through 9C show use of a dual pan jig 450 according to some such embodiments. Jig 450 includes a lower pan 452 and an upper pan 453. Upper pan 453 includes a planar work surface 455 surrounded by a raised rim 456. Surface 455 includes a collection of through-holes, which holes are not visible in FIG. 9A, but which have locations corresponding to pins 454. Surface 455 may have also have a non-stick coating. Pins 454, which are used to locate material panels of a panel assembly 316, are affixed to lower pan 452 and protrude through the holes in surface 455. So as to avoid confusing the drawings, all of pins 454 are not labeled. Lower pan 452 can be clipped or otherwise affixed to a planar work stand 451, with work stand 451 bolted or otherwise attached to a bench or other work location. For simplicity, panel assembly 316 is only shown generally in FIG. 9A. However, assembly 316 could be identical to assembly 116 described above (with pins 454 having relative locations identical to those of pins 101*a*-101*q* described above). The details of a panel assembly and pin layout will depend on a specific shoe design. In some embodiments, after a panel assembly layout pattern is developed for a specific upper, pins 454 are welded, soldered or braised to lower pan 452 in an appropriate pattern, and corresponding holes drilled in upper pan 453.

Material panels of assembly 316 are placed in their proper locations on pins 454 in a manner similar to that described above in connection with FIGS. 4A1 through 4H, with the locations for individual panels identified by different groups of pins 454. If surface 455 does not have a non-stick coating, a layer of release paper can be placed onto surface 455 before placing panels of assembly 316. Instead of tacking the panels together as described in connection with FIG. 4I, a silicone pad 420 is placed over panel assembly 316 (FIG. 9B). Panel 420 is similar to panel 120 describe above. Panel 420 has a shape that fits within rim 456 and is sufficiently thick to extend above rim 456.

While pad 420 rests over panel assembly 316, and as shown in FIG. 9C, upper pan 453 is pulled up and away from lower pan 452. Because pins 454 (FIG. 9A) are attached to lower pan 452, those pins remain on pan 452 as upper pan 453 is moved away. The weight of pad 420 on assembly 316 maintains the positions of the individual panels of assembly 316 on surface 455 of pan 453, and thus a tacking operation can be omitted. Upper pan 453 (with assembly 316 and pad 420) can then be placed between heated press platens and hot pressing performed. In some embodiments, hot pressing time and/or press platen temperatures can be increased to account for heat absorption by pan 453. Pad 420 can be preheated prior to placement on upper pan 453. After hot pressing of assembly 316 in pan 453, assembly 316 can be removed from pan 453 and cold pressing performed, as described in connection with FIG. 4K, with a separate room temperature pad similar to pad 129 described above.

In some embodiments, an assembly process using jig 450 can be modified so that some or all of the assembled panels are slightly tacky. This tackiness could prevent panels from slipping if pad 420 is moved after placement onto pan 453, but would allow removal and repositioning of panels during the assembly process. Panel tackiness can be achieved, e.g., by including small amounts of uncured bonding material on some panels. In still other embodiments, panel tackiness can be achieved by including heating elements on lower pan 452 that raise the temperature of pan 453 enough begin the melting of hot melt bonding materials in a panel assembly (and to at least partially preheat upper pan 453 before the hot pressing operation).

The order of at least some steps can also be varied in some embodiments. In some embodiments, a tool used in an HF welding process (e.g., step 16 described above in connection with FIG. 5F) can include surface protrusions that emboss a manufacturer's logo or other indicia in the welded region.

As indicated above, some embodiments include upper shells that have extensions used for double-lasting and/or to provide a shelf to support foam padding. FIGS. 10A through 10E show assembly of individual material panels that will be used to create a one-piece, unibody upper shell for such an embodiment.

Figure 10A:
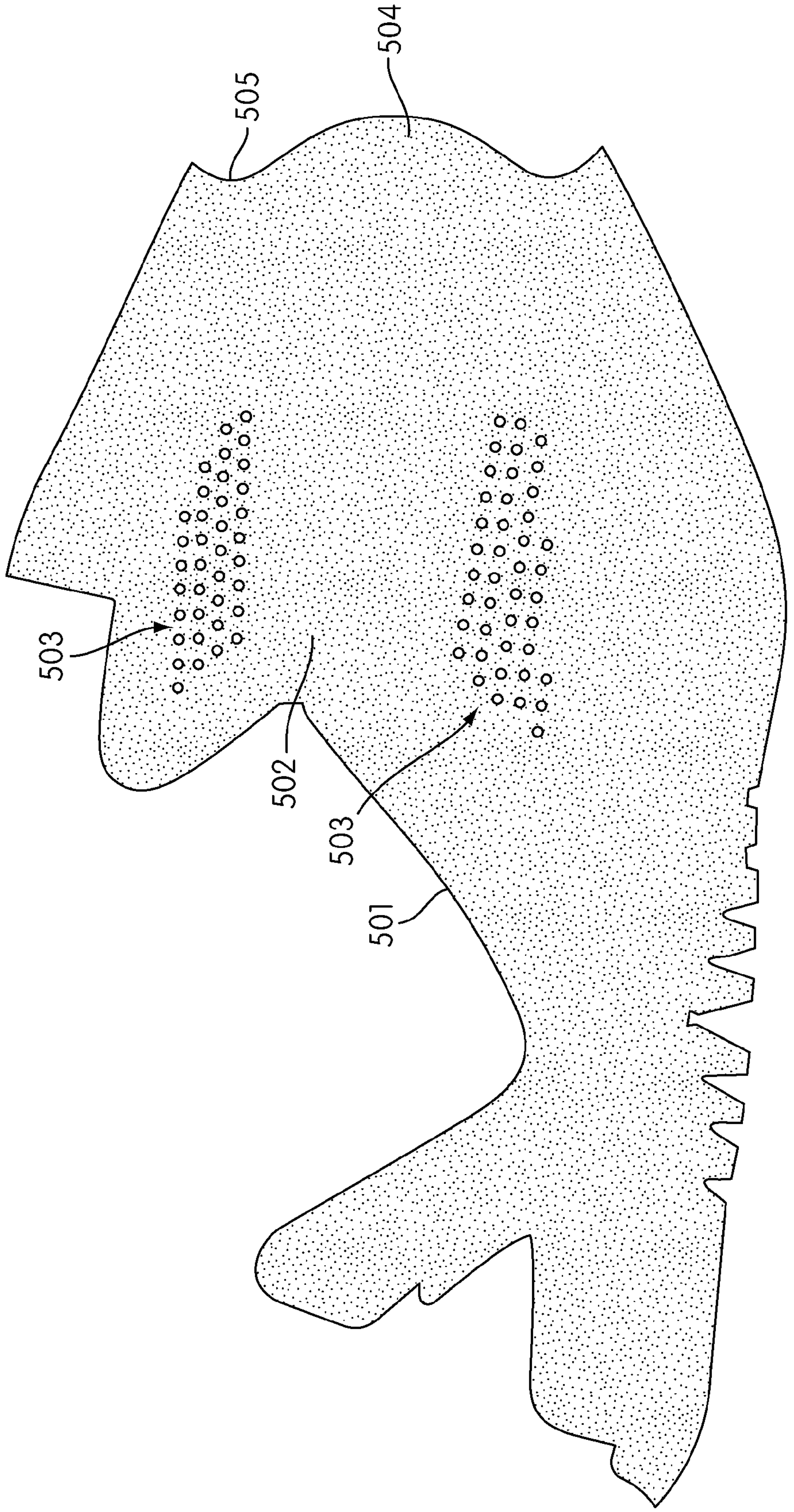
FIGS. 10A through 10E show assembly of panel elements for a unibody upper shell according to another embodiment.

In FIG. 10A, a first panel 501 of substrate material is positioned on an assembly jig (not shown). For convenience, locating holes (such as holes 104*b*-104*q* in FIG. 4C) and locating hole extension tabs are not shown in FIGS. 10A-10E. However, the presence of such holes (and tabs, in some embodiments) is understood. For example, the assembly operations of FIGS. 10A through 10E can be carried out using an assembly jig such as jig 100 and the techniques described in connection with jig 100. Alternatively, the assembly operations of FIGS. 10A through 10E could be carried out using a dual-pan assembly jig such as jig 450 and the techniques described in connection with jig 450. Other jigs and techniques could also be used.

Panel 501 will form the inner layer of the upper shell being fabricated. Panel 501 can be formed, e.g., from a synthetic leather or other material from Table 1. Face 502 of panel 501 is visible in FIG. 10A. Face 502 will be the outer face of panel 501 in a completed shoe (i.e., face 502 will be oriented away from the shoe interior). In some embodiments, panel 501 may include a laminated layer of TPU or other heat-activatable bonding material on face 502. Unlike substrate panel 27 (FIG. 4C) described in connection with a previous embodiment, panel 501 will extend completely around a wearer foot in the completed shoe. For example, and as will be seen more clearly in connection with FIGS. 12-14, the flat unibody upper shell of which panel 501 will form a part does not include a separate foxing panel in the hindfoot region. Instead, panel 501 is a contiguous piece of substrate material. In a completed upper shell (and in the upper of the completed shoe including that shell), panel 501 includes portions located in lateral forefoot, lateral midfoot, top forefoot, medial forefoot, medial midfoot and hindfoot regions of the upper. The toe region of panel 501 includes a cutout 505 that will accommodate a toe cap.

As previously discussed, a wide variety of ventilation openings can be included in upper shells according to various embodiments. For example, instead of relatively large ventilation openings such as holes 31-34 in upper 11 of shoe 10 (see, e.g., FIGS. 1A, 1B and 4C), panel 501 includes a plurality of smaller ventilation holes 503. As another example, other embodiments could include large ventilation openings or a combination of large and small ventilation openings. Similarly, one or more ventilation openings in top forefoot region 504 could be included.

Figure 10B:
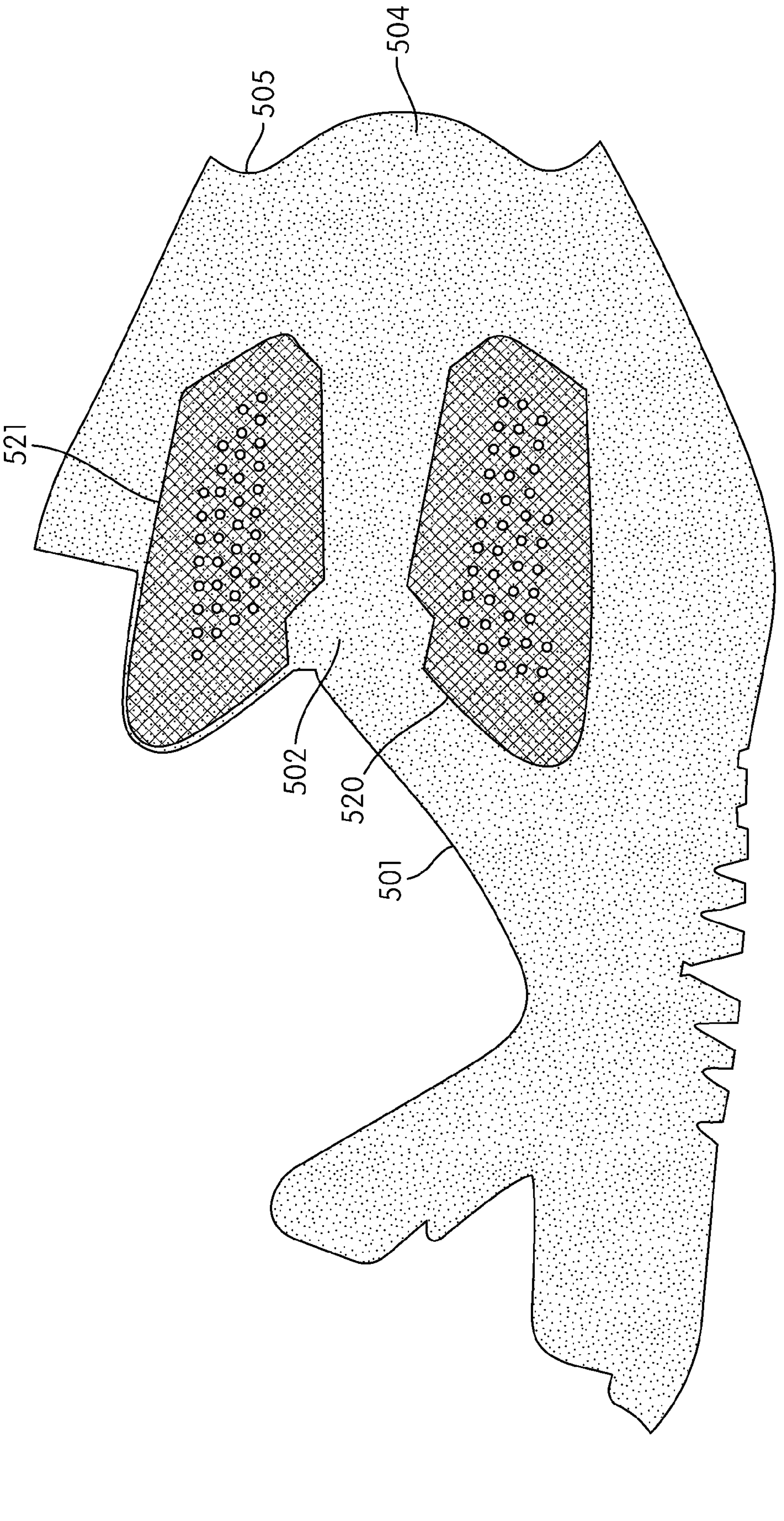

In FIG. 10B, two mesh material panels 520 and 521 are placed onto substrate panel 501 so as to cover the ventilation holes 503 and the areas of panel 501 that surround holes 503. Panels 520 and 521 can, e.g., be cut from one of the materials identified in connection with Table 2 or otherwise identified as a possible mesh material in connection with other embodiments. In some embodiments (e.g., where panel 501 does not include a layer of TPU or other bonding material on face 502), a separate layer of hot melt bonding material can be interposed between substrate panel 501 and each of mesh material panels 520 and 521.

Figure 10C:
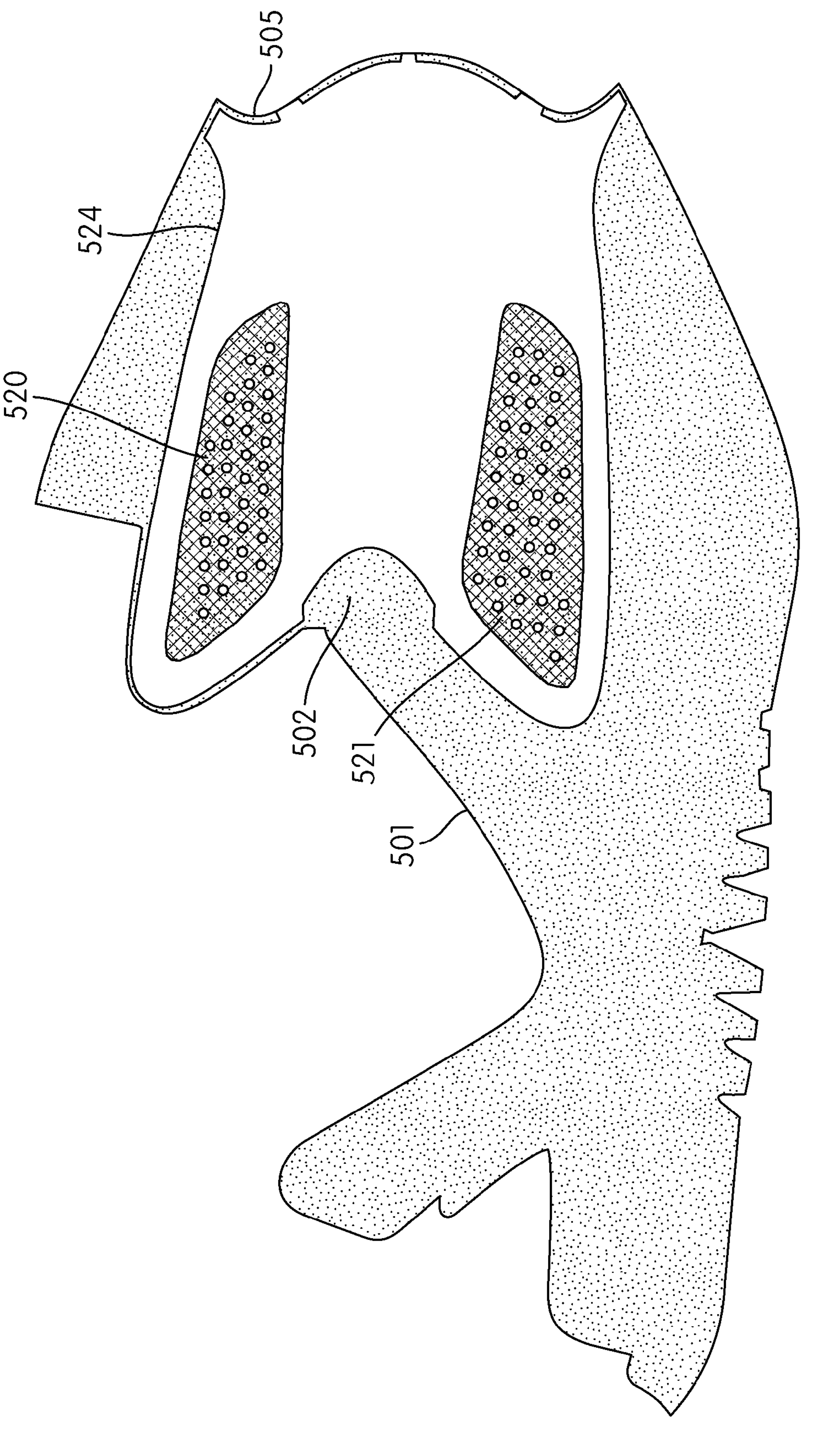

In FIG. 10C, a first skin material panel 524 is placed over mesh panels 520 and 521 and the region in between panels 520 and 521. Panel 524 also extends over much of the forefoot region of substrate panel 501. Panel 524, e.g., can be cut from a sheet of one of the possible skin materials previously mentioned in connection with other embodiments. In some embodiments, that material may include a first layer formed from a TPU with a lower melting point and a second layer formed from a higher melting point TPU or from PU, with the first layer oriented toward face 502 of panel 501.

Figure 10D:
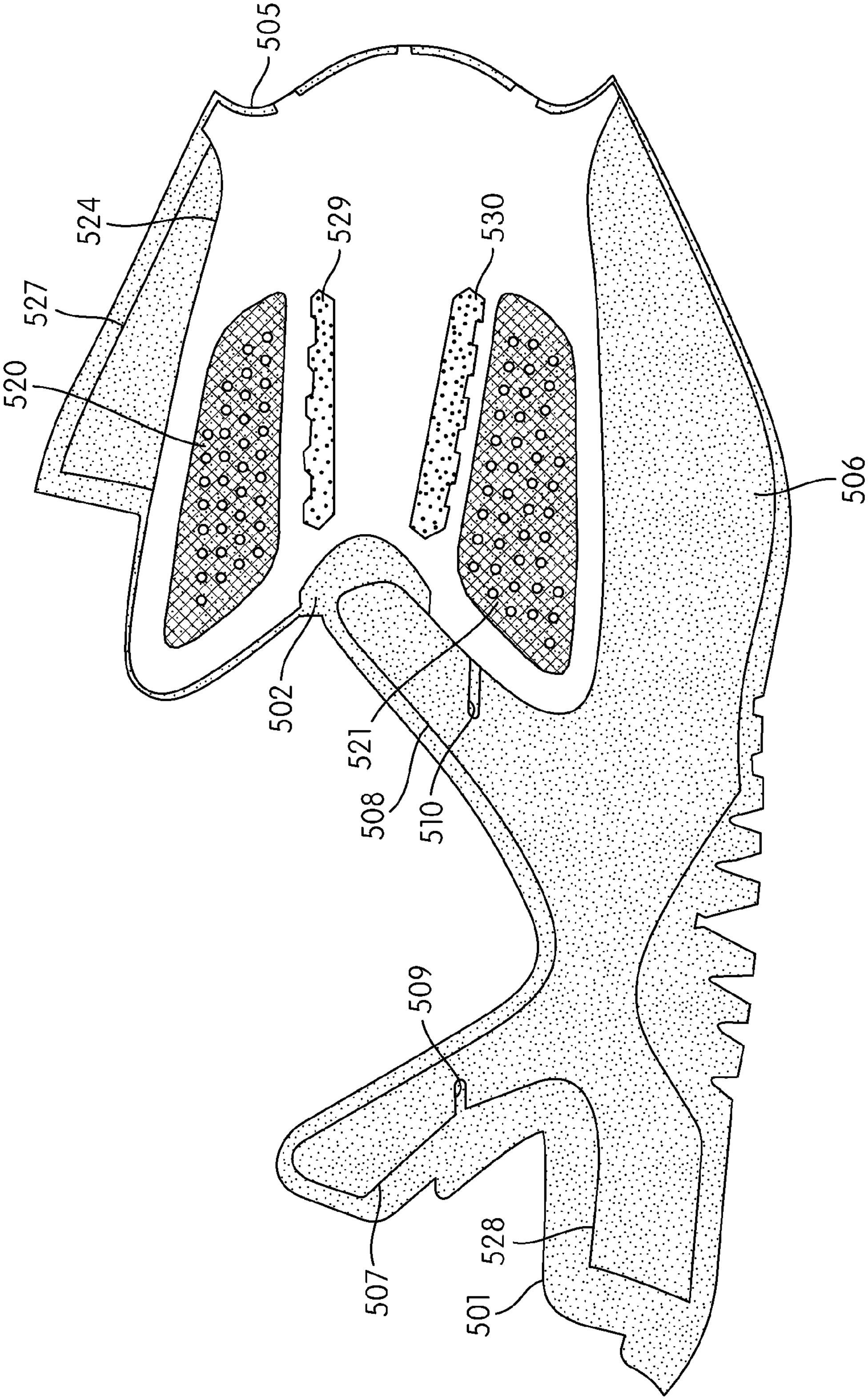

In FIG. 10D, reinforcement panels 527 and 528 are put into place. Panels 527 and 528 are in some embodiments cut from the same synthetic leather material used for panel 501. In other embodiments, panels 527 and 528 may be cut from materials that differ from the material of panel 501 (e.g., a different type of synthetic leather). Panels 527 and 528 need not be cut from the same type of material. For example, panel 527 could be cut from a first material and panel 528 could be cut from a second material, with that first material being different from that second material.

In the completed shoe, panel 528 will surround the rear of the wearer foot and includes an extension 506 that will extend over the lateral side of a wearer midfoot. Panel 528 further includes medial extension 507 that will surround an ankle opening on a medial side and a lateral extension 508 that will surround an ankle opening on a lateral side. Extensions 507 and 508 respectively include cutouts 509 and 510 that will ultimately create decorative contours in the exposed surface of a completed upper. Additional cutouts could be included in either or both of extensions 507 and 508 and/or in other portions of panel 528.

Panel 527 will extend over the arch region or a wearer foot in a completed shoe. Panels 529 and 530, which may be formed from nylon or other material, will serve as eye stay reinforcements in the completed shoe. The material(s) from which panels 527 and 528 are cut may include a laminated layer of TPU or other heat-activatable bonding material, which layer may then be oriented inward (e.g., toward face 502 of panel 501). A separate layer of hot-melt bonding material can be placed between skin panel 524 and each of eye stay reinforcement panels 529 and 530.

Figure 10E:
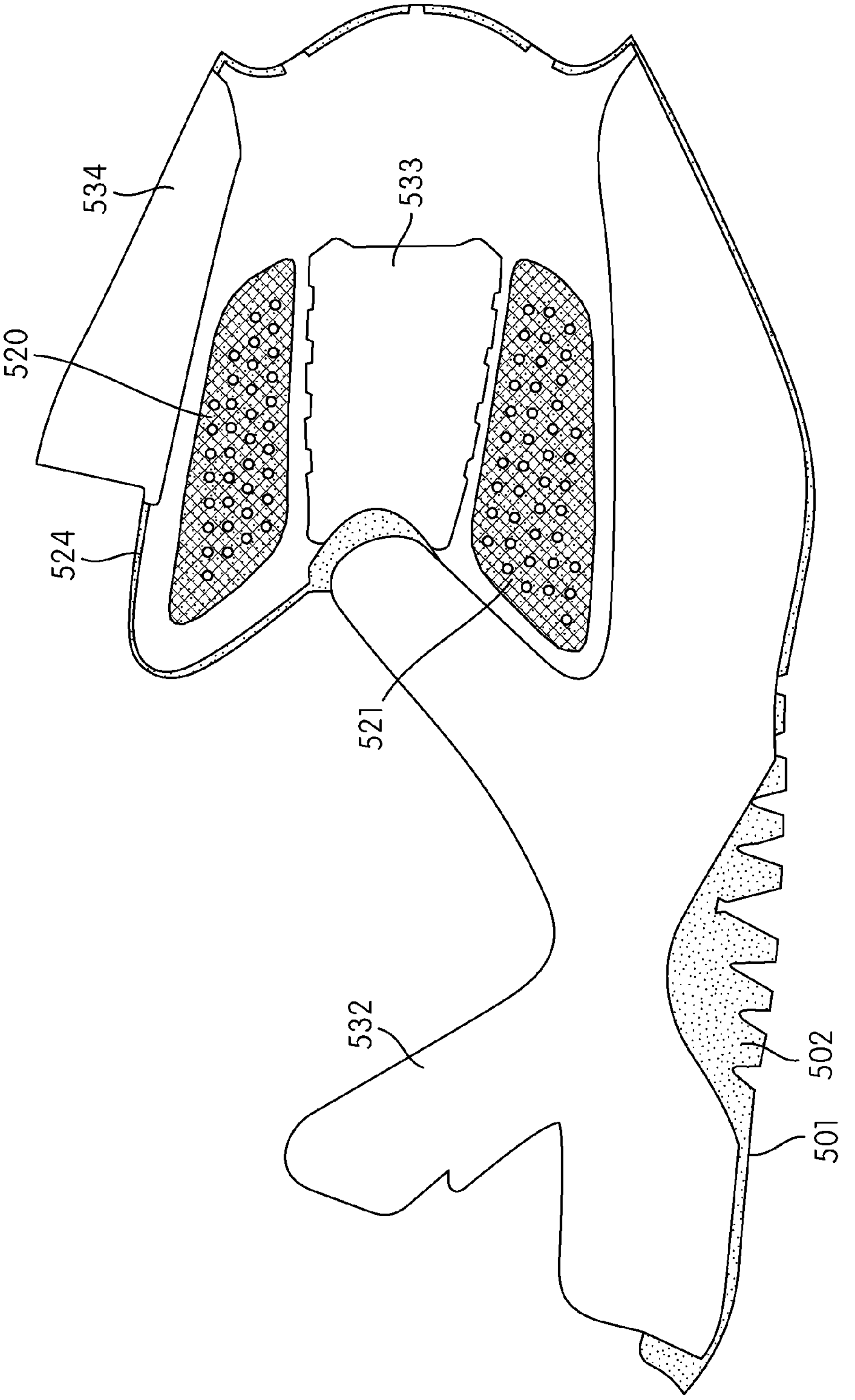

In FIG. 10E, three additional skin material panels 532-534 have been placed into position. As with panel 524, panels 532-534 can, e.g., be cut from a sheet of one of the possible skin materials previously mentioned in connection with other embodiments. As indicated above, that skin material can include a first layer formed from a TPU with a lower melting point and a second layer formed from a higher melting point TPU or from PU. The first layer of panels

532-533 could then be oriented inward, i.e., facing previously-placed panels. Panels 532-534 need not be cut from the same type of skin material. For example, panel 532 could cut from a first skin material, panel 533 cut from a second skin material, and panel 534 cut from a third skin material, with each of those first, second and third skin materials being different from one another.

Figure 11:
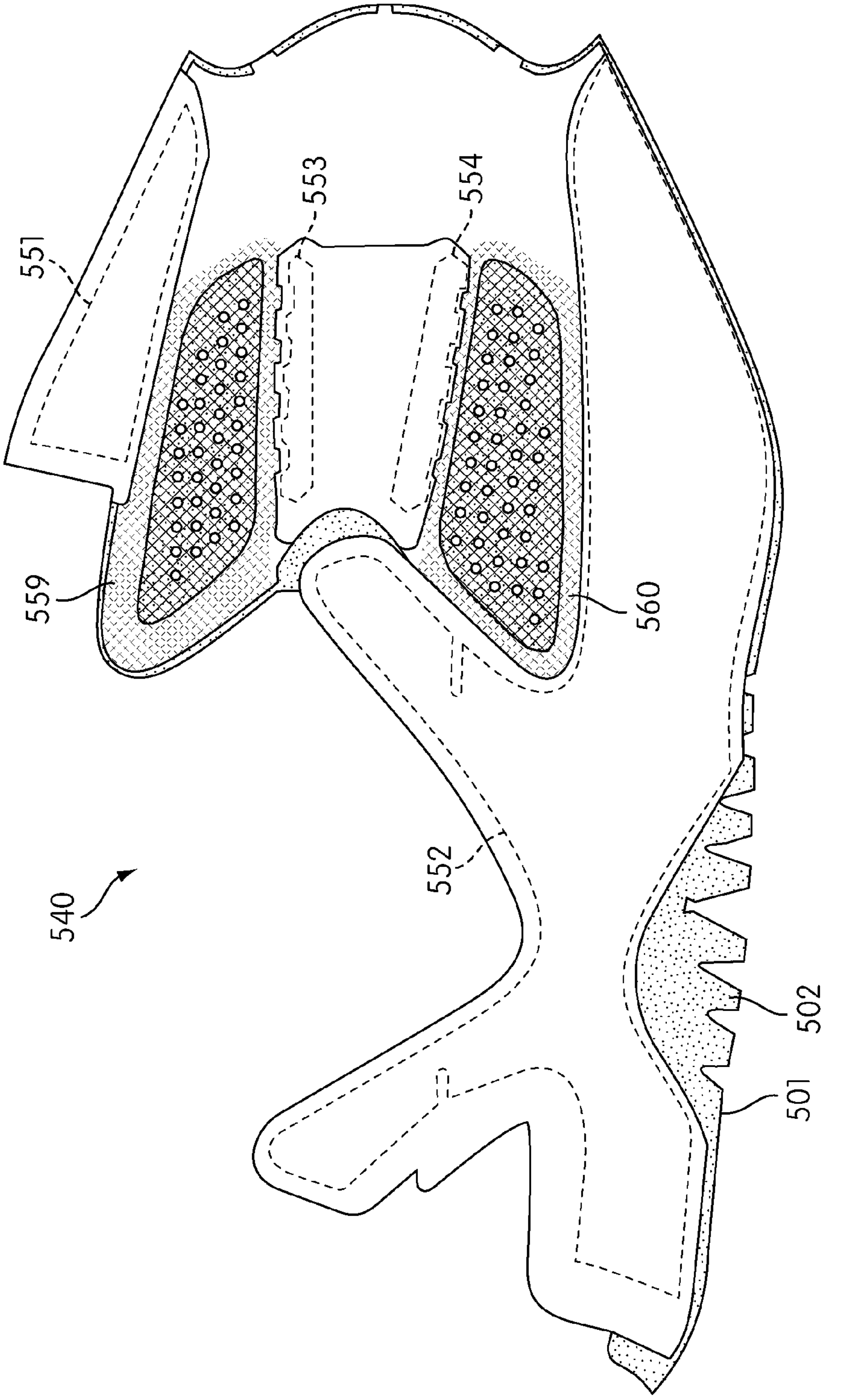
FIG. 11 shows a bonded composite panel formed from the panels assembled in FIGS. 10A through 10E.

The assembly of panels from FIG. 10E is then subjected to hot and cold pressing as described above in connection with previous embodiments. At conclusion of these pressing steps, the panel assembly from FIG. 10E is converted into a bonded composite panel 540 as shown in FIG. 11. As in previously-described embodiments, these pressing operations cause skin panels 532-534 conform to underlying elements. As a result, outlines 551 and 552 of panels 527 and 528, respectively, are visible in skin panels 534 and 532, respectively. In a similar manner, the outlines 553 and 554 of eye stay reinforcing elements 529 and 530 are visible in skin panel 533. The patterns of mesh panels 520 and 521 are partially visible in regions 559 and 560 of skin panel 524.

Figure 12:
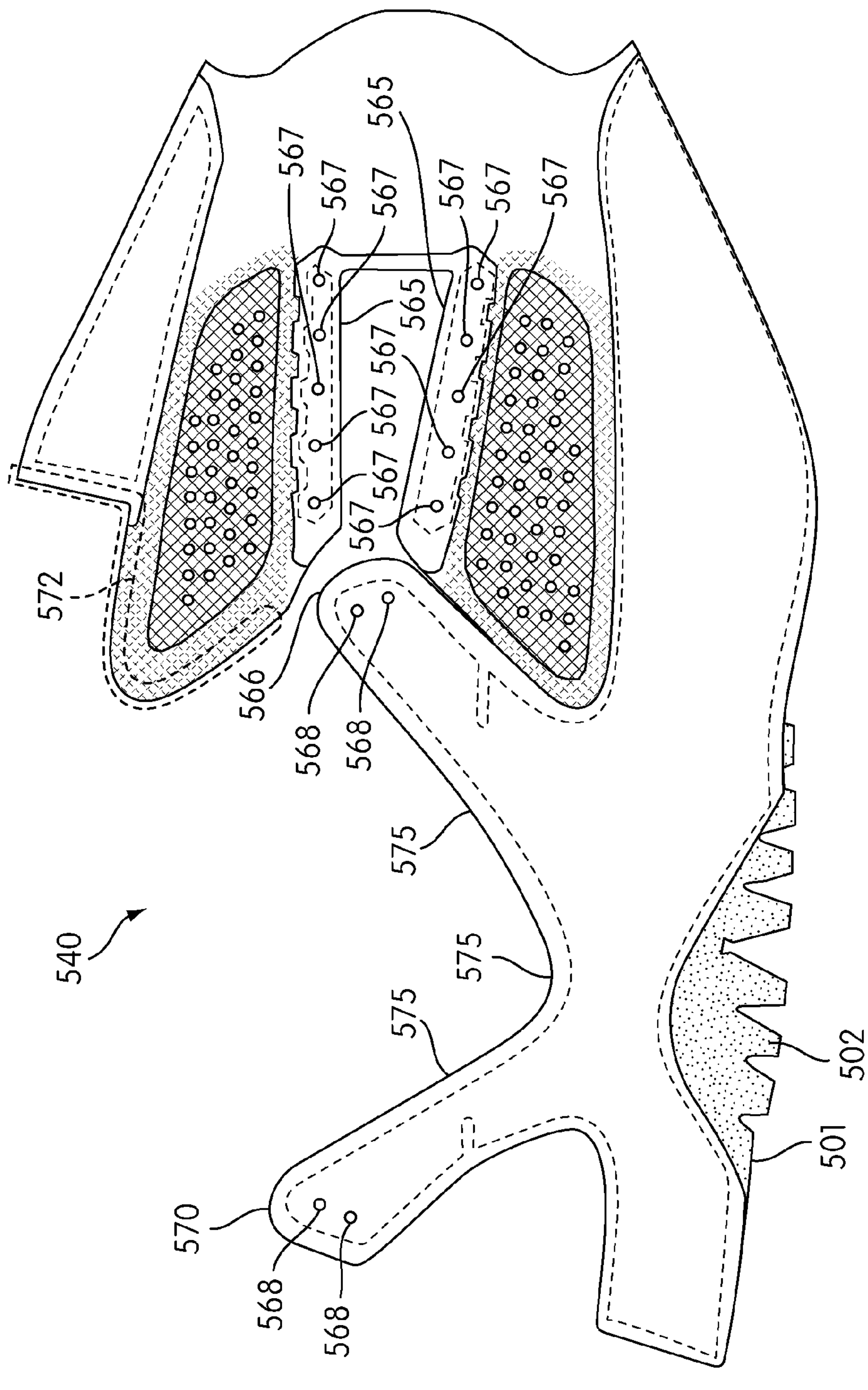
FIG. 12 shows the bonded composite panel of FIG. 11 after trimming.

FIG. 12 shows composite panel 540 after trimming. In particular, peripheral edges of panel 540 have been trimmed in multiple locations so as to provide an even edge and to remove excess material. A tongue opening 565 has been cut, and material has been removed so as to free the top and forward edges of lateral ankle tab 566. Lace eyelets 567 have been punched through panel 540 along the edges of tongue opening 565. Additional eyelets 568 have been punched through lateral ankle tab 566 and medial ankle tab 570.

Figure 13:
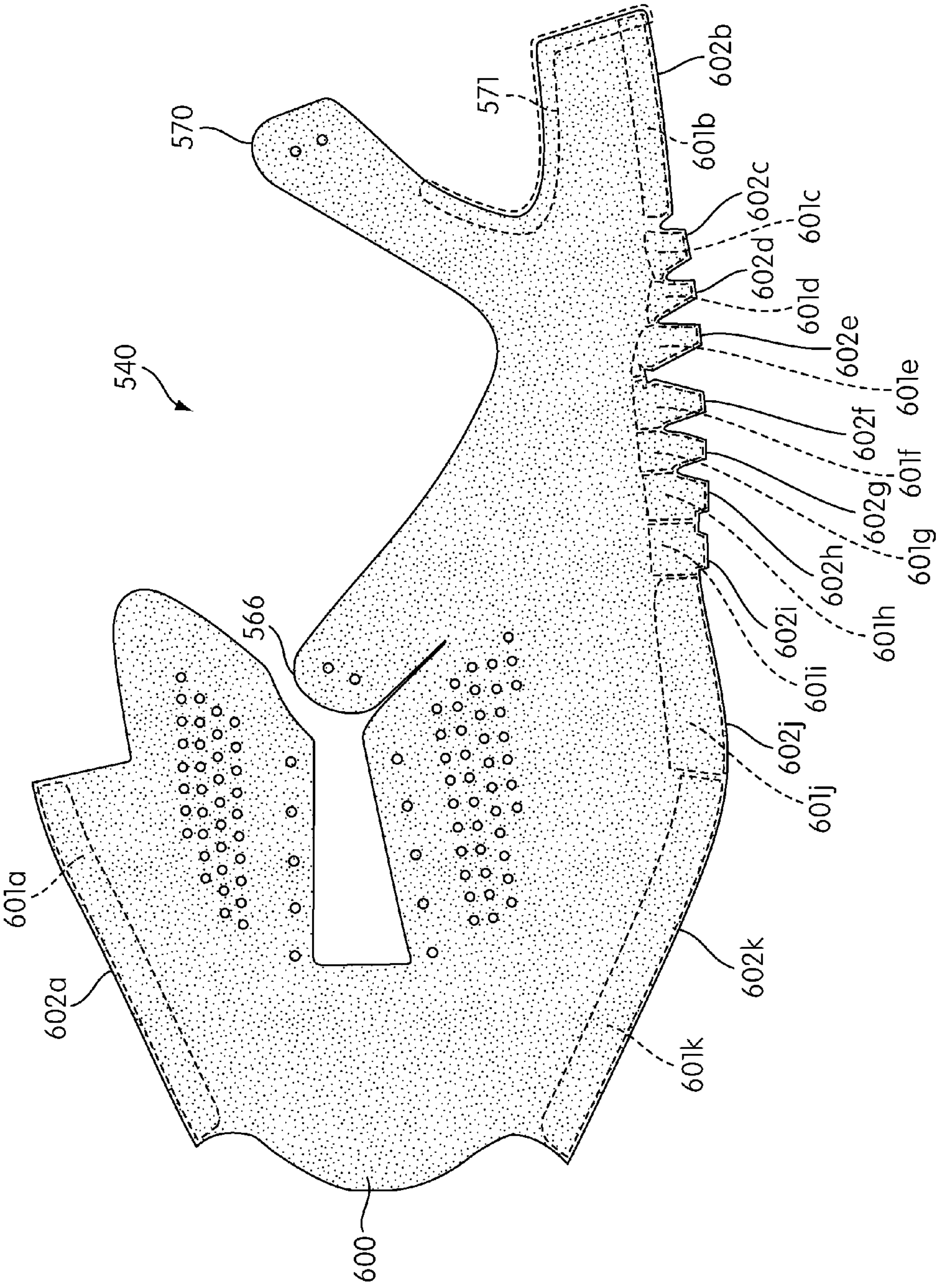
FIG. 13 shows an inner face of the trimmed, bonded composite panel of FIG. 12.

FIG. 13 shows the inner face 600 of substrate panel 501 (and of trimmed composite panel 540). Regions 601*a*-601*k* on inner face 600 are respectively located adjacent to corresponding peripheral edge portions 602*a*-602*k*. In a three-dimensional upper shell formed from shell 540, and as seen in connection with FIG. 15A, regions 601*a*-601*k* will be part of extensions in a lower portion of that shell. As described below in connection with FIGS. 15A and 15B, the extension regions 601*a*-601*k* are bonded to a lower surface of a foam midsole in a later step.

Also marked in FIG. 13 is a region 571 of inner face 600. In the next step of forming an upper that will include panel 540, region 571 is bonded to region 572 on the outer face of panel 540 (FIG. 12). In particular, and in the embodiments described in connection with FIGS. 10A-16, trimmed panel 540 is a flat, unibody upper shell. Unlike certain previously-described embodiments, this flat unibody upper shell does not include a separate foxing panel in the hindfoot region. Regions 571 and 572 can be bonded by interposing hot melt bonding material between regions 571 and 572, by placing those regions into contact with one another, and by then applying pressure and heat. A jig similar to jig 160 (FIG. 5G) could be used.

In some embodiments, an ankle collar and/or padding can be added to panel 540 after trimming, but prior to bonding regions 571 and 572. The ankle collar (which could be located along edge 575 of panel 540) and the padding (which could be part of the ankle collar and/or located on the inside face of panel 540 below edge 575) could be added using techniques described in connection with previous embodiments.

Figure 14:
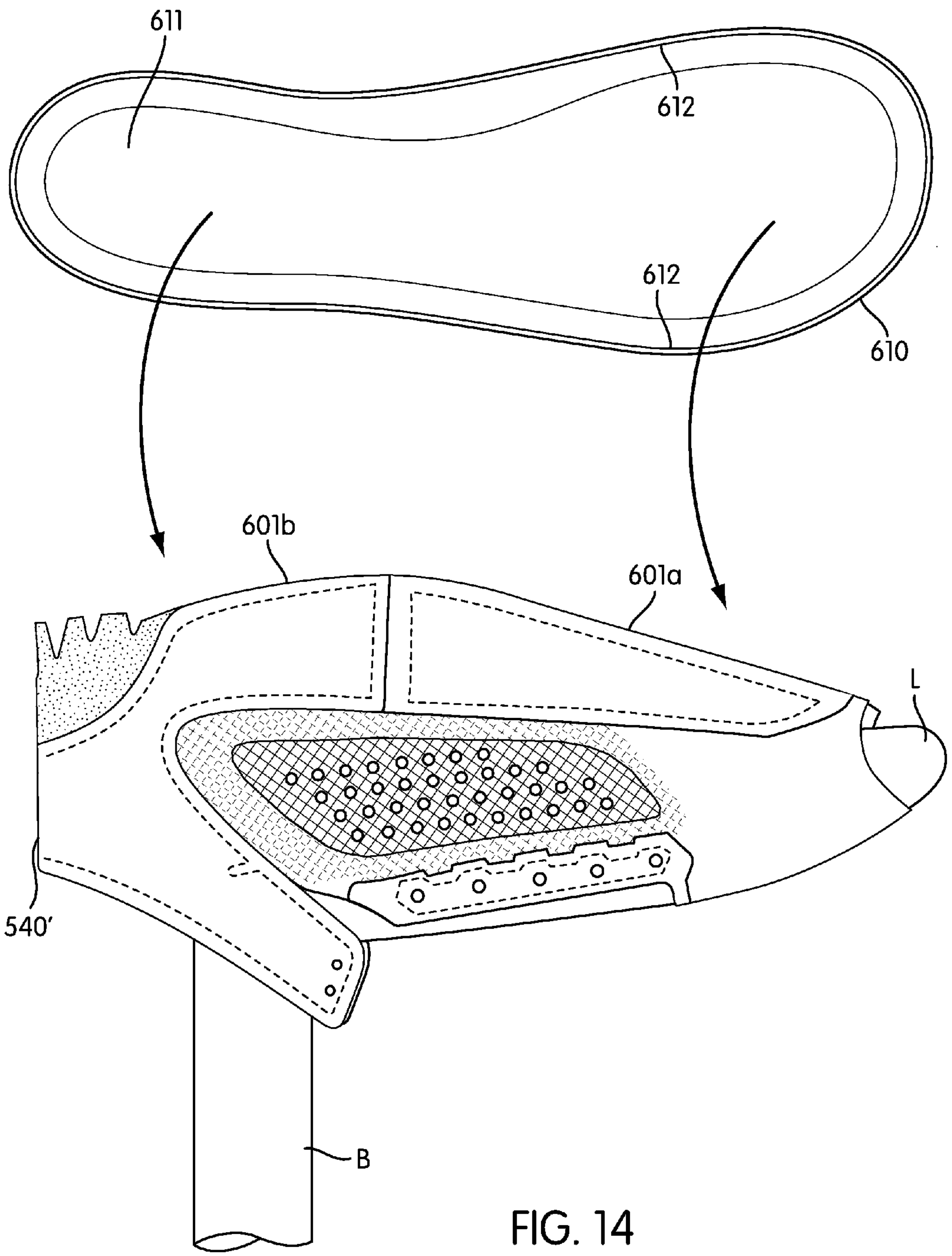
FIG. 14 shows a three-dimensional upper shell formed from the trimmed, bonded composite panel of FIG. 12 and placed onto a last.

FIG. 14 shows panel 540 after regions 571 and 572 have been bonded so as to convert panel 540 from a flat, unibody upper shell into a three-dimensional upper shell 540'. FIG. 14 further shows shell 540' placed onto a last L. Only a toe portion of last L and a last supporting bracket B are visible in FIG. 14. For simplicity, FIG. 14 does not show an ankle collar or features that could have been added in the hindfoot region of the shell 540' prior to placing of shell 540' onto last L. In some embodiments, shell 540' may undergo additional finishing prior to placement onto last L. For example, shell 540' could be heated and applied to a shaping form so as to obtain a desired shape in certain regions.

Also shown in FIG. 14 is a foam midsole 610. The top side of midsole 610 is shown in FIG. 14. Stated differently, the side of midsole 14 seen in FIG. 14 will face toward a wearer foot in a completed shoe. In the embodiment of FIGS. 10A-16, midsole 610 is formed from one or more foam materials such as are described in the aforementioned U.S. patent application Ser. No. 11/752,348. Midsole 610 includes a top surface 611 that is approximately contoured to conform to a wearer foot, as well as an edge wall 612 extends above surface 611 and that surrounds the sides of a wearer foot to provide sideways support.

Figure 15A:
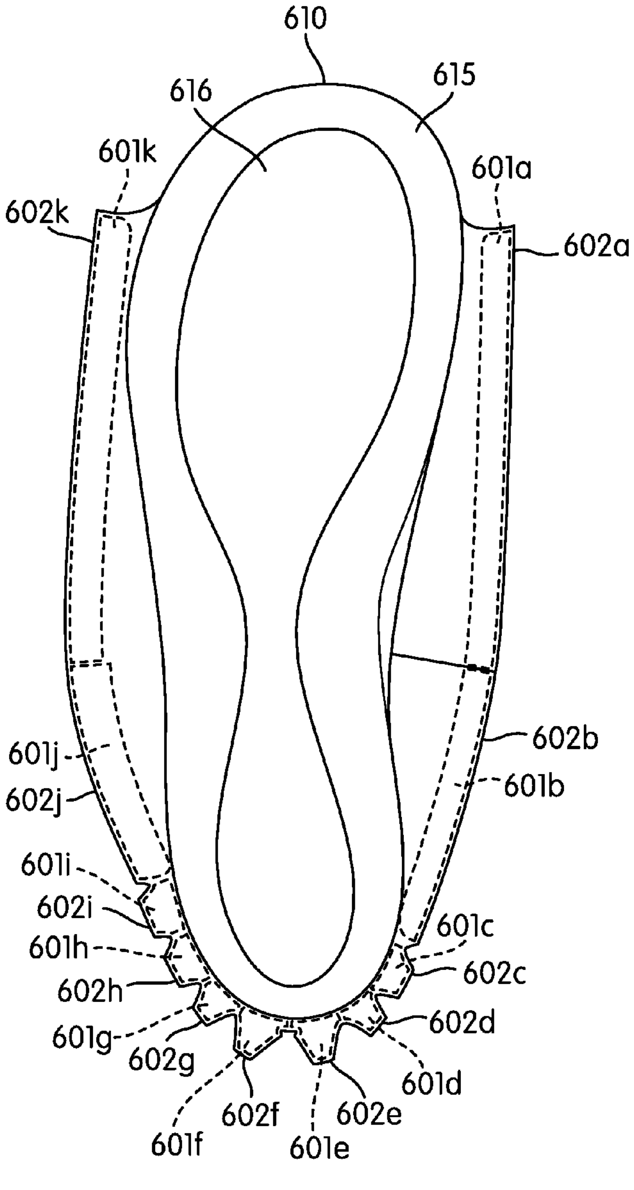
FIGS. 15A and 15B show attachment of the three-dimensional upper shell from FIG. 14 to a foam midsole.

As part of assembling the shoe that will include shell 540' and midsole 610, midsole 610 is placed into shell 540' so that surface 611 contacts last L. This is represented by an arrow in FIG. 14. FIG. 15A shows midsole 610 after placement into shell 540' and onto last L. In FIG. 15A, the bottom surface 615 of midsole 610 is visible. The lower portions of shell 540' (including regions 601*a*-601*k* of inner face 600 and corresponding peripheral edge portions 602*a*-602*k*) extend beyond bottom surface 615. These extension portions of shell 540' form a skirt that extends out of the plane of FIG. 15A.

In a subsequent fabrication step, the extension portions of shell 540' are folded over and bonded to surface 615. In particular, an adhesive is applied to regions 601*a*-601*k* of inner face 600. A fabricator then sequentially pulls on lower portions of shell 540' so as to stretch shell 540' tightly against last L and, while maintaining tension on shell 540', presses those pulled lower portions against surface 615 so as to bond each of regions 601*a*-601*k* to surface 615.

Figure 15B:
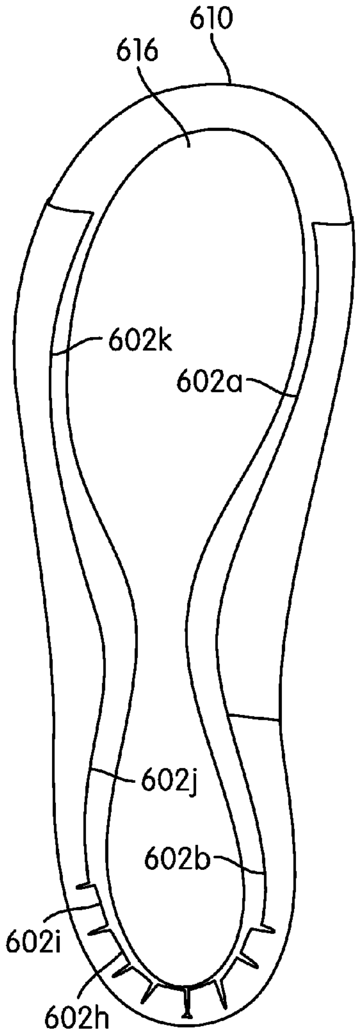

FIG. 15B shows midsole 610 after the lower portions of shell 540' have been bonded to surface 615. Regions 601*b* through 601*j* become part of a shelf that supports midsole 610, and is located in a heel region. Regions 601*b* through 601*j* also form a double-lasted heel cup. Region 601*a* becomes part of the shelf supporting midsole 610 and is located in medial mid- and forefoot regions. Region 601*k* becomes part of the shelf supporting midsole 610 and is located in lateral mid- and forefoot regions.

In other embodiments, extension portions of an upper shell may not form a support shelf located in heel, medial mid- and forefoot, and lateral mid- and forefoot regions. For example, a shell in some embodiments may only include extensions that form a support shelf located in a heel region. As another example, a shell in other embodiments may only include extensions that form a support shelf located in heel and midfoot regions.

Ridge 616 extends above surface 615 and is used to position additional sole structure elements in subsequent steps. Ridge 616 also compensates for the thickness of the shell 540' portions bonded to surface 615. In particular, ridge 616 provides additional support in the central portion of the midsole 610 bottom surface that lack the presence of folded over shell 540' portions.

Figure 16:
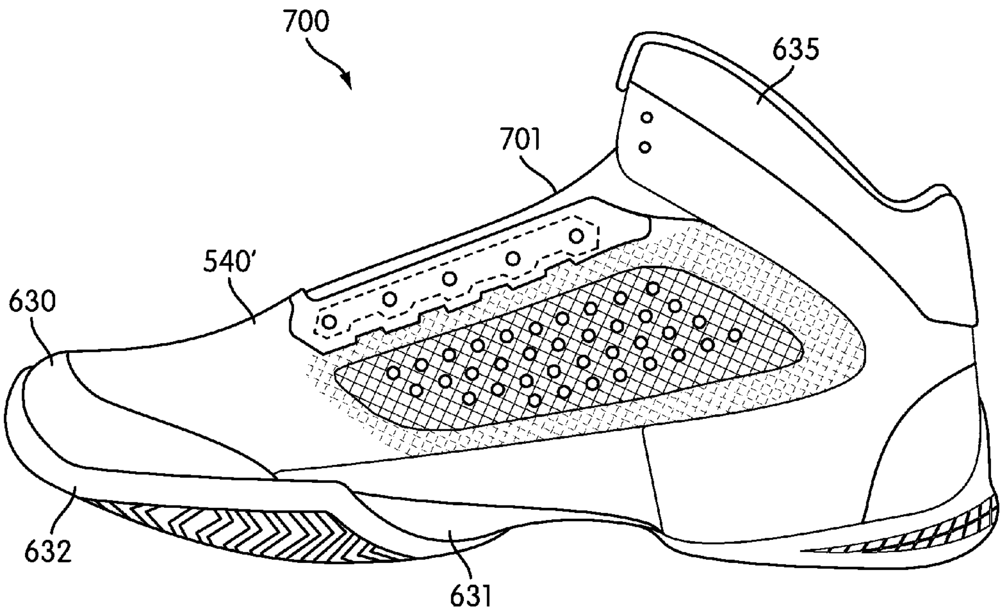
FIG. 16 shows a completed shoe that includes the upper shell and attached foam midsole from FIG. 15B.

FIG. 16 shows a shoe 700 that includes shell 540' and bonded midsole 610 from FIG. 15B. In subsequent fabrication operations, a toe cap 630 is attached by adhesively bonding the outer edges of shell 540' near cutout 505 to inner edges of toe cap 630. A support plate 631 and outsole 632 are also attached. A tongue is attached to the interior of shell 540', and an insole may be inserted. A bootie or other liner may also be attached, which liner may be a part of the tongue and attached as part of tongue attachment, and which liner may contain the insole. FIG. 16 also shows an ankle collar 635 that has been added to shell 540'

In other embodiments that include upper shells with extensions used for double-lasting and/or to otherwise provide a shelf to support foam padding, numerous variations are possible. For example, fewer or more reinforcing panels can be used. The thicknesses, shapes, arrangements and other aspects of such reinforcing panels can be varied. Decorative features similar to those resulting from cutouts 509 and 510 can be achieved in additional ways. As but one example, a reinforcing panel can have reduced thickness in a certain area instead of a slot cut all the way through the panel. As another example, a small piece of material (e.g., in the shape of a logo) could be placed on an outer surface of a reinforcing panel so as to create an outline when skin material is later bonded to the reinforcing panel.

A bonded mesh composite panel used in an upper of a shoe such as that of FIGS. 1A and 1B (or of FIG. 16) offers numerous advantages. The composite panel includes substrate material in regions where support and protection for the wearer's foot is helpful, but can include relatively large openings in other areas. These openings help to reduce weight and to facilitate ventilation of the shoe interior. The mesh material provides tensile strength to bridge openings in the substrate layer and to augment the strength of the substrate layer in other areas. By bonding the mesh layer to the substrate layer over a wide area, seams along edges of the substrate ventilation openings can be avoided, thereby reducing the likelihood of tearing or separation along those ventilation hole edges. The skin layers can be used to provide abrasion resistance in various areas and/or to achieve desired aesthetic effects.

The above described fabrication processes for creating a bonded mesh composite panel also offer numerous advantages. Using the above-described processes, a relatively complex composite can be quickly formed in a simple manner using relatively simple equipment. Moreover, the above-described processes can also facilitate inexpensive changes to a composite panel design (for either functional or aesthetic reasons) without requiring substantial expensive re-tooling.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. As but one example, techniques such as are described herein can be used to fabricate articles other than footwear uppers. The embodiments discussed herein were chosen and described in order to explain the principles and the nature of various embodiments and their practical application to enable one skilled in the art to utilize the present invention in various embodiments and with various modifications as are suited to the particular use contemplated. Any and all permutations of features from above-described embodiments are the within the scope of the invention.

The invention claimed is:

1. A method of fabricating an article of footwear, comprising:

positioning a plurality of panels into an assembly, wherein the assembly includes a substrate material panel having a first side and a second side, a mesh material panel having a first side facing away from the substrate material panel and a second side facing the substrate material panel, at least a portion of the mesh material panel overlapping the substrate material panel in a mesh/substrate overlap area, and a skin material panel having a first side facing away from the substrate material panel and a second side facing the substrate material panel, at least a portion of the skin material panel overlapping both the substrate material panel and the mesh material panel in a skin/mesh/substrate overlap area;

creating a bonded mesh composite panel by compressing the assembly at a first temperature in a first pressing operation during which the first sides of the substrate material, mesh material and skin material panels face a compressible surface conforming to the assembly, and compressing the assembly at a second temperature in a second pressing operation during which the first sides of the substrate material, mesh material and skin material panels face a compressible surface conforming to the assembly, wherein the second pressing operation is performed after the first pressing operation and the second temperature is lower than the first temperature;

subsequent to the second pressing operation, forming a three-dimensional upper shell from the composite panel; and bonding portions of the three-dimensional upper shell to a bottom surface of a foam midsole.

2. The method of claim 1, wherein bonding portions of the three-dimensional upper shell comprises bonding portions of the upper shell to surfaces of a heel region of the foam midsole so as to form a double lasted heel cup.

3. The method of claim 1, wherein bonding portions of the three-dimensional upper shell comprises bonding portions of the upper shell to surfaces of the foam midsole so as to form a shelf, wherein the shelf is located in heel and midfoot regions.

4. The method of claim 3, wherein the shelf is located in heel, midfoot and forefoot regions.

5. The method of claim 1, wherein the assembly includes at least one reinforcement panel located on the first side of the substrate layer.

6. The method claim 5, wherein the reinforcement panel and the substrate layer are formed from artificial leather.

7. The method of claim 1, wherein the substrate material panel comprises a contiguous piece of substrate material having portions located in lateral forefoot, lateral midfoot, top forefoot, medial forefoot, medial midfoot and hindfoot regions at the conclusion of the forming of the three-dimensional upper shell.

* * * * *